(12) United States Patent  (10) Patent No.: US 8,208,794 B2
Kobayashi et al.  (45) Date of Patent: Jun. 26, 2012

(54) REPRODUCING APPARATUS, REPRODUCING METHOD, PROGRAM, AND PROGRAM STORAGE MEDIUM

(75) Inventors: Yoshiyuki Kobayashi, Tokyo (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1702 days.

(21) Appl. No.: 11/468,154

(22) Filed: Aug. 29, 2006

(65) Prior Publication Data

US 2007/0058933 A1   Mar. 15, 2007

(30) Foreign Application Priority Data

Sep. 12, 2005  (JP) ................................ 2005-263970

(51) Int. Cl.
*G11B 27/00* (2006.01)
(52) U.S. Cl. ...................................... 386/278
(58) Field of Classification Search .................. None
See application file for complete search history.

(56) References Cited

U.S. PATENT DOCUMENTS

| | | | | |
|---|---|---|---|---|
| 7,609,945 | B2 * | 10/2009 | Seo et al. ....................... | 386/248 |
| 2002/0034377 | A1 * | 3/2002 | Numata .......................... | 386/111 |
| 2004/0101272 | A1 * | 5/2004 | Boston et al. ................... | 386/46 |

FOREIGN PATENT DOCUMENTS

| | | |
|---|---|---|
| JP | 10-257454 | 9/1998 |
| JP | 2000-287110 | 10/2000 |
| JP | 2000-293446 | 10/2000 |

OTHER PUBLICATIONS

Office Action issued Mar. 8, 2011, In Japanese Patent Application 2005-263970.

* cited by examiner

*Primary Examiner* — William C Vaughn, Jr.
*Assistant Examiner* — Daniel Tekle
(74) *Attorney, Agent, or Firm* — Oblon, Spivak, McClelland, Maier & Neustadt, L.L.P.

(57) ABSTRACT

A reproducing apparatus includes an acquisition unit for acquiring playback management information containing first information containing a main playback path indicating a location of a main stream, a read out unit for reading the main stream to be reproduced and video data that is to be reproduced in synchronization with the main stream, based on the playback management information, a first storage unit for storing the video data read by the read out unit, a decode unit for decoding the video data stored on the first storage unit, a second storage unit for storing the video data decoded by the decode unit, a playback unit for reproducing the main stream read by the read out unit by referencing a predetermined counter based on the playback management information, and a video data output unit for outputting the decoded video data stored on the second storage unit in synchronization with playback of the main stream.

16 Claims, 32 Drawing Sheets

FIG. 10

| DATA STRUCTURE | NUMBER OF BITS | MNEMONIC DENOTATION |
|---|---|---|
| Manifest() | | |
| { | | |
|   manifest_id | 8 | uimsbf |
|   author_id | 8 | uimsbf |
|   disc_id | 8 | uimsbf |
|   version | 8 | uimsbf |
|   display name | 8*128 | bslbf |
|   source | 8*1024 | bslbf |
|   permission | 8 | uimsbf |
|   src_file_name | 8*1024 | bslbf |
|   dst_file_name | 8*1024 | bslbf |
| } | | |

FIG. 15

| DATA STRUCTURE | NUMBER OF BITS | MNEMONIC DENOTATION |
|---|---|---|
| File_package() | | |
| { | | |
|   Package_header() | | |
|   { | | |
|     compression_type | 8 | uimsbf |
|     encryption_type | 8 | uimsbf |
|   } | | |
|   Package_Body() | | |
|   { | | |
|     file_count | 16 | uimsbf |
|     for(i=0;i<file_count;i++) | | |
|     { | | |
|       Manifest() | | |
|       { | | |
|         manifest_id | 8 | uimsbf |
|         author_id | 8 | uimsbf |
|         disc_id | 8 | uimsbf |
|         version | 8 | uimsbf |
|         source | 8*128 | bslbf |
|         display_name | 8*128 | bslbf |
|         permission | 8 | uimsbf |
|         src_file_name | 8*1024 | bslbf |
|         dst_file_name | 8*1024 | bslbf |
|       } | | |
|       File() | | |
|       { | | |
|         file_size | 32 | uimsbf |
|         for(j=0;j<file_size;j++) | | |
|         { | | |
|           file_data | 8 | bslbf |
|         } | | |
|       } | | |
|     } | | |
|   } | | |
| } | | |

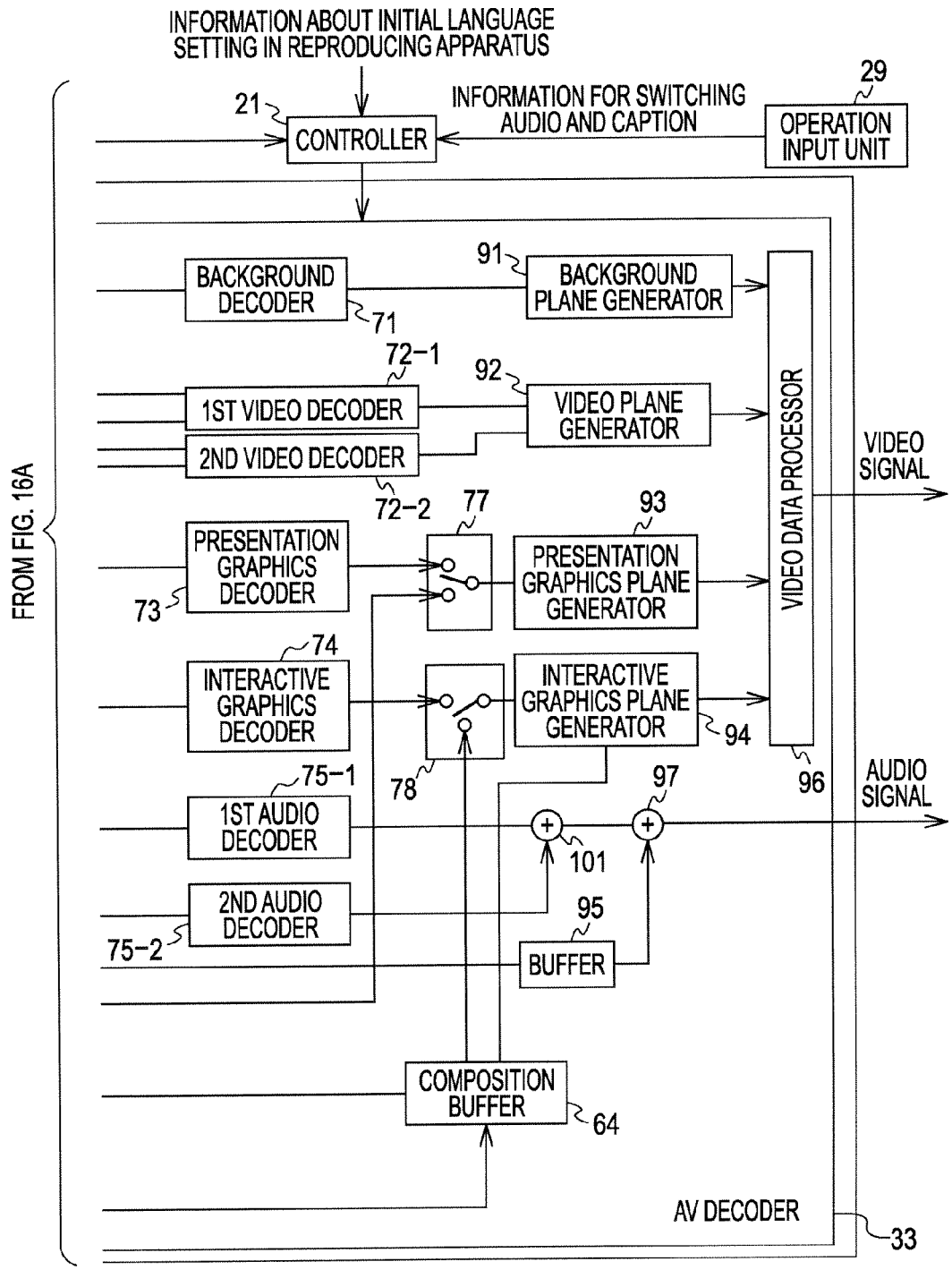

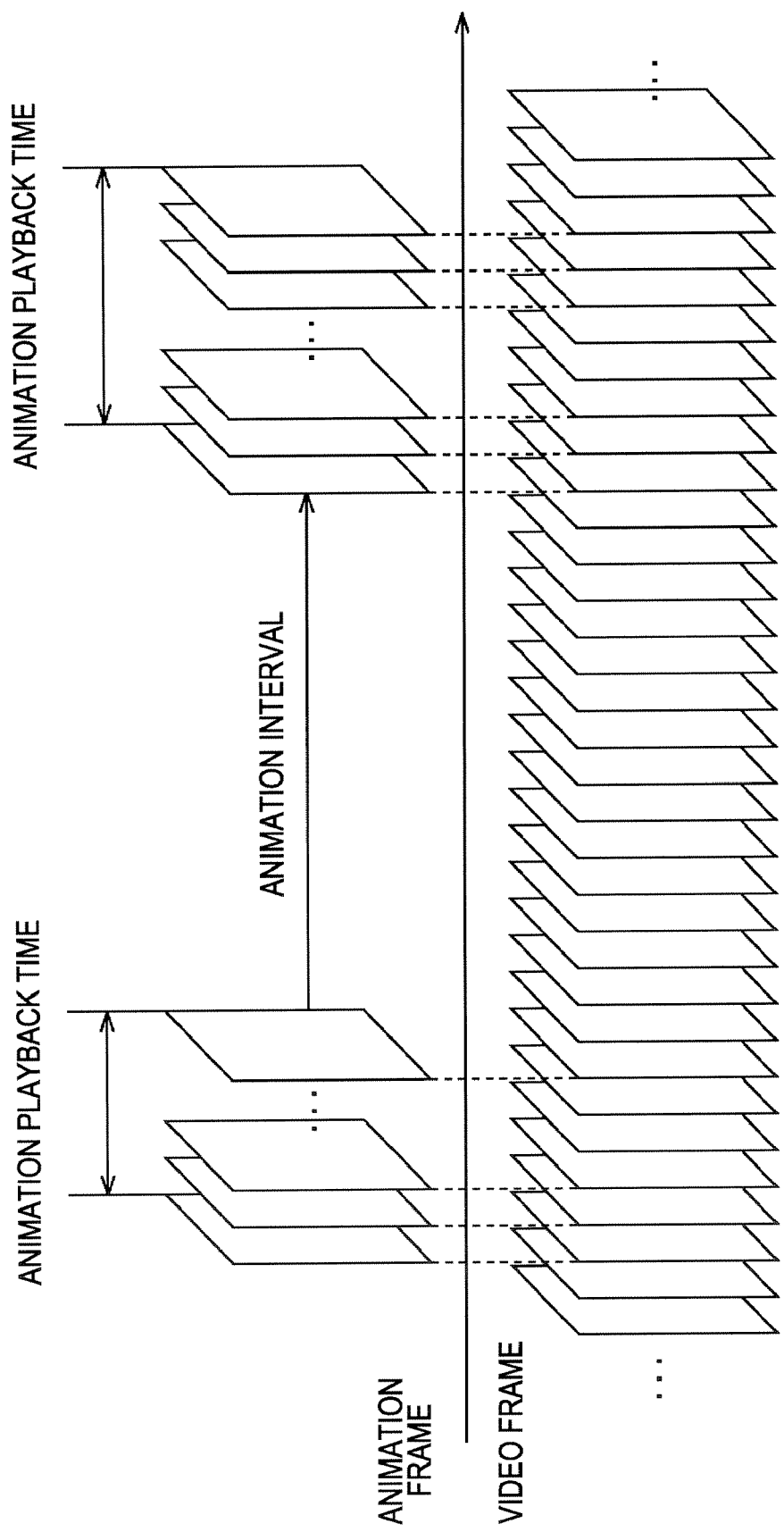

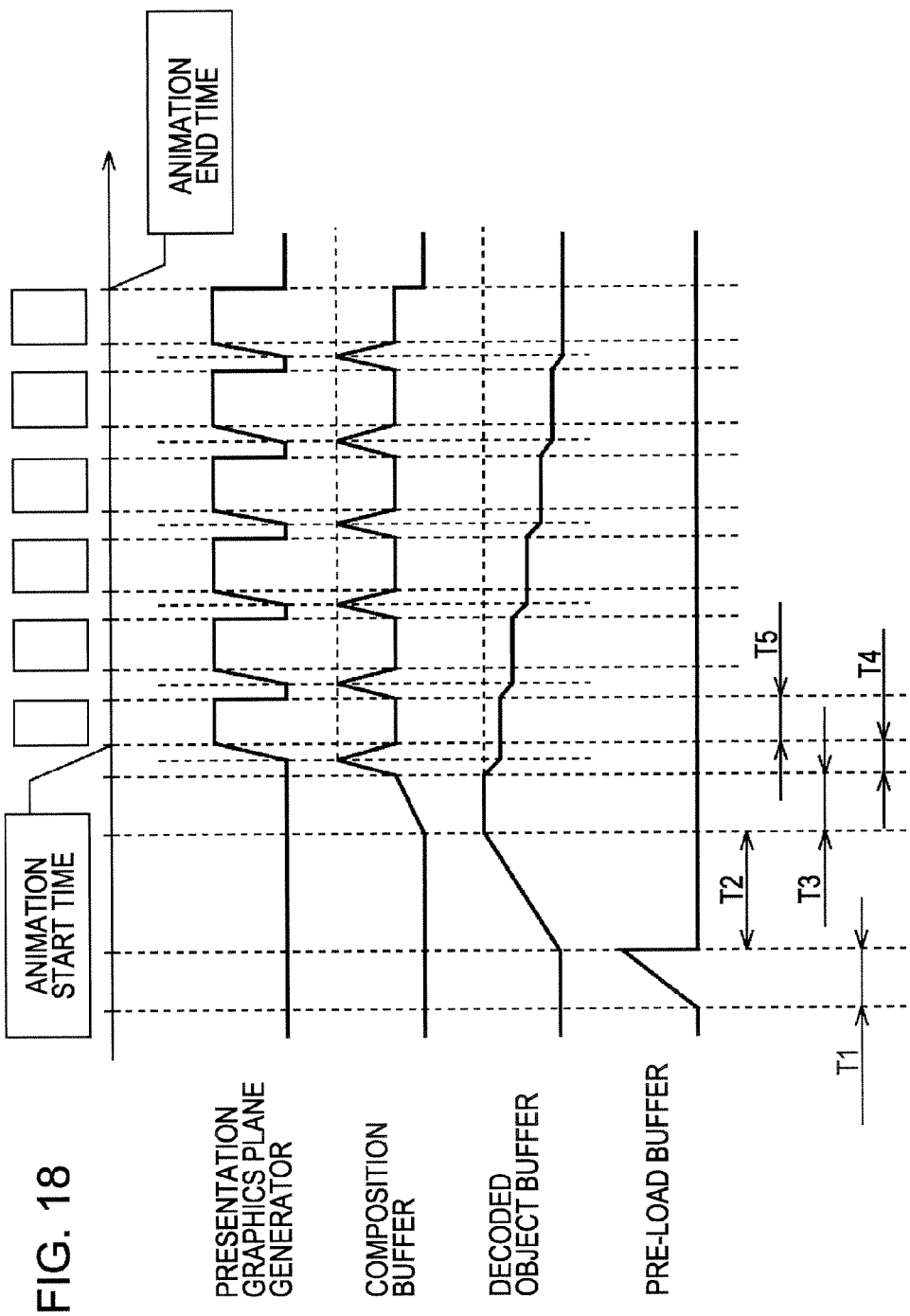

REPRODUCING APPARATUS, REPRODUCING METHOD, PROGRAM, AND PROGRAM STORAGE MEDIUM

CROSS REFERENCES TO RELATED APPLICATIONS

The present invention contains subject matter related to Japanese Patent Application JP 2005-263970 filed in the Japanese Patent Office on Sep. 12, 2005, the entire contents of which are incorporated herein by reference.

BACKGROUND OF THE INVENTION

1. Field of the Invention

The present invention relates to a reproducing apparatus, a reproducing method, a program, and a program storage medium and, in particular, to a reproducing apparatus, a reproducing method, a program, and a program storage medium for displaying an MPEG 2 transport stream and animation data different in data format from the MPEG2 transport stream in synchronization.

2. Description of the Related Art

Japanese Unexamined Patent Application Publication No. 7-306954 discloses an animation technique. According to the disclosure, to achieve strict synchronization in the display of a plurality animation characters, action generation modules of characters to be displayed on screen are arranged and registered in a module list. Display of the animation characters is then controlled by referencing the module list.

In another known technique, graphics objects multiplexed into a transport stream based on an HDMV graphics stream are used to display graphics in synchronization with a video frame of an MPEG 2 transport stream format.

SUMMARY OF THE INVENTION

To generate graphics data in synchronization with a video frame using an HDMV graphics stream, the knowledge of MPEG 2 transport stream and development skills related thereto are required. The technique disclosed in Japanese Unexamined Patent Application Publication No. 7-306954 synchronizes a plurality of units of animation data generated in the same data format. Even with this technique, video data and animation data in different data formats cannot be displayed in synchronization.

It is thus desirable to display, in synchronization, an MPEG 2 transport stream and animation data in a data format different from that of the MPEG 2 transport stream.

In one embodiment of the present invention, a reproducing apparatus includes an acquisition unit configured to acquire playback management information containing first information containing a main playback path indicating, along time axis, a location of a main stream containing at least one stream, a read out unit configured to read the main stream to be reproduced and video data that is to be reproduced in synchronization with the main stream, based on the playback management information acquired by the acquisition unit, a first storage unit configured to store the video data read by the read out unit, a decode unit configured to decode the video data stored on the first storage unit, a second storage unit configured to store the video data decoded by the decode unit, a playback unit configured to reproduce the main stream read by the read out unit by referencing a predetermined counter based on the playback management information acquired by the acquisition unit, and a video data output unit configured to output the decoded video data stored on the second storage unit in synchronization with playback of the main stream by the playback unit.

The reproducing apparatus may further include a control unit configured to control process of the first storage unit, the decode unit, the second storage unit, and the video data output unit by referencing the counter referenced by the playback unit.

The acquisition unit may acquire control information containing a command for calling an API corresponding to a process performed by the control unit, and when the API is called by executing the command, the control unit controls the process of the first storage unit, the decode unit, the second storage unit, and the video data output unit by referencing the counter referenced by the playback unit.

The read out unit may read the video data prior to the main stream.

The video data may be different from the main stream in data format.

The video data may include animation data composed of a plurality of frames.

The video data may be in a JPEG data format and include animation data reproducible on a Java® application.

The reproducing apparatus may further include a mixture video data generation unit configured to generate mixture video data to be mixed with the main stream reproduced by the playback unit, and a playback output unit configured to output the video data that is to be reproduced in response to the supply of the mixture video data to be mixed and generated by the mixture video data generation unit and the supply of the main stream reproduced by the playback unit, wherein the video data output unit outputs the decoded video data to the mixture video data generation unit.

The video data output unit may acquire the mixture video data immediately prior to when the video data output unit outputs the decoded video data to the mixture video data generation unit, mix the decoded video data with the acquired mixture video data, and output the resulting data to the mixture video data generation unit.

The reproducing apparatus may include at least two mixture video data generation units. While a first mixture video data generation unit generates the mixture video data, a second mixture video data generation unit supplies the generated mixture video data to the playback output unit. While the second mixture video data generation unit generates the mixture video data, the first mixture video data generation unit supplies the generated mixture video data to the playback output unit.

The reproducing apparatus may further include a recording medium playback unit configured to reproduce and read information from a removable recording medium, wherein the acquisition unit acquires the playback management information read from the recording medium by the recording medium playback unit.

The reproducing apparatus may further include a storage unit configured to store a variety of units of data, wherein the acquisition unit acquires the playback management information stored on the storage unit.

The reproducing apparatus may further include a recording medium playback unit configured to reproduce and read information from a removable recording medium, wherein the read out unit reads the main stream and the video data read from the recording medium by the recording medium playback unit.

The reproducing apparatus may further include a storage unit configured to store a variety of units of data, wherein the read out unit reads the main stream and the video data stored on the storage unit.

The playback management information acquired by the acquisition unit may contain second information containing a sub playback path of a sub stream file different from a file of the main stream.

In another embodiment of the present invention, one of a reproducing method and a computer program of a reproducing apparatus for reproducing stream data, includes the steps of reading a main stream to be reproduced, based on playback management information containing first information containing a playback path indicating, along time axis, a location of a main stream containing at least one stream, storing video data that is to be reproduced in synchronization with the main stream, based on the playback management information, decoding the stored video data, storing the decoded video data, reproducing the read main stream by referencing a predetermined counter based on the playback management information, and outputting the stored decoded video data in synchronization with playback of the main stream.

In accordance with embodiments of the present invention, the main stream to be reproduced is read based on the playback management information containing the first information containing the playback path indicating, along time axis, the location of the main stream containing at least one stream, the video data that is to be reproduced in synchronization with the main stream is read for storage based on the playback management information, the stored video data is decoded, the decoded video data is stored, the read main stream is reproduced by referencing the predetermined counter based on the playback management information, and the stored decoded video data is output in synchronization with playback of the main stream.

Network refers to a mechanism that allows at least two apparatuses interconnected to each other to convey information from one to the other apparatus. The apparatuses communicating via the network may be independent apparatuses or may be internal blocks forming one apparatus.

Communication refers to wireless communication, wired communication, or a combination of wireless communication and wired communication. In the case of the combination of wireless communication and wired communication, wireless communication may be performed in one area and wired communication may be performed in the other area. Furthermore, wired communication is performed from a first apparatus to a second apparatus, and then wireless communication is performed from the second apparatus to a third apparatus.

The reproducing apparatus may be an independent apparatus or a block performing a playback process in a recording and reproducing apparatus.

In accordance with embodiments of the present invention, stream data is reproduced. In particular, stream data and video data are reproduced in synchronization.

BRIEF DESCRIPTION OF THE DRAWINGS

FIG. 10 illustrates syntax of a manifest file;

FIG. 15 illustrates a definition of a content delivery file format of a content distributed by a content author;

FIG. 17 illustrates animation playback time and animation intervals;

FIG. 18 illustrates control timing and buffer capacity;

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Figures 16, 16A:
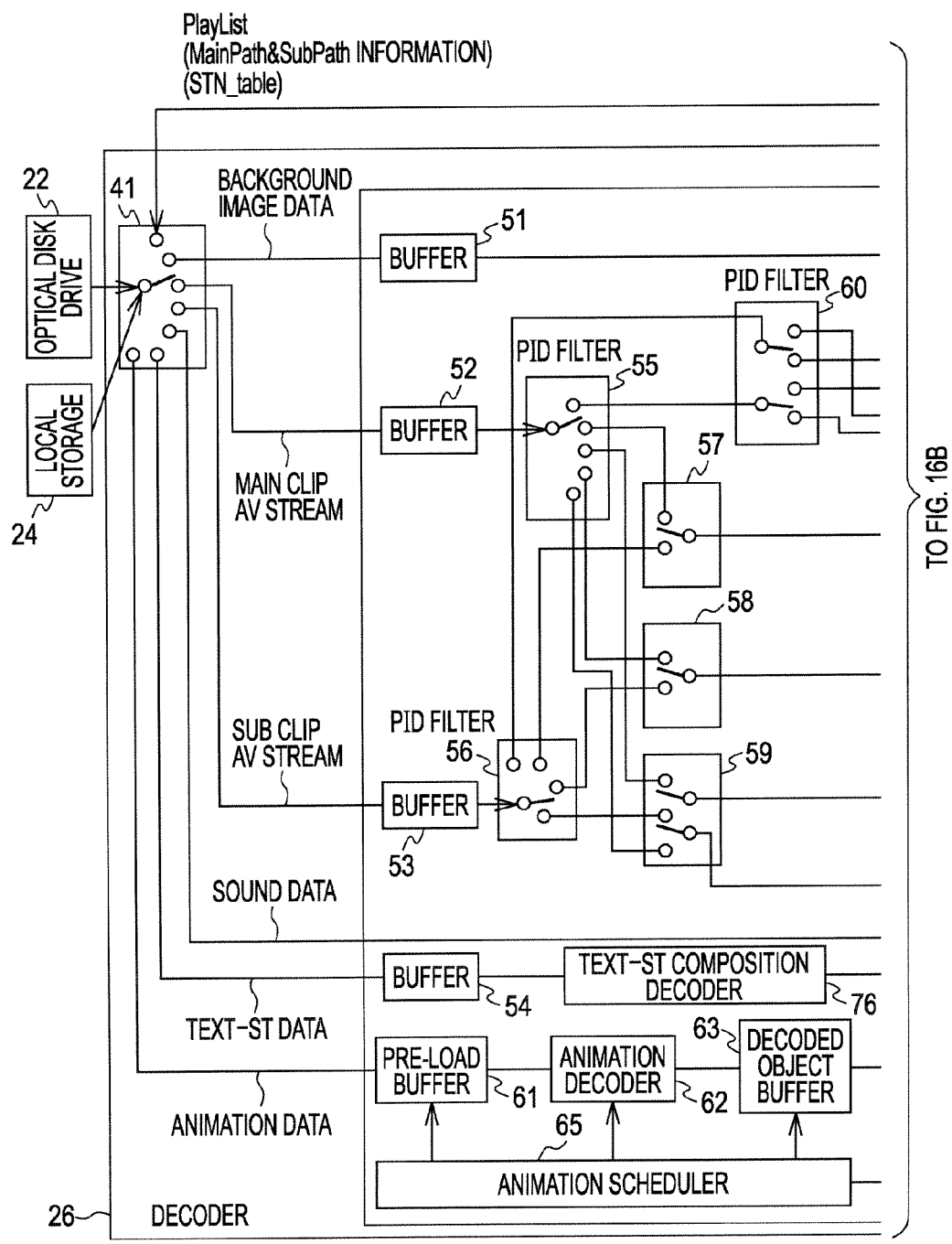
FIG. 16 is a block diagram illustrating a decoder of FIG. 1.

In accordance with one embodiment of the present invention, a reproducing apparatus (for example, reproducing apparatus 1 of FIG. 1) includes an acquisition unit (for example, controller 21 of FIG. 1 or FIG. 16) configured to acquire playback management information (for example, playlist) containing first information containing a main playback path (for example, main path) indicating, along time axis, a location of a main stream (for example, a primary stream) containing at least one stream, a read out unit (for example, switch 41) configured to read the main stream to be reproduced and video data (for example, animation data) that is to be reproduced in synchronization with the main stream, based on the playback management information acquired by the acquisition unit, a first storage unit (for example, pre-load buffer 61 of FIG. 16) configured to store the video data read by the read out unit, a decode unit (for example, animation decoder 62 of FIG. 16) configured to decode the video data stored on the first storage unit, a second storage unit (for example, decoded object buffer 63 of FIG. 16) configured to store the video data decoded by the decode unit, a playback unit (for example, first video decoder 72-1 and video plane generator 92 of FIG. 16) configured to reproduce the main stream read by the read out unit by referencing a predetermined counter (for example, STC counter) based on the playback management information acquired by the acquisition unit, and a video data output unit (for example, composition buffer 64 of FIG. 16) configured to output the decoded video data stored on the second storage unit in synchronization with playback of the main stream by the playback unit.

The reproducing apparatus may further include a control unit (for example, animation scheduler 65 of FIG. 16) configured to control process of the first storage unit, the decode unit, the second storage unit, and the video data output unit by referencing the counter referenced by the playback unit.

The acquisition unit may further acquire control information (for example, a MovieObject file) containing a command for calling an API corresponding to a process performed by the control unit, and when the API is called by executing the command, the control unit controls the process of the first storage unit, the decode unit, the second storage unit, and the video data output unit by referencing the counter referenced by the playback unit.

The reproducing apparatus may further include a mixture video data generation unit (for example, interactive graphics plane generator 94 of FIG. 16) configured to generate mixture video data to be mixed with the main stream reproduced by the playback unit, and a playback output unit (for example, video data processor 96) configured to output the video data that is to be reproduced in response to the supply of the mixture video data to be mixed and generated by the mixture video data generation unit and the supply of the main stream reproduced by the playback unit, wherein the video data output unit outputs the decoded video data to the mixture video data generation unit.

Figure 22:
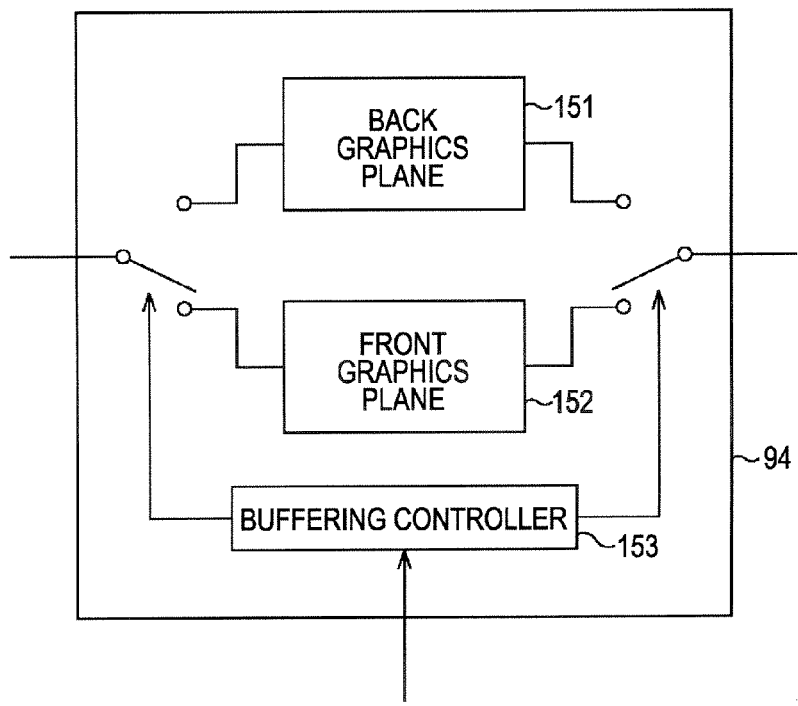
FIG. 22 illustrates an example of double buffering.

The reproducing apparatus may further include at least two mixture video data generation units (for example, back graphics plane 151 and front graphics plane 152 of FIG. 22) wherein while a first mixture video data generation unit generates the mixture video data, a second mixture video data generation unit supplies the generated mixture video data to the playback output unit, and wherein while the second mixture video data generation unit generates the mixture video data, the first mixture video data generation unit supplies the generated mixture video data to the playback output unit.

The reproducing apparatus may further include a recording medium playback unit (for example, optical disk drive 22 of FIG. 1 or FIG. 16) configured to reproduce and read information from a removable recording medium, wherein the acquisition unit acquires the playback management information read from the recording medium by the recording medium playback unit.

The reproducing apparatus may further include a storage unit (for example, local storage 24 of FIG. 1 or FIG. 16) configured to store a variety of units of data, wherein the acquisition unit acquires the playback management information stored on the storage unit.

The reproducing apparatus may further include a recording medium playback unit (for example, optical disk drive 22 of FIG. 1 or FIG. 16) configured to reproduce and read information from a removable recording medium, wherein the read out unit reads the main stream and the video data read from the recording medium by the recording medium playback unit.

The reproducing apparatus may further include a storage unit (for example, local storage 24 of FIG. 1 or FIG. 16) configured to store a variety of units of data, wherein the read out unit reads the main stream and the video data stored on the storage unit.

Figure 25:
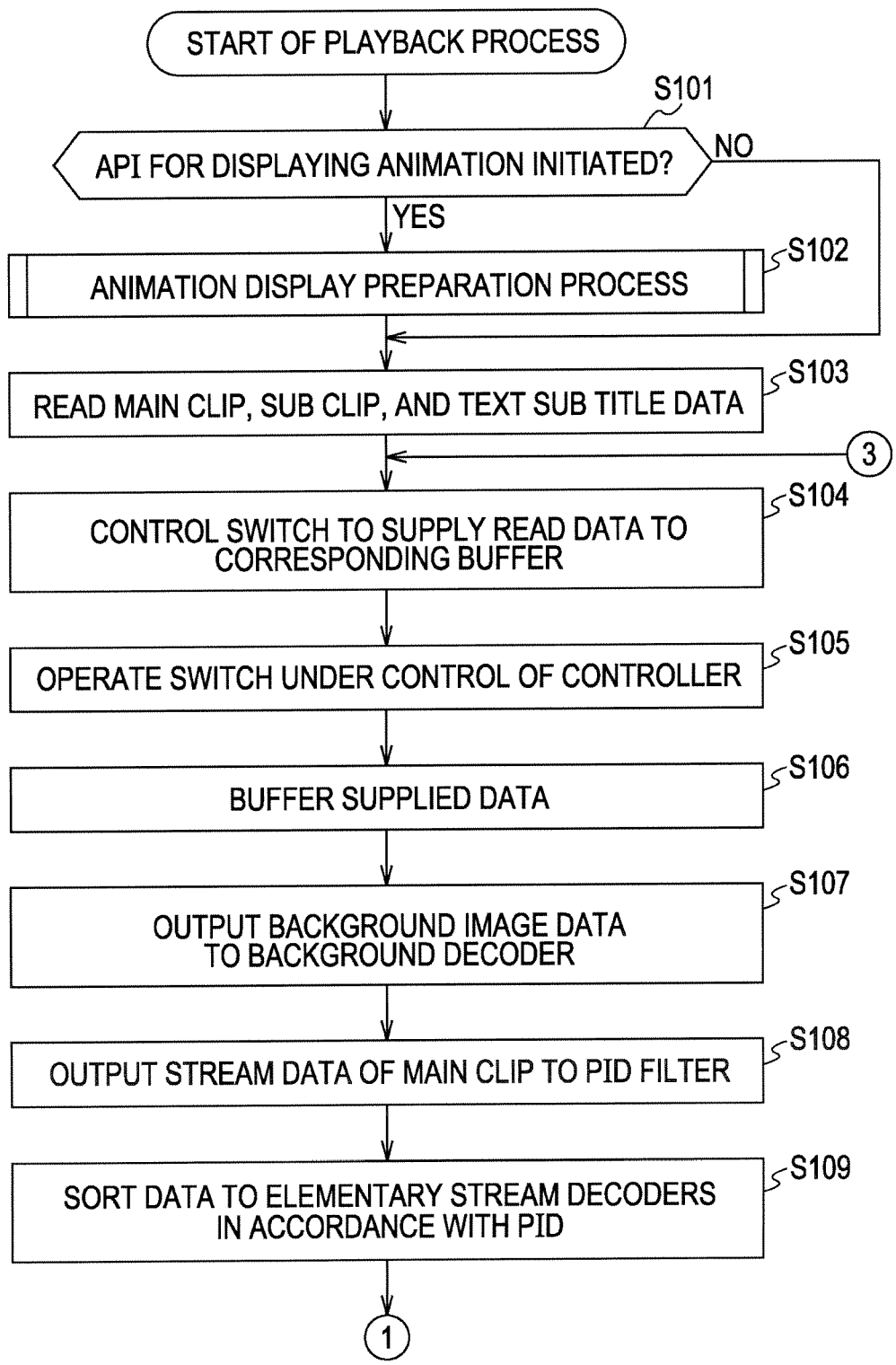
FIG. 25 is a flowchart illustrating a playback process.
Figure 26:
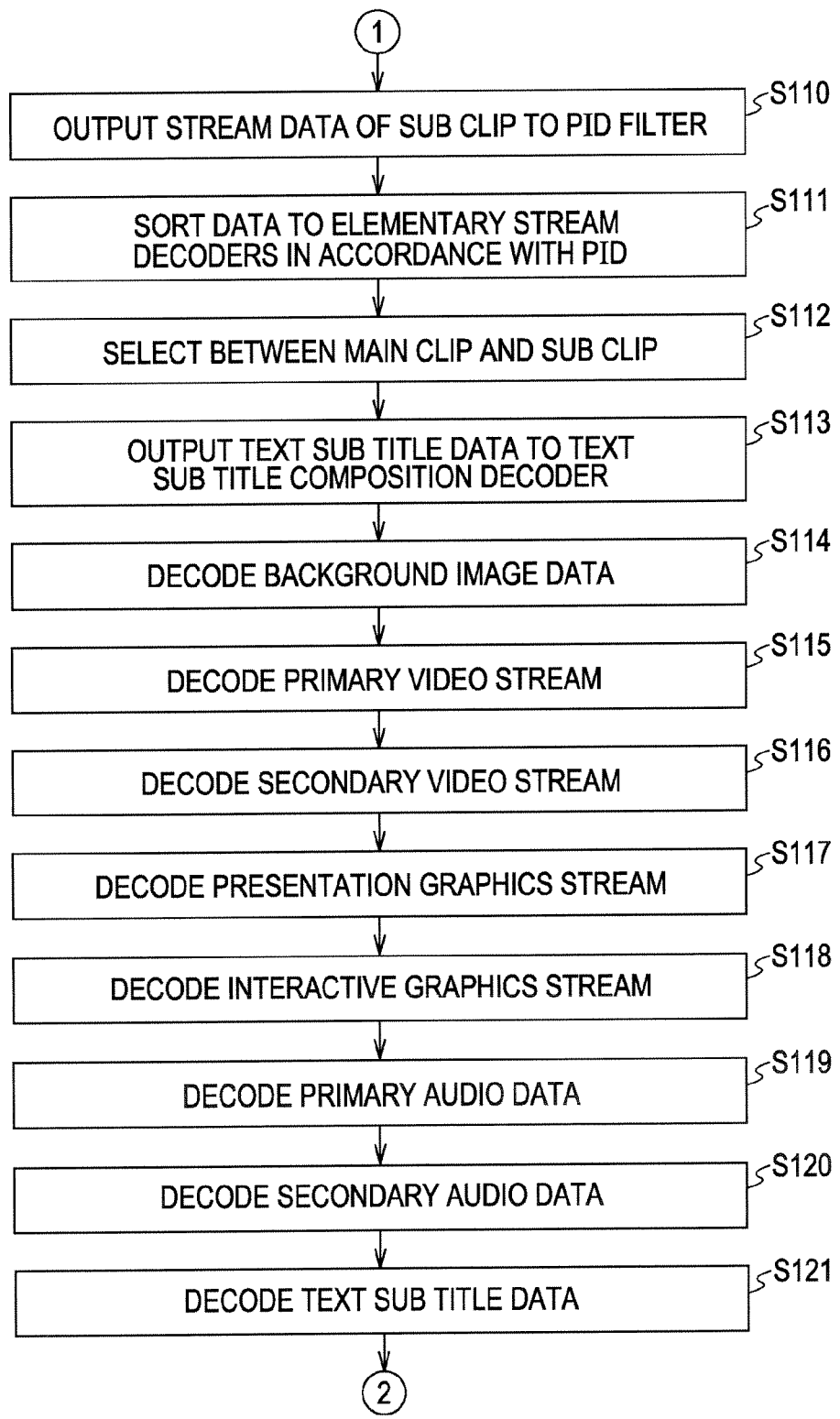
FIG. 26 is a continuation of the flowchart of FIG. 25.
Figure 27:
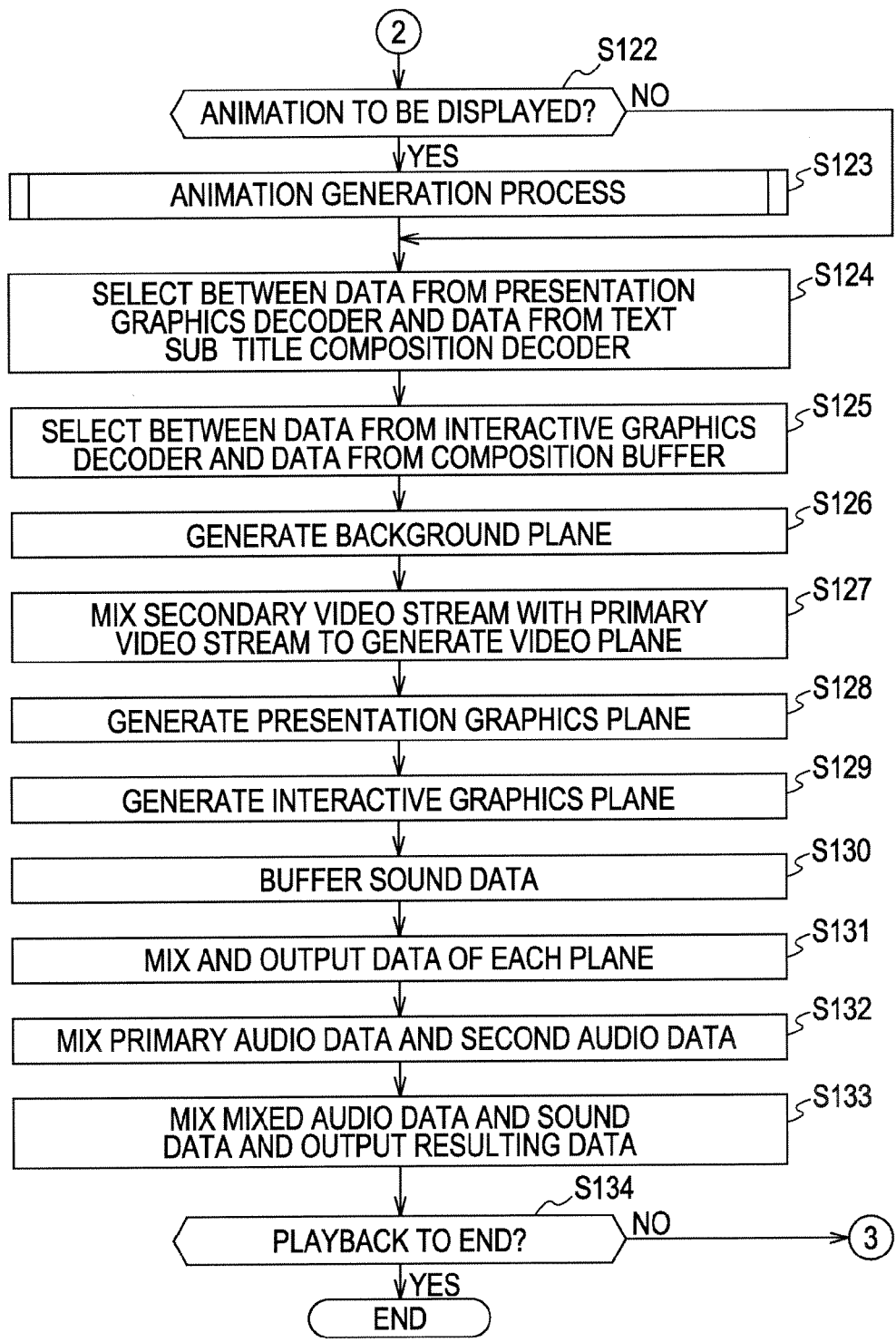
FIG. 27 is a continuation of the flowchart of FIG. 26.

One of a reproducing method of a reproducing apparatus for reproducing stream data, and a computer program for causing a computer to perform a playback process, includes the steps of reading (for example, in a process of step S103 of FIG. 25) a main stream (for example, a primary stream) to be reproduced, based on playback management information (for example, playlist) containing first information containing a playback path (for example, a main path) indicating, along time axis, a location of a main stream containing at least one stream, reading (for example, in a process of step S161 of FIG. 28), for storage, video data (for example, animation data) that is to be reproduced in synchronization with the main stream, based on the playback management information, decoding (for example, in a process of step S162 of FIG. 28) the stored video data, storing (for example, in a process in step S163 of FIG. 28) the decoded video data, reproducing (for example, in a playback process of a primary video stream of FIGS. 25 through 27) the read main stream by referencing a predetermined counter (for example, STC counter) based on the playback management information, and outputting (for example, in a process of step S207 of FIG. 29) the stored decoded video data in synchronization with playback of the main stream.

The embodiments of the present invention are described below with reference to the drawings.

Figure 1:
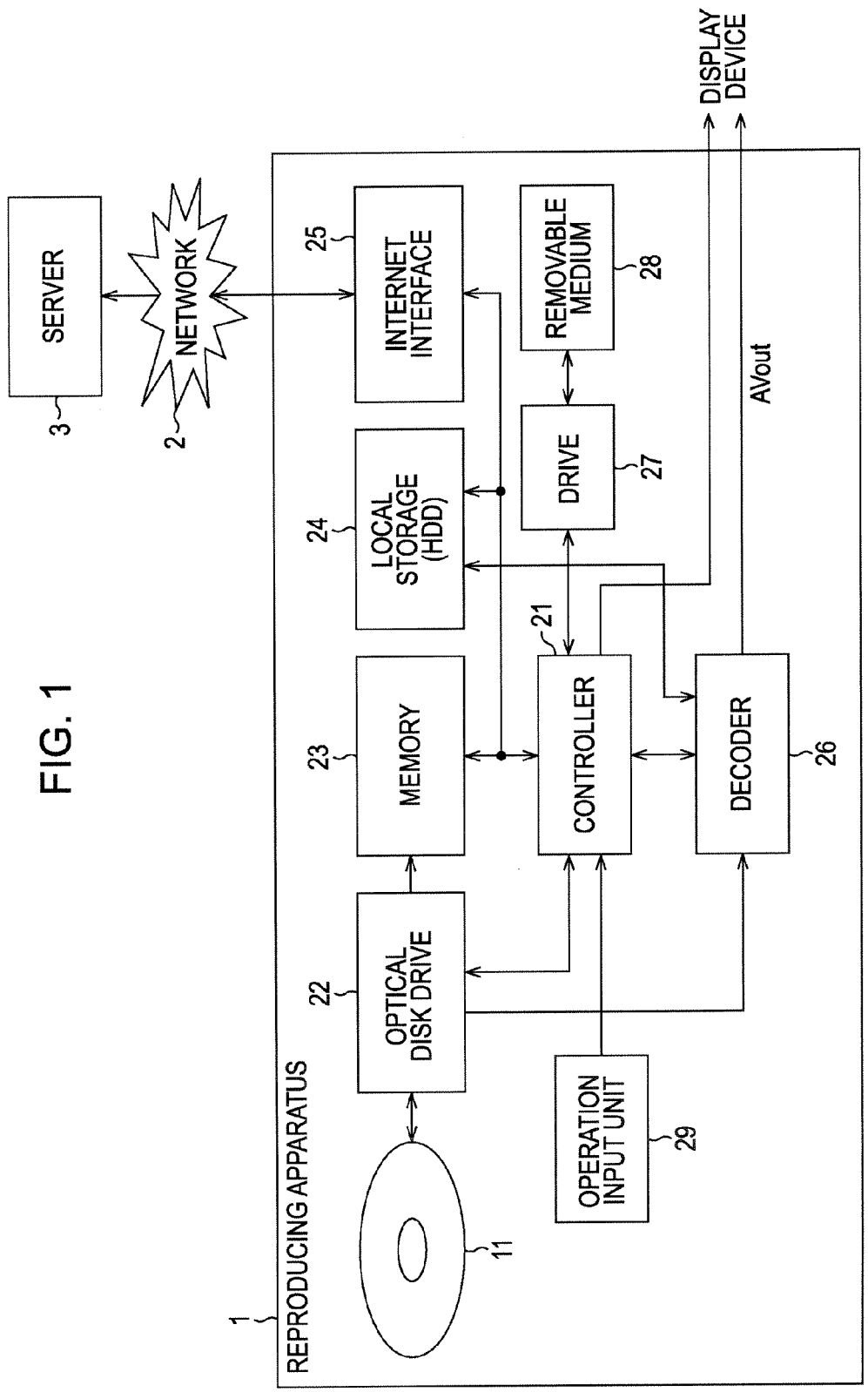
FIG. 1 is a block diagram illustrating a reproducing apparatus in accordance with a first embodiment of the present invention.

FIG. 1 is a block diagram illustrating the reproducing apparatus 1 in accordance with a first embodiment of the present invention.

A controller 21 executes a prepared control program. The controller 21 also reads a navigation program (to be discussed later) recorded on an optical disk 11 by controlling an optical disk drive 22, and expands the navigation program on a memory 23 to execute the navigation program. The controller 21 thus generally controls the reproducing apparatus 1. When the optical disk 11 is loaded, the controller 21 causes a predetermined menu screen to be displayed on an external display device.

Under the control of the controller 21, the optical disk drive 22 reads data from the optical disk 11, and outputs the read data to one of the controller 21, the memory 23, and a decoder 26. If information read from the optical disk 11 by the optical disk drive 22 is one of a navigation program and PlayList, the read information is supplied to one of the controller 21 and the memory 23. If the information read from the optical disk 11 by the optical disk drive 22 is one of an AV stream and text data, the read information is output to the decoder 26.

Figure 2:
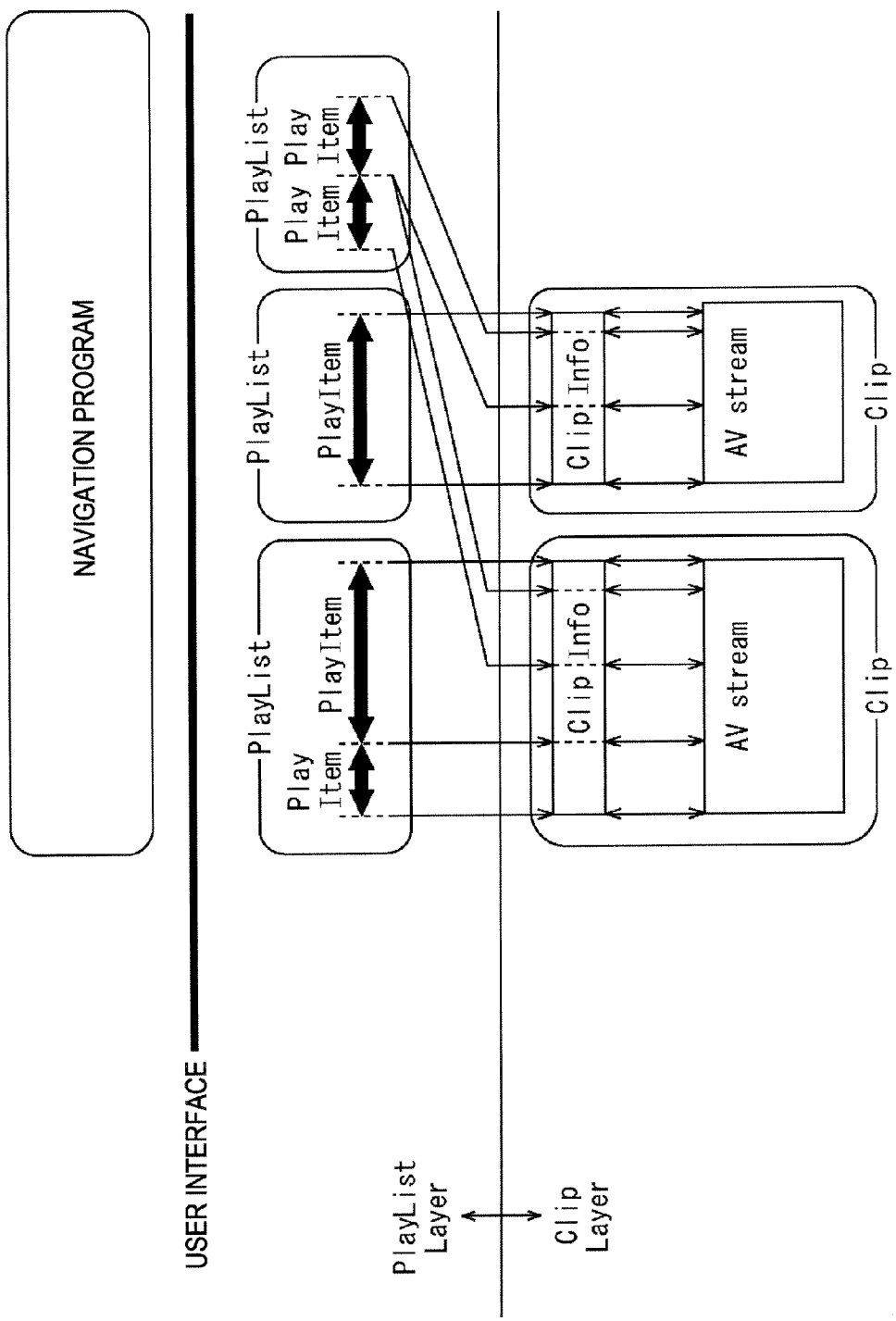
FIG. 2 illustrates an application format on a recording medium to be loaded on the reproducing apparatus of the first embodiment of the present invention.

FIG. 2 illustrates an application format of the optical disk 11 loaded on the reproducing apparatus 1 of the embodiment of the present invention. The recording medium is the optical disk 11 herein. Alternatively, the recording medium can be a magnetic disk, a semiconductor memory or the like.

The application format contains two layers of PlayList and Clip for managing an AV (audio-visual) stream. A pair of one AV stream or text data and clip information accompanying the AV stream or the text data is handled as one object and referred to as a clip. A data file of the AV stream is referred to as an AV stream file. A data file of the clip information is referred to as a clip information file.

Files used by computers are generally handled as byte strings. A content of an AV stream file is expanded along time axis, and an access point of the clip is typically specified by a timestamp in PlayList.

When the access point in the clip is specified by a timestamp in the PlayList, the clip information file is used to find, from the timestamp, address information at which decoding of the AV stream file is to be started.

The PlayList is a set of information indicating a playback period of the AV stream. Information indicating one playback period in the AV stream is referred to as PlayItem. PlayItem is represented by a pair of an IN point (playback start point) and an OUT point (playback end point) of the playback period along time axis. PlayList is composed at least one PlayItem as shown in FIG. 2.

As shown in FIG. 2, a first PlayList shown on the leftmost portion is composed of two PlayItems. The two PlayItems reference a first portion and a second portion of the AV stream contained in a first clip on the leftmost portion. A second PlayList from the left is composed of a single PlayItem. The PlayItem references the entire second clip shown on the right side. A third PlayList shown on a third position from the left is composed of two PlayItems. The two PlayItems reference a predetermined portion of the AV stream contained in the first clip and a predetermined portion of the AV stream contained in the second clip shown on the right side.

Navigation program is a program for causing the controller 21 to control the order of playback of PlayList and interactive playback of the PlayList. The navigation program has also a function to display a menus screen on which a user enters a command to execute playback. The navigation program is described in programming language such as Java (registered trademark), and recorded on a recording medium such as the optical disk 11. The controller 21 now executes the navigation program. If the first PlayItem contained in the first PlayList shown on the leftmost portion of FIG. 2 is specified as information indicating a playback position, the first portion of the AV stream contained in the first clip shown on the leftmost portion, referenced by the first PlayItem, is reproduced.

Figure 3:
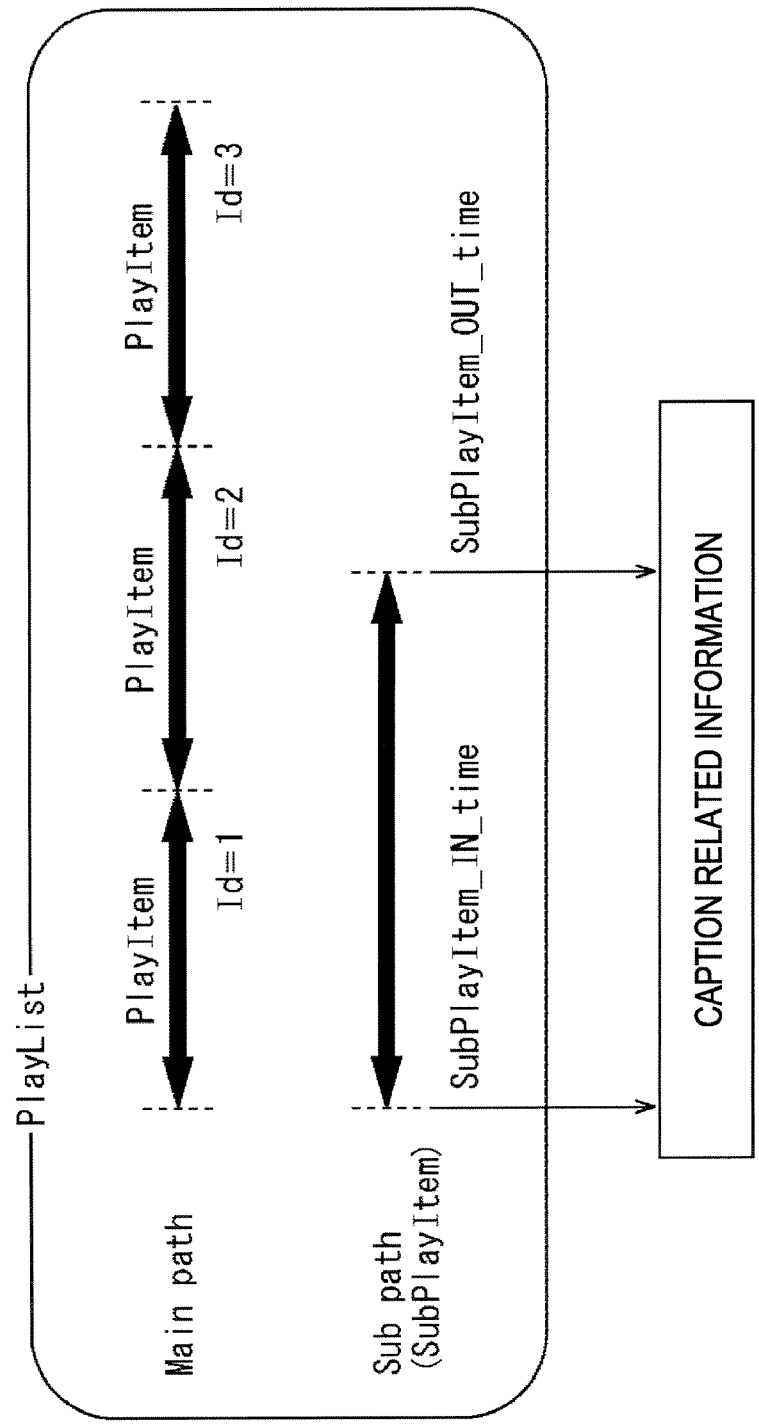
FIG. 3 illustrates another example of the application format on the recording medium to be loaded on the reproducing apparatus.

In addition to a main path specified by the PlayItem, sub path information specified by a sub play item of FIG. 3 can be contained in the PlayList of FIG. 2. With the SubPlayItem defined, a separate data stream not multiplexed with a clip (such as an MPEG 2 transport stream) specified by PlayItem can be reproduced in synchronization with the AV stream.

Caption-related information including a caption text file and a font file required for rendering and SubPlayItem specifying a playback period of the caption-related information are prepared in association with a clip AV stream of the main path specified by PlayItem. The clip AV stream is reproduced while a caption corresponding to data described in the caption text file is displayed on a display device in a display font based on the font data written in the font file. For example, dubbed-in voice data of a different language and SubPlayItem corresponding to the dubbed-in voice data are prepared in association with the clip AV stream of the main path specified by PlayItem. The clip AV stream is thus reproduced while the dubbed-in voice data of the different language is reproduced and output at the same time.

The SubPlayItem and the corresponding data (clip) may be recorded on the optical disk 11 or may be downloaded from the server 3 via the network 2 as additional data (update data) or may be acquired in a removable medium (such as a removable medium 28 to be discussed later). A method of downloading the additional data from the server 3 will be described in detail later with reference to FIG. 4.

Returning to FIG. 1, the apparatus is further described.

The memory 23 stores data the controller 21 requires to execute a variety of processes. A local storage 24 is an HDD (hard disk drive), for example.

An Internet interface 25 is connected to the network 2 in a wired fashion or a wireless fashion. Under the control of the controller 21, the Internet interface 25 communicates with the server 3 via the network 2, and supplies data downloaded from the server 3 to the local storage 24. The server 3 downloads a content that updates the data discussed with reference to FIG. 2 and recorded on the optical disk 11 loaded on the reproducing apparatus 1. The local storage 24 records the content downloaded from the server 3 via the network 2.

The decoder 26 decodes the AV stream or text data, supplied from one of the optical disk drive 22 and the local storage 24, and outputs the resulting video signal and audio signal to the external display device. In response to the decoded signals from the decoder 26, the display device outputs the content of the optical disk 11 (i.e., displaying a video and outputting an audio).

The operation input unit 29 includes an input device including buttons, keys, touchpanel, jogdial, and the like, and a receiver receiving an infrared signal transmitted from a predetermined remote commander. The operation input unit 29 receives an operation input from a user, and supplies the operation input to the controller 21.

The controller 21 is connected to the drive 27, as necessary. A removable medium 28 is loaded on the drive 27. The removable medium 28 may include one of a magnetic disk (including a floppy disk), an optical disk (such as compact disk read-only memory (CD-ROM), or DVD), a magneto-optical disk such as Mini-Disk (MD (registered trademark)), and a semiconductor memory.

Data recorded on the optical disk 11 loaded on the reproducing apparatus 1 and data stored on the local storage 24 are reproduced as described below.

The reproducing apparatus 1 includes the local storage 24 such as HDD (Hard Disk Drive). The reproducing apparatus 1, connected to the network 2 in a wired fashion or a wireless fashion, stores on the local storage 24 the content downloaded from the server 3 via the network 2. The server 3 downloads the data that updates the content, such as a movie, recorded on the optical disk 11 loaded on the reproducing apparatus 1.

When the operation input unit 29 is commanded to reproduce the content recorded on the optical disk 11 with the downloaded content recorded on the local storage 24, the controller 21 associates the content recorded on the optical disk 11 with the content recorded on the local storage 24, and performs a playback process of the content.

The content on the optical disk 11 and the content on the local storage 24 are reproduced in association with each other as described with reference to FIG. 4.

For example, the optical disk 11 of FIG. 1 may be a medium sold in package, and record a movie content. Only an English caption text file, for example, may be recorded on the optical disk 11 as a caption data file that can be displayed superimposed on the video of the movie content.

Figure 4:
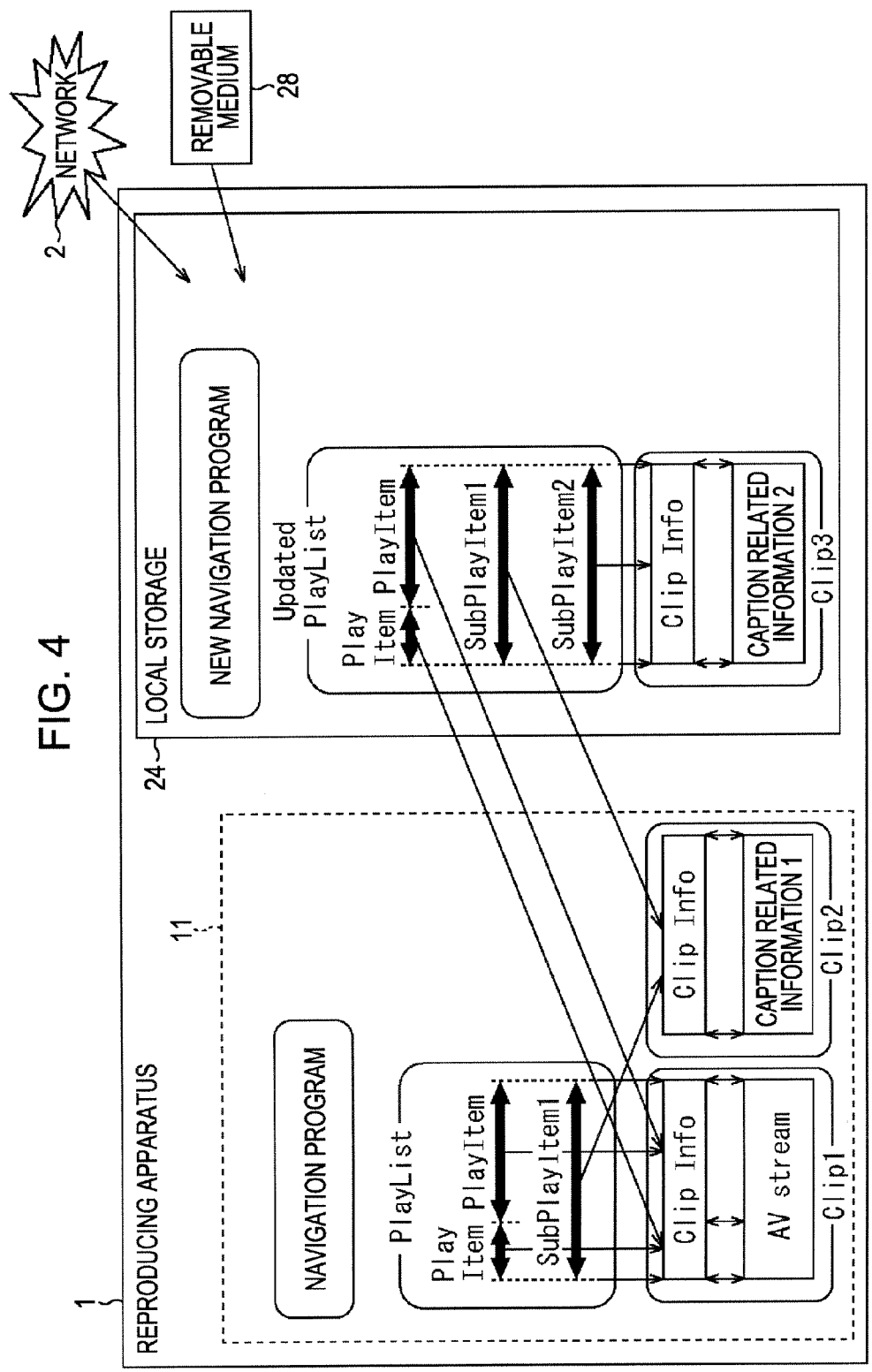
FIG. 4 illustrates a status of the reproducing apparatus on which a file has been downloaded.

The AV stream of clip 1 recorded on the optical disk 11 and referenced by the PlayItem of the PlayList, as shown in FIG. 4, is a stream for displaying the video of the movie content and reproducing the corresponding audio. Caption-related information 1 of Clip 2 referenced by the SubPlayItem of the PlayList is a caption text file for displaying an English caption to be superimposed on the video.

A user, for example, might want to view the movie content recorded on the optical disk 11 with a caption of a language different from English. The optical disk 11 has no recorded caption of the language different from English. In this condition, the user cannot view the movie with the caption data of the language different from English.

The user then downloads a caption text file of the desired language of the movie recorded on the optical disk 11 from the server 3 via the network 2 (or retrieves the caption text file from the removable medium 28). The caption text file of Arabic, for example, might be downloaded (or copied from the removable medium 28 to the local storage 24).

When the user issues an instruction to download the caption text file of Arabic corresponding to the PlayList pre-recorded on the optical disk 11, the reproducing apparatus 1 accesses the server 3 and then downloads a file prepared on the server 3 for updating the content recorded on the optical disk 11.

With reference to FIG. 4, there are shown clip 3 composed of an Arabic caption text file (caption-related information 2) and a clip information file attached thereto, a PlayList file (updated PlayList file) enabled to control playback and displaying of caption data of clip 3 in addition to the video clip and the audio clip (AV stream data), and the English caption text file pre-recorded on the optical disk 11, and a new navigation program file updated from the navigation program file stored on the optical disk 11. These pieces of information are downloaded and stored on the local storage 24.

The updated PlayList includes SubPlayItem 1 and SubPlayItem 2, each representing a sub path, in addition to PlayItem representing a main path. The PlayItem of the updated PlayList is used to reference clip 1 containing the AV stream recorded on the optical disk 11. SubPlayItem 1 is used to reference clip 2 containing caption-related information 1 recorded on the optical disk 11. SubPlayItem 2 is used to reference clip 3, downloaded from the server 3 together with the updated PlayList, containing caption-related information 2 as the Arabic caption text file.

The new navigation program file of FIG. 4 specifies one of SubPlayItem 1 and SubPlayItem 2 together with PlayItem of the updated PlayList as a playback period. A desired video is associated with audio data. With this arrangement, the user can display one of the English caption defined by the English caption text file pre-recorded on the optical disk 11 and the Arabic caption defined by the Arabic caption text file not pre-recoded on the optical disk 11, whichever is desired.

When downloading from the server 3 (copying from the removable medium 28) is performed, the reproducing apparatus 1 can reproduce and display any of clip 2 as the English caption text file and clip 3 as the Arabic caption text file not pre-recoded on the optical disk 11. More specifically, the user selects a desired language from caption languages displayable on a menu screen presented on the display device. The user can thus view the movie on any of English caption and Arabic caption.

Figure 5:
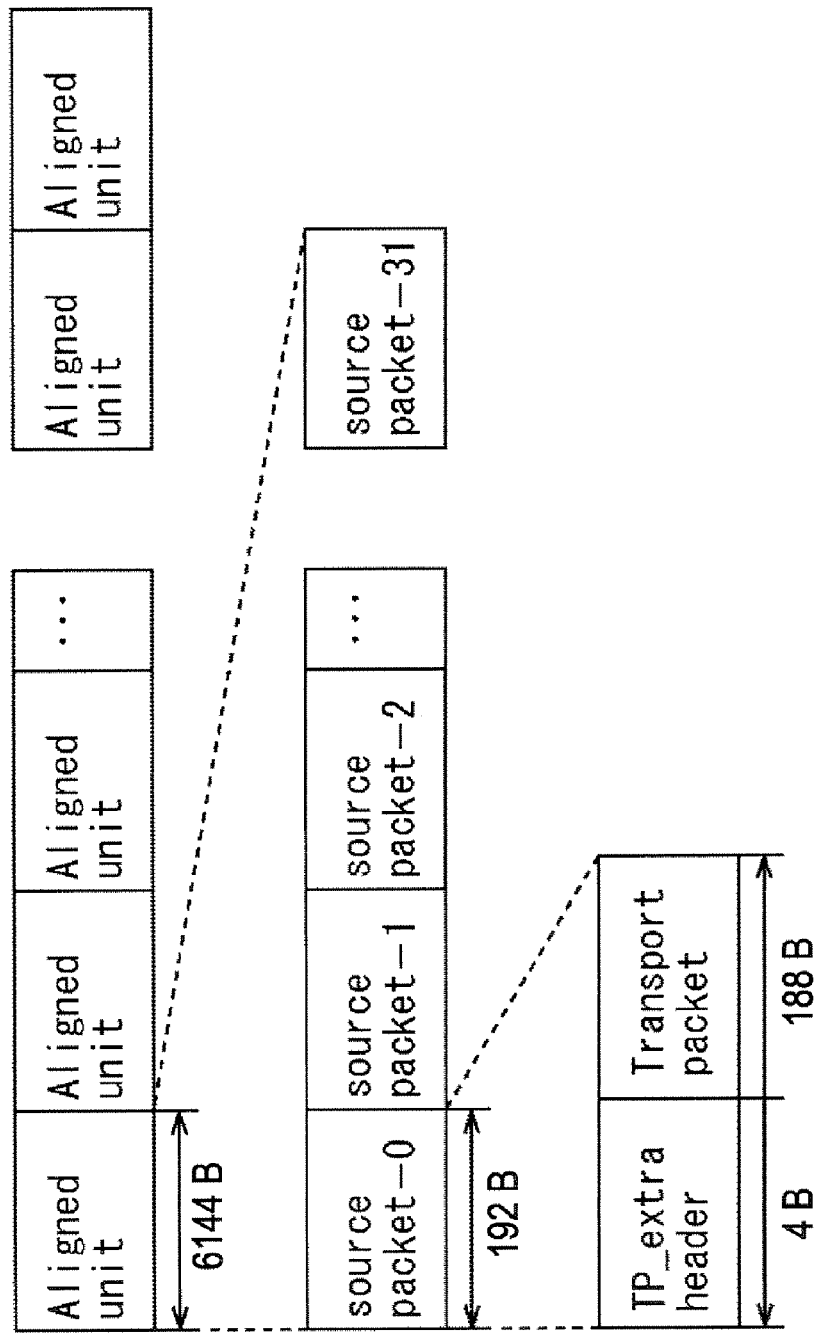
FIG. 5 illustrates an AV stream.

The AV stream recorded on the optical disk 11 includes a moving picture experts group (MPEG) 2 transport stream as shown in FIG. 5. Each MPEG 2 transport stream contains an integer number of aligned units. The aligned unit has a size of 6144 bytes (2048x3 bytes), and starts with a first byte of a source packet. The source packet is 192 bytes long. One source packet contains TP_extra_header and a transport packet. TP_extra_header is 4 bytes long, and the transport packet is 188 bytes long. One aligned unit is composed of 32 source packets. Data of a video stream or an audio stream is packetized into MPEG 2 PES (packetized elementary stream), and a PES packet is packetized into transport packets.

Figure 6:
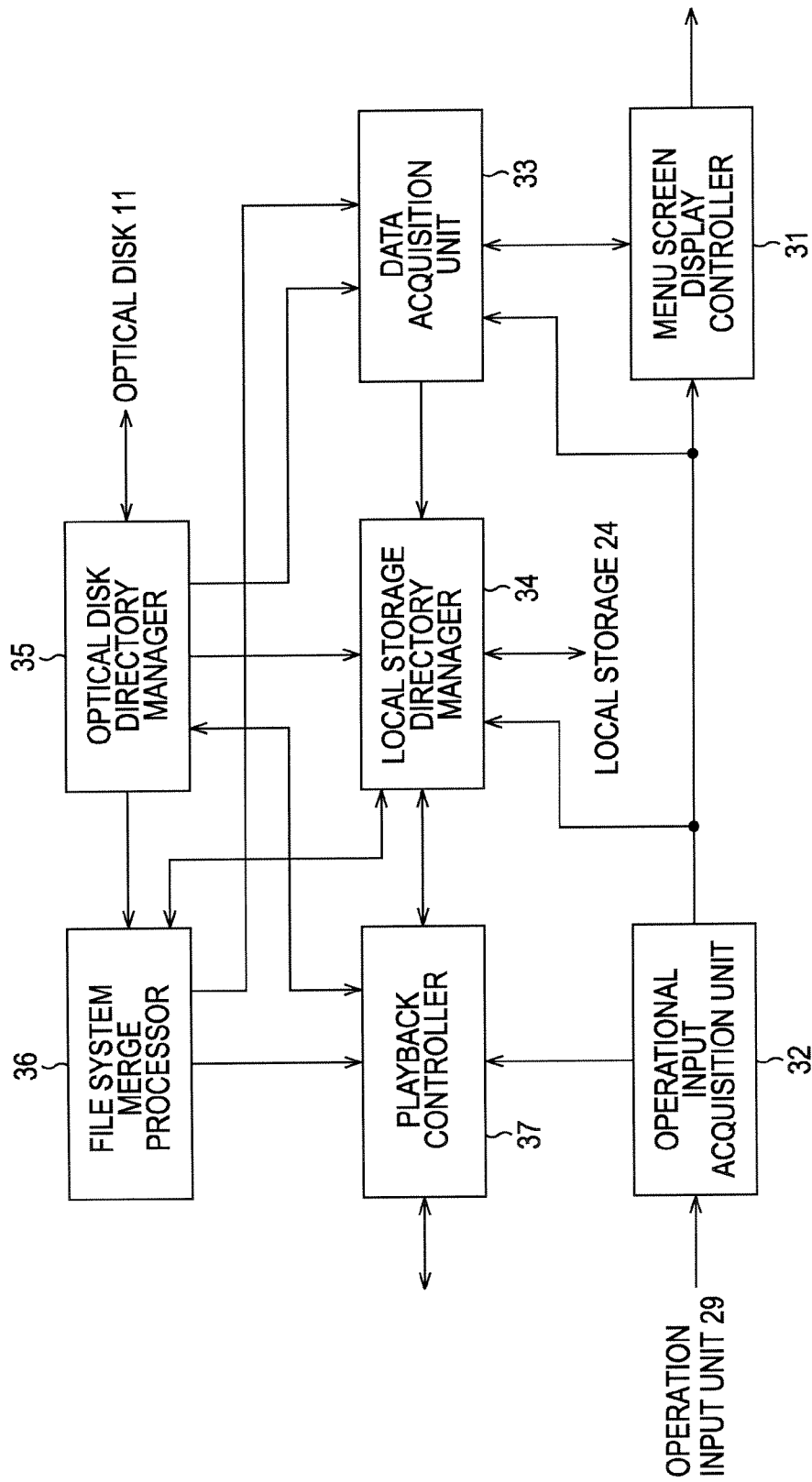
FIG. 6 is a functional block diagram illustrating a function of a controller of FIG. 1.

FIG. 6 is a functional block diagram illustrating the controller 21 of FIG. 1.

The functions of FIG. 6 are executed when the controller 21 performs a prepared control program or when the controller 21 performs a navigation program recorded on the optical disk 11.

A menu screen display controller 31 causes the external display device to display a menu screen. The menu screen shows buttons operated for the user to select the audio of the content recorded on the optical disk 11, the language of the caption, the angle of the video, and buttons operated for the user to select an update file to be downloaded, and a file to be deleted.

An operation input acquisition unit 32 acquires a signal indicating a operation input entered by the user via the operation input unit 29, and outputs the signal indicating the user operation input to any corresponding one of the menu screen display controller 31, a data acquisition unit 33, a local storage directory manager 34, and a playback controller 37.

The data acquisition unit 33 controls communications performed on the Internet interface 25 of FIG. 1 and information exchange with the removable medium 28 on the drive 27. For example, the data acquisition unit 33 downloads the update file indicated by the user from the server 3, and outputs the acquired file to the local storage directory manager 34. Upon receiving information indicating a required file from a file system merge processor 36 to be discussed later, the data acquisition unit 33 acquires the required file from the server 3 through downloading, and outputs the acquired file to the local storage directory manager 34.

The local storage directory manager 34 manages directories on the local storage 24, controls writing of data onto the local storage 24, reading of data from the local storage 24 and deleting of data from the local storage 24. The PlayList, read from the local storage 24 under the control of the local storage directory manager 34, is output to the memory 23. The audio data and the video data of the AV stream, and text data of the caption text file, read from the local storage 24, are output to the decoder 26. When the file system merge processor 36 merges a file system on the optical disk 11 with a file system on the local storage 24, the local storage directory manager 34 outputs information relating to the file system on the local storage 24 to the file system merge processor 36.

The optical disk directory manager 35 manages directories of the optical disk 11, and controls reading of data from the optical disk 11. The optical disk 11 has author_id and disc_id as identification information set thereon. The identification information author_id and disc_id read from the optical disk 11 under the control of the optical disk directory manager 35 are supplied to the data acquisition unit 33 and the local storage directory manager 34. The PlayList, read from the optical disk 11 under the control of the optical disk directory manager 35, is output to the memory 23. The audio data and the video data of the AV stream and the text data of the caption text file, read from the optical disk 11, are output to the decoder 26. When the file system merge processor 36 merges the file system on the optical disk 11 with the file system on the local storage 24, the optical disk directory manager 35 outputs information relating to the file system on the optical disk 11 to the file system merge processor 36. The identification information author_id and disc_id will be described later.

The file system merge processor 36 merges the file system on the optical disk 11 supplied from the optical disk directory manager 35 and the file system on the local storage 24 supplied from the local storage directory manager 34, thereby creating a single virtual file system. The file system merge processor 36 outputs the created virtual file system to the playback controller 37.

In a process to be discussed later, the file system merge processor 36 determines whether a deletion of several files recorded on the local storage 24 can cause a malfunction in a link structure of files in the virtual file system (in the link structure, data is linked to reproduce the clip in accordance with the PlayList based on an application format of the optical disk 11 as discussed with reference to FIGS. 2 through 4). If the file system merge processor 36 determines that a malfunction can take place in the link structure of the files in the virtual file system, a file required to correct the malfunction is extracted. Information regarding the required file is supplied to the data acquisition unit 33. The required file can be downloaded as necessary.

When several files are deleted from the local storage 24, a file that cannot be reproduced in accordance with any PlayList in the virtual file system (i.e., cannot be specified by any of PlayLists) occurs. In the process to be discussed later, the file system merge processor 36 commands the local storage directory manager 34 to delete such an unnecessary file.

Whether or not to delete the unnecessary file caused in response to the deletion of files may be set by the user.

The playback controller 37 executes the navigation program specified by the virtual file system supplied from the file system merge processor 36, and controls playback of content. More specifically, the playback controller 37 references the PlayList supplied to and stored on the memory 23, and controls the local storage directory manager 34 and the optical disk directory manager 35 to read the audio data and the video data of the AV stream and, as necessary, the text data of the caption text file from the optical disk 11 and the local storage 24 based on the virtual file system. The playback controller 37 controls the decoder 26 of FIG. 1 to decode (reproduce) the audio data and the video data of the AV stream and, as necessary, the text data of the caption text file stored on one of the optical disk 11 and the local storage 24.

The file system merge processor 36 merges the file system on the optical disk 11 with the file system for managing a data group that is downloaded from the server 3 and recorded on the local storage 24. The merging operation is performed when the optical disk 11 is loaded on the reproducing apparatus 1, when the playback of a content recorded on the reproducing apparatus 1 is requested, when inputting or outputting of any data recorded on one of the optical disk 11 and the local storage 24 is requested, or when the user issues a command to perform the merging operation.

Figure 7:
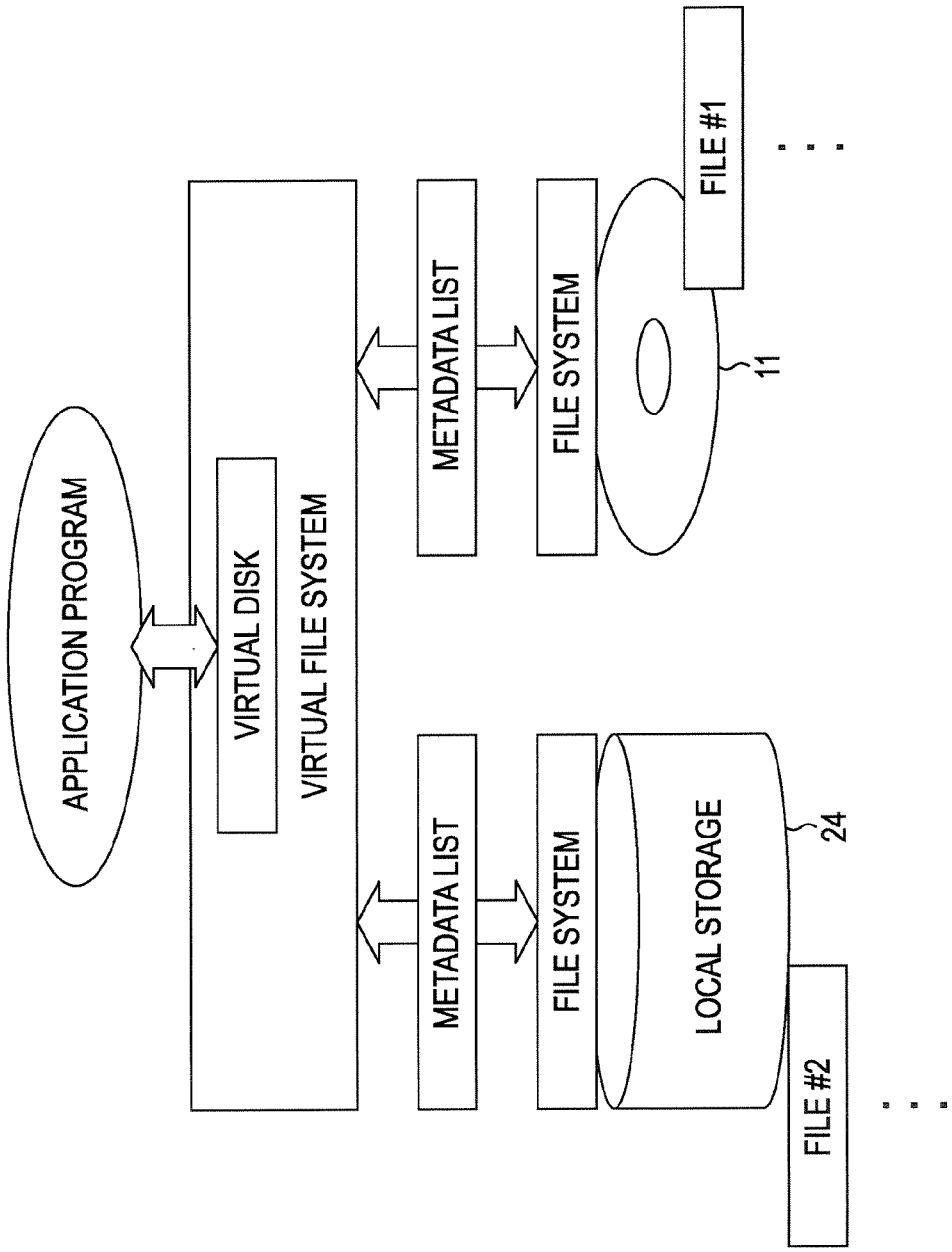
FIG. 7 illustrates a virtual file system.

A virtual file system is defined as an upper layer of a native file system of the system of the reproducing apparatus 1 (i.e., the file system of the data actually recorded on one of the optical disk 11 and the local storage 24). More specifically, as shown in FIG. 7, an application program and a user handling the application program can recognize only the virtual file system as an upper layer. The application program causes the local storage 24 to record new data by downloading the new data from the server 3, and reproduces the data actually stored on one of the optical disk 11 and the local storage 24. The virtual file system abstracts the native file system, thereby hiding a native structure such as a physical device and an operating system in the reproducing apparatus 1.

The main functions of the virtual file system include mounting a file/directory on a physical device (such as the optical disk 11 or the local storage 24) to create a file system of a virtual disk recognized by the user, and supplying a file access application programming interface (API) to the created virtual disk.

Figure 8:
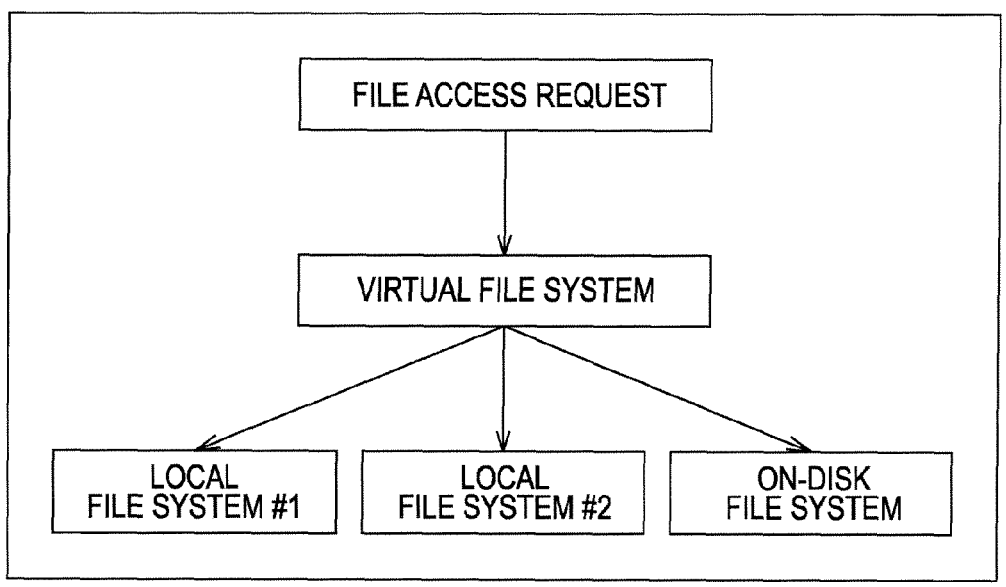
FIG. 8 illustrates the virtual file system.

When the user enters an operation input requesting an access to any file recorded on one of the optical disk 11 and the local storage 24, the application program of FIG. 8 can recognize only the virtual file system. A local file system #1, and a local file system #2 recorded on one of the optical disk 11 and the local storage 24 and the structure of the file system of the optical disk 11 are hidden from the application program and the user handling the application program, and can be accessed via the virtual file system.

To perform a file access request of FIG. 8, the application program of the reproducing apparatus 1 calls an API (Application Programming Interface) for file input and output provided by the virtual file system, and then accesses the data stored on one of the optical disk 11 and the local storage 24 without being aware of the physical structure of the disk drive and the software structure of the file system. More specifically, the API of the virtual file system calls, in practice, API of the native file system within the reproducing apparatus 1.

The virtual file system provides a variety of types of APIs. For example, the virtual file system provides an open API ( ) for opening a specified file, a close ( ) API for closing a specified file, a seek ( ) API for setting a reading position or writing position of a specified file, a stat ( ) API for acquiring status of a specified file, a read ( ) API for reading a specified file, a write ( ) API for writing a specified file, etc. The application program executed by the playback controller 37 manipulates the files stored on one of the optical disk 11 and the local storage 24 using these APIs.

Figure 9:
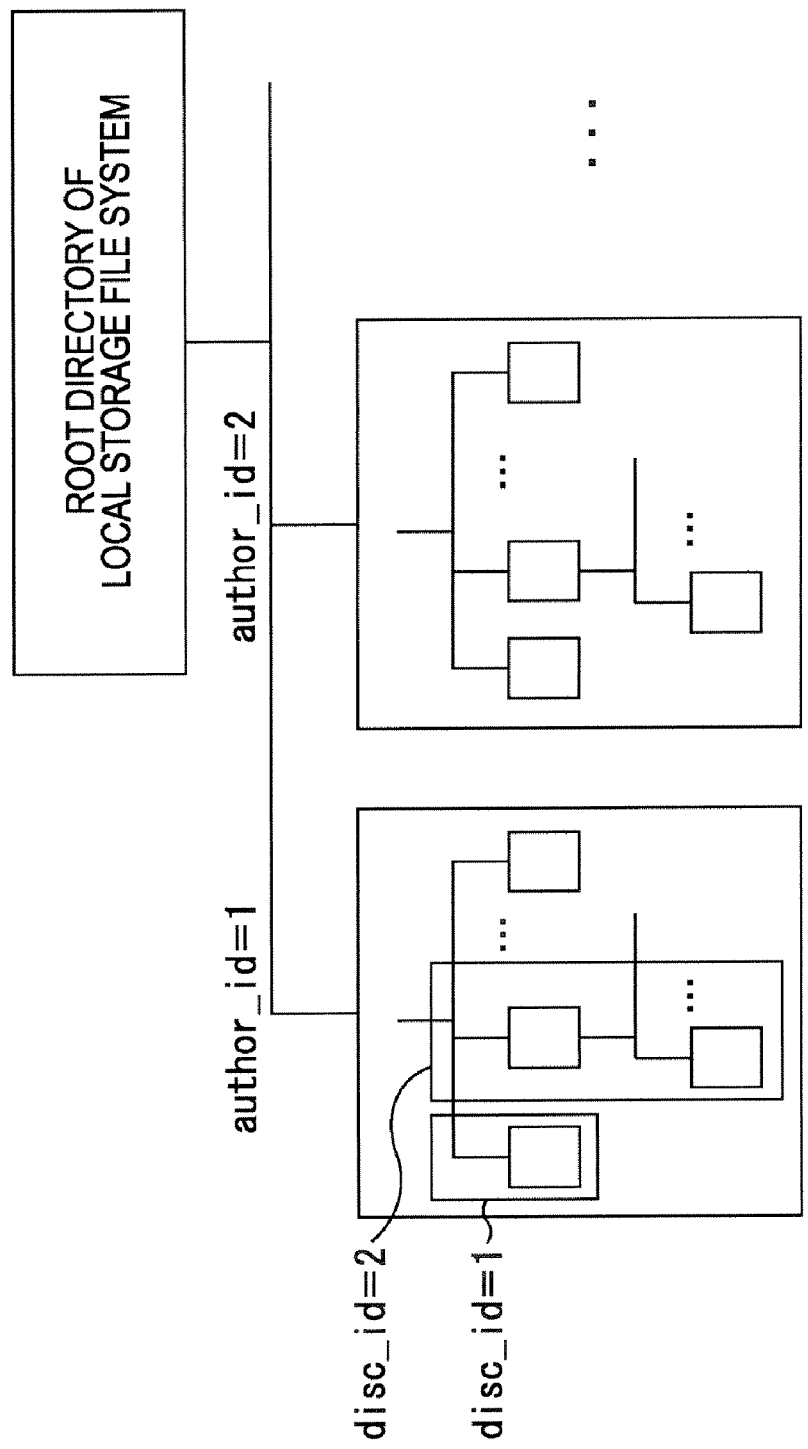
FIG. 9 illustrates a directory structure of a local storage.

The virtual file system has a function of dividing and managing a disk area of the local storage 24. As shown in FIG. 9, the disk area of the local storage 24 has a directory structure in which the disk area is divided into divisions for suppliers of contents (content authors) on a per supplier basis. Directories disc_id immediately under author_id are flexibly configured in a file/directory structure by a content author. A description of metadata (manifest data to be discussed later) contained in the downloaded data defines where to place data on the local storage 24, i.e., defines the file/directory structure of the downloaded file.

In the file/directory structure of the local storage 24, author_id dividing the directory is an identifier uniquely identifying an entity managing the metadata (manifest data to be discussed later) contained in the downloaded data. More specifically, the author_id identifier uniquely identifies an entity including a content producer, a motion picture company, or a group including a plurality of content producers and motion picture companies. An identifier disc_id uniquely identifies the optical disk 11 provided by the content producer identified by the author_id identifier. These identifiers are contained in the metadata of the downloaded data. The metadata (manifest data) and the author_id and disc_id identifiers will be described later.

The file/directory structure of the virtual disk accessible by the application is compatible with the file/directory structure of the optical disk 11. More specifically, the data file structure under the author_id and disc_id identifiers is merged with the data file structure of the optical disk 11. The virtual file system of the virtual disk having file/directory structure compatible with the file/directory structure of the optical disk 11 is thus configured.

The virtual file system also has a function of managing manifest files to be discussed later in addition to the directory and file management function. The purpose of the virtual file system of defining fields of the metadata to a file model of a native file system is three fold, i.e., to display a name representing a content rather than displaying a path or a name of a file of the local storage 24, to prevent double updating of the same file in a download process, and to define a path name in the virtual file system, namely, a path name during playback of the optical disk 11.

The virtual file system provides two functions in metadata management, namely, operation of a manifest file and operation of metadata. The manifest file is metadata representing a variety of attributes of the downloaded files. Manifest ( ) may be stored in a corresponding file or may be merged with one file with a manifest_id identifier (to be discussed later with reference to FIG. 10) of a manifest ( ) section used as a key for identification. In either case, the file is referred to as a manifest file. The reproducing apparatus 1 storing the file downloaded to the local storage 24 must also store a manifest file. The manifest file may be described in mark-up language text such as XML.

FIG. 10 illustrates a syntax of the manifest file.

The manifest_id identifier is an identifier of the manifest ( ) section.

An author_id field specifies an entity managing the manifest file. More specifically, the author_id field specifies an identifier uniquely identifies a content producer, a motion picture company, or a group including a plurality of content producers and motion picture companies. The identifier is determined by referencing the author_id field of a content distribution file to be discussed later with reference to FIG. 15. The application program or the user can freely set any value to this field.

A disc_id field is used to specify an identifier uniquely identifying the optical disk 11 to the content producer identified by the author_id identifier. The identifier is determined by referencing the disc_id field of the content distribution file to be discussed later with reference to FIG. 15. The application program or the user can freely set any value to this field.

A version field is used by a content author to manage history. History number is within an integer range from 1 to 255, and the larger the number, the newer the content is. The identifier is determined by referencing the version field of the content distribution file to be discussed with reference to FIG. 15. Neither the application program nor the user can set freely a value to this field.

In a display_name field, a name easily recognizable to the user is defined here. More specifically, a character string such as "Japanese caption of title XXX", which could be difficult to imagine from a file name alone, is set in the display_name field. The character string is coded in accordance with ISO/IEC 10646-1 Standard.

In a source field, information indicating a source of a file is described. The value in this field is coded in accordance with ISO/IEC 646 Standard. In the case of network downloading, a URL of a download source is described.

A permission field is used for the content author to specify whether to set approval information as a visible attribute or an invisible attribute. If 0x00 is written in an eight-bit permission field, the attribute of a file of metadata is invisible to the user. If 0x01 is written in the eight-bit permission field, the attribute of a file of metadata is visible to the user. If 0x02 is written in the eight-bit permission field, the attribute of a file of metadata is overwrite inhibited.

A src_file_name field contains information that uniquely identifies where the corresponding file is recorded in the directory structure of the file system of the local storage 24. More specifically, this field specifies a "path name" representing a path identifying a file with a file location in the hierarchical layer structure of the file system of the local storage 24. Names of the file and directory representing the path name are coded in accordance with ISO/IEC 646 Standard.

A dst_file_name field contains information that uniquely identifies where the corresponding file is recorded in the directory structure at a bind destination in a virtual disk of the file actually recorded on the local storage 24. More specifically, this field specifies a "path name" representing a path identifying a file with a file location in the hierarchical layer structure of the virtual file system. Names of the file and directory representing the path name are coded in accordance with ISO/IEC 646 Standard.

The src_file_name and the dst_file_name fields can have the same file name.

An operational procedure of the metadata is described below.

The virtual file system defines API for reading the content of the manifest ( ) file without disclosing the file name, the file location, or the physical structure of the manifest ( ) file to the application program or the user.

More specifically, the application program or a resident program to be executed by the reproducing apparatus 1 can indirectly access the manifest ( ) file by calling the following APIs:
get Property
  argument 1:
  character string type data
  absolute path name of a file to be operated using metadata
  argument 2:
  character string type data
  element name of metadata to be read
  return value:
  character string type data
  metadata corresponding to an element specified by argument
  function:
  reading metadata from manifest ( ) file In practice, detailed definition of API, such as type information, needs to be modified depending on programming language specifications of software execution environment of the reproducing apparatus 1.

Figure 11:
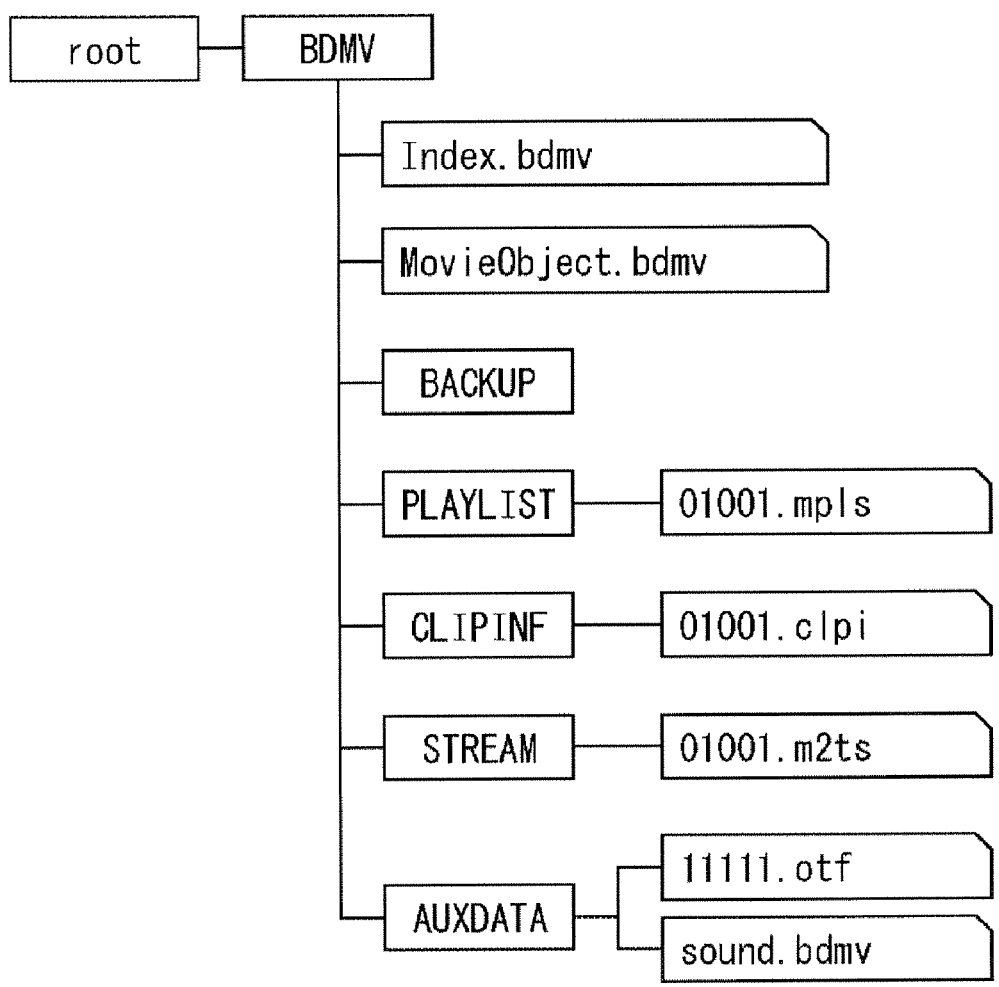
FIG. 11 illustrates a file system of an optical disk.

FIG. 11 illustrates the file system of the optical disk 11. As shown in FIG. 11, the file system of the optical disk 11 has a directory structure.

A directory named "BDMV" is arranged under the root directory of the optical disk 11. Under the directory "BDMV", a file named "Index.bdmv" and a file named "MoveObject.bdmv" are stored. Hereinafter, these files are referred to as an Index file and a MoveObject file, respectively, as appropriate. Each file is referred to as a file name followed by "file", and each directory is referred to as a directory name followed by "directory".

The Index file contains information relating to a menu for the playback of the optical disk 11. The reproducing apparatus 1 causes a display device to display a playback menu screen based on the Index file. The playback menu screen shows items for reproducing all contents on the optical disk 11, reproducing a particular chapter only, reproducing repeatedly a particular chapter, and displaying an initial menu. MovieObject that is executed with any item selected is set in the Index file. When a user selects one item from the playback menu screen, the reproducing apparatus 1 executes a MoveObject command set in the Index file.

The MovieObject file includes MovieObject. MovieObject includes a command controlling the playback of the PlayList recorded on the optical disk 11. The reproducing apparatus 1 selects and executes one of MovieObjects recorded on the reproducing apparatus 1, thereby reproducing the content recorded on the optical disk 11.

An application program interface (API) for reproducing animation data to be discussed later is defined. The MovieObject includes a command to invoke an API for reproducing the animation data. For example, when an animation is displayed in synchronization with AV data reproduced by a given PlayList, the MovieObject containing the command for invoking the API (application based on the provided API) for reproducing the animation data is executed. In this way, the API (application based on the provided API) is invoked and executed, and the animation is reproduced and displayed in synchronization with the AV data.

Arranged further under the BDMV directory are a directory named "BACKUP" (BACKUP directory), a directory named "PLAYLIST" (PLAYLIST directory), a directory named "CLIPINF" (CLIPINF directory), a directory named "STREAM" (STREAM directory), and a directory named "AUXDATA" (AUXDATA directory).

The BACKUP directory stores files and data to back up files and data recorded on the optical disk 11.

The PLAYLIST directory stores a PlayList file. Each PlayList file name is composed of a file name of a five digit number with an extension ".mpls" attached thereto as shown in FIG. 11.

The CLIPINF directory stores a clip information file. Each clip information file is composed of a file name of a five digit number with an extension ".clpi" attached thereto as shown in FIG. 11.

The STREAM directory stores a clip AV stream file and a substream file. Each stream file has a file name of a five digit number with an extension ".m2ts" attached thereto as shown in FIG. 11.

The AUXDATA directory stores files of data not contained in but referenced from the clip AV stream file and the substream file and data used separately from the clip AV stream and the substream file. As shown in FIG. 11, the AUXDATA directory stores a caption font file named "11111.otf" and an effect sound file named "sound.bdmv."

A graphical animation data file in JPEG format is also stored in the AUXDATA directory. The graphical animation data is reproduced by initiating Java® application based on the API for reproducing the animation data.

By defining the API for reproducing the animation data, the reproducing apparatus 1 sets an animation frame for displaying animations in a format different from the format of the stream file such as video stream. For example, the reproducing apparatus 1 can thus display graphical animations based on Java® application in synchronization with the AV content data.

Since the data in a coding scheme different from that of an AV content is handled as video data that can be mixed with the AV content, the freedom of authoring is increased.

The animation is described in a format such as Java® different from that of the stream file of the video stream. Buffer capacity required by the reproducing apparatus 1 is smaller than when an animation frame is prepared in the same data file structure as the video. Cost reduction and compact design are thus easily implemented in the reproducing apparatus 1.

The optical disk 11 stores the author_id and disc_id identifiers in the form of secure electronic data that cannot be rewritten by the user, or in the form of physical pits. The author_id identifier identifies a content author (also referred to as title author) of a content manufacturer of the optical disk 11, such as a production company or a distributing agency of a movie. The disc_id identifier identifies the type of the optical disk 11 manufactured by the title author identified by the author_id identifier.

Figure 12:
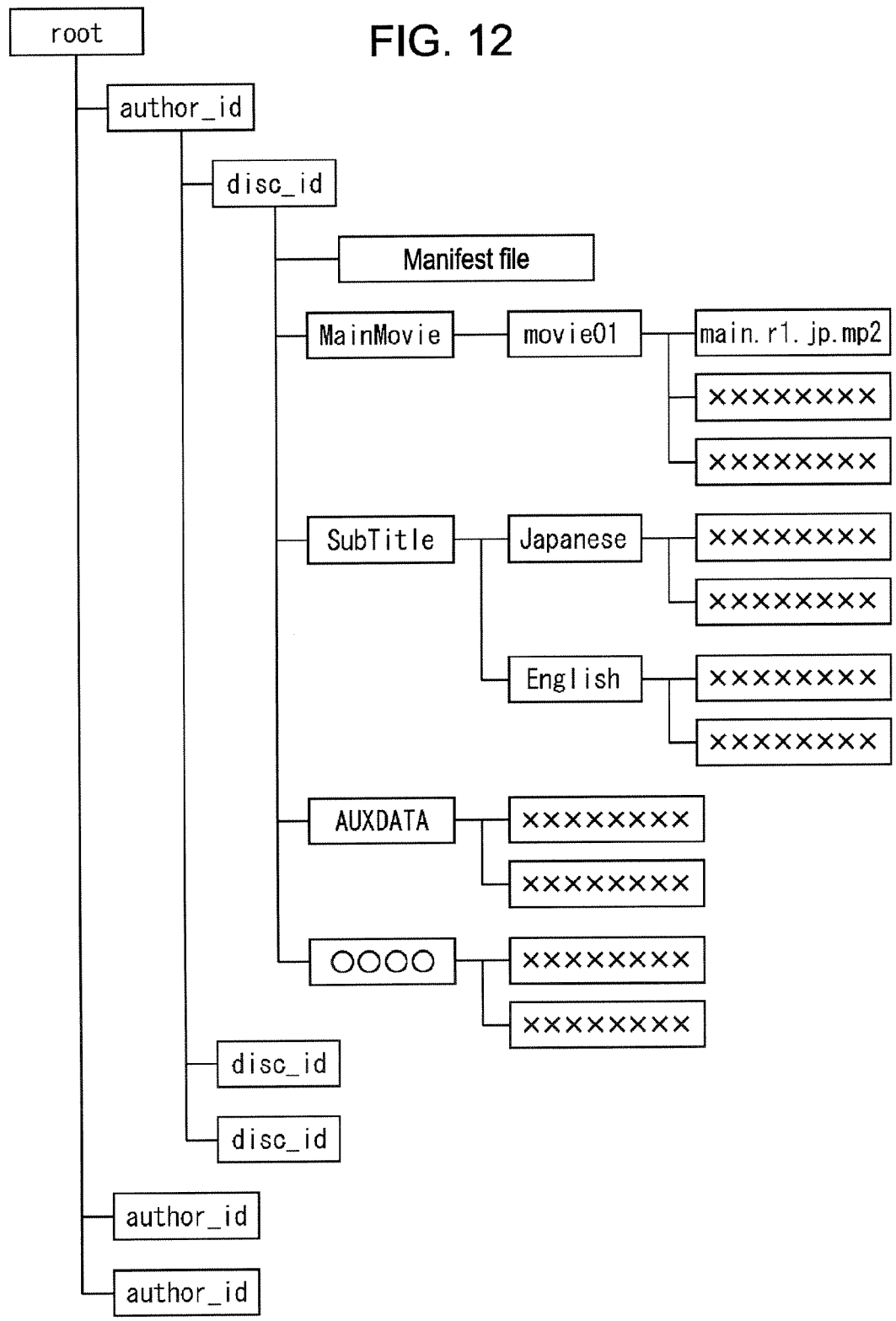
FIG. 12 illustrates a file system of a local storage.

FIG. 12 illustrates the file system of the local storage 24. As shown in FIG. 12, the file system of the local storage 24 has also a directory structure.

At least one directory named "author_id" is arranged under the root directory of the local storage 24. At least one directory named "disc_id" is arranged under the author_id directory. The disc_id directory includes a set of manifest ( ) sections or a manifest file composed of one manifest ( ) section. The structure of the other directories and files is freely set by the content author. The other directories and files may have the same file/directory structure as the one of the optical disk 11 discussed with reference to FIG. 11, or may have the one as discussed with reference to FIG. 12, which is quite different from the file/directory structure discussed with reference to FIG. 11.

As shown in FIG. 12, the "disc_id" directory includes, in addition to the manifest file, a plurality of directories including a "MainMovie" directory, a "SubTitle" directory, and an "AUXDATA" directory. Those directories may further contain folders and files.

The file/directory structure of the local storage 24 of FIG. 12 is invisible to the application program executed by the reproducing apparatus 1 or the user.

Figure 13:
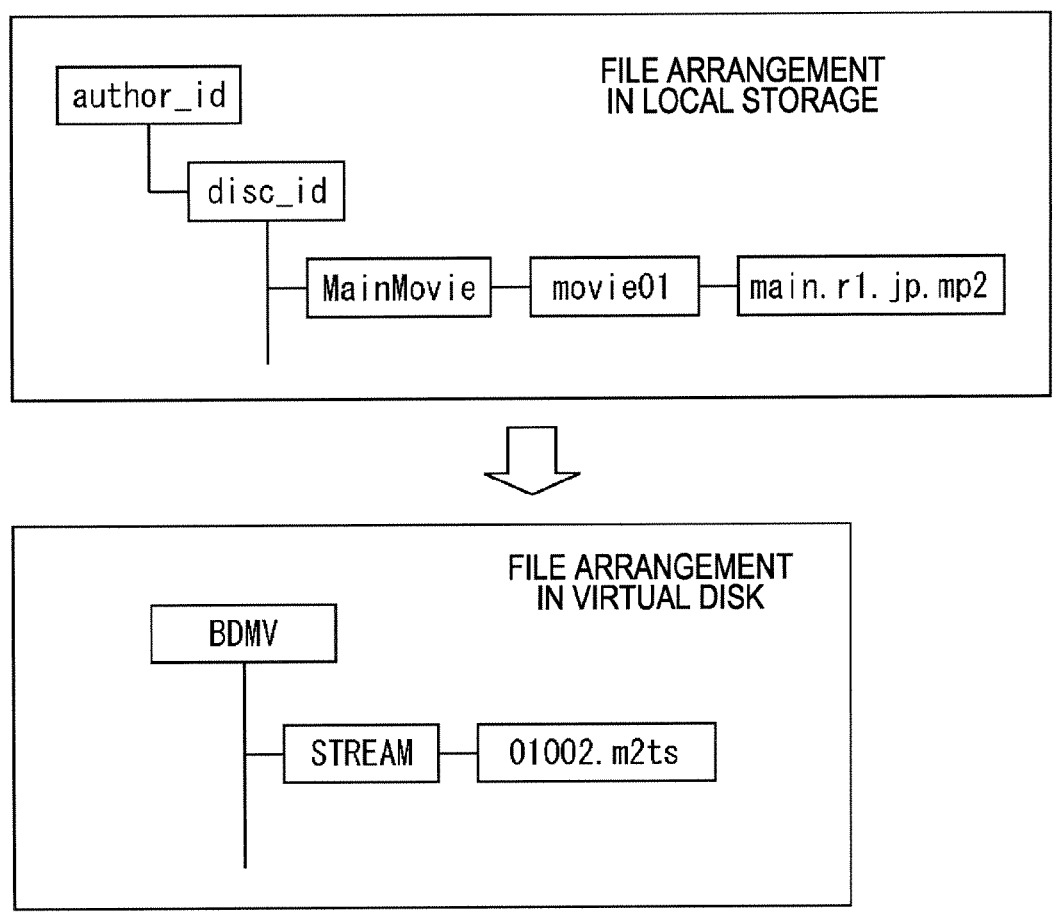
FIG. 13 illustrates the specifying of a path name.

For example, in the manifest ( ) section of FIG. 10, "/MainMovie/movie01/main.r1.jp.mp2" as the path name thereof might be specified in the src_file_name field, and "/STREAM/01002/m2ts" as the path name thereof might be specified in the dst_file_name field. As shown in FIG. 13, the downloaded data is recorded in a file name of main.r1.jp.mp2 in a movie01 directory within the MainMovie directory under the author_id and disc_id identifiers in the local storage 24. In the virtual file system of the virtual disk, the downloaded data is handled as a file named "01002.m2ts in the STREAM directory.

In this way, the content author can specify the path name of the local storage 24 in the src_file_name field, and the path name in the virtual file system of the virtual disk in the dst_file_name field of the manifest ( ) section of the downloaded package. If the path name adapted to the virtual file system in the virtual disk is set in the dst_file_name field, the content author can freely set a file/directory structure under disc_id of the data actually recorded on the local storage 24 and newly add directories and files under areas identified by the disc_id identifier in the reproducing apparatus 1.

If the dst_file_name field in the manifest ( ) section remains blank at the downloading of an actual file, that file cannot be referenced from the application program being executed by the reproducing apparatus 1 (in other words, the application program being executed by the reproducing apparatus 1 and the user cannot recognize the presence of that file). The actual file is stored on the local storage 24, and the actual file is correctly recognized in the file system of the local storage 24. With the dst_file_name field left blank, the file is considered as being absent from the virtual file system. That file is thus hidden from the application program of the reproducing apparatus 1 and the user.

This feature is taken advantage of. An actual file is downloaded with the dst_file_name field blanked in the manifest ( ) section. Later in the future, a manifest ( ) section having the same manifest_id and a predetermined path name written in the dst_file_name field is downloaded again to overwrite the manifest ( ) section. The application program to be executed by the reproducing apparatus 1 thus operates in the same way as the actual file is downloaded at the same timing as the downloading of the new manifest ( ) section.

For example, a plurality of bonus tracks was downloaded at a time, or delivered in a predetermined recording medium, and later, only the manifest ( ) section containing the dst_file_name field is downloaded for overwriting periodically so that the application program recognizes different bonus tracks. In this arrangement, the user enjoys services in which different bonus tracks are added from time to time without the need for downloading frequently a vast amount of data.

In the synchronization (binding) between the actual file system of the optical disk 11 and the local storage 24 and the file system of the virtual disk, regardless of whether it is a so-called static binding system or a dynamic binding system, a new API for updating the virtual file system (for example, a update ( )) may be defined. When that API is called in response to a user operation or explicitly by the application program, the virtual file system is updated.

In the static binding, the actual file systems in the optical disk 11 and the local storage 24 are referenced at the moment the optical disk 11 is loaded on the reproducing apparatus 1 or at the timing of the switching of reproduction title in order to map the file/directory structure in the virtual file system. In the dynamic binding, required files are searched for at the moment a file input and output request is issued.

The file/directory structure of the virtual disk preferably matches the file/directory structure of the optical disk 11. The file/directory structure of the optical disk 11 is formulated by standards and typically cannot be modified. Preferably, the structure of actual directories and files in the local storage 24 is freely set by the content author. If the file/directory structure of the virtual disk is set based on the fixed file/directory structure of the optical disk 11, a playback process is performed in compliance with standards such as the application format of the optical disk 11 while maintaining the freedom of data distributed by the content author at the same time.

Figure 14:
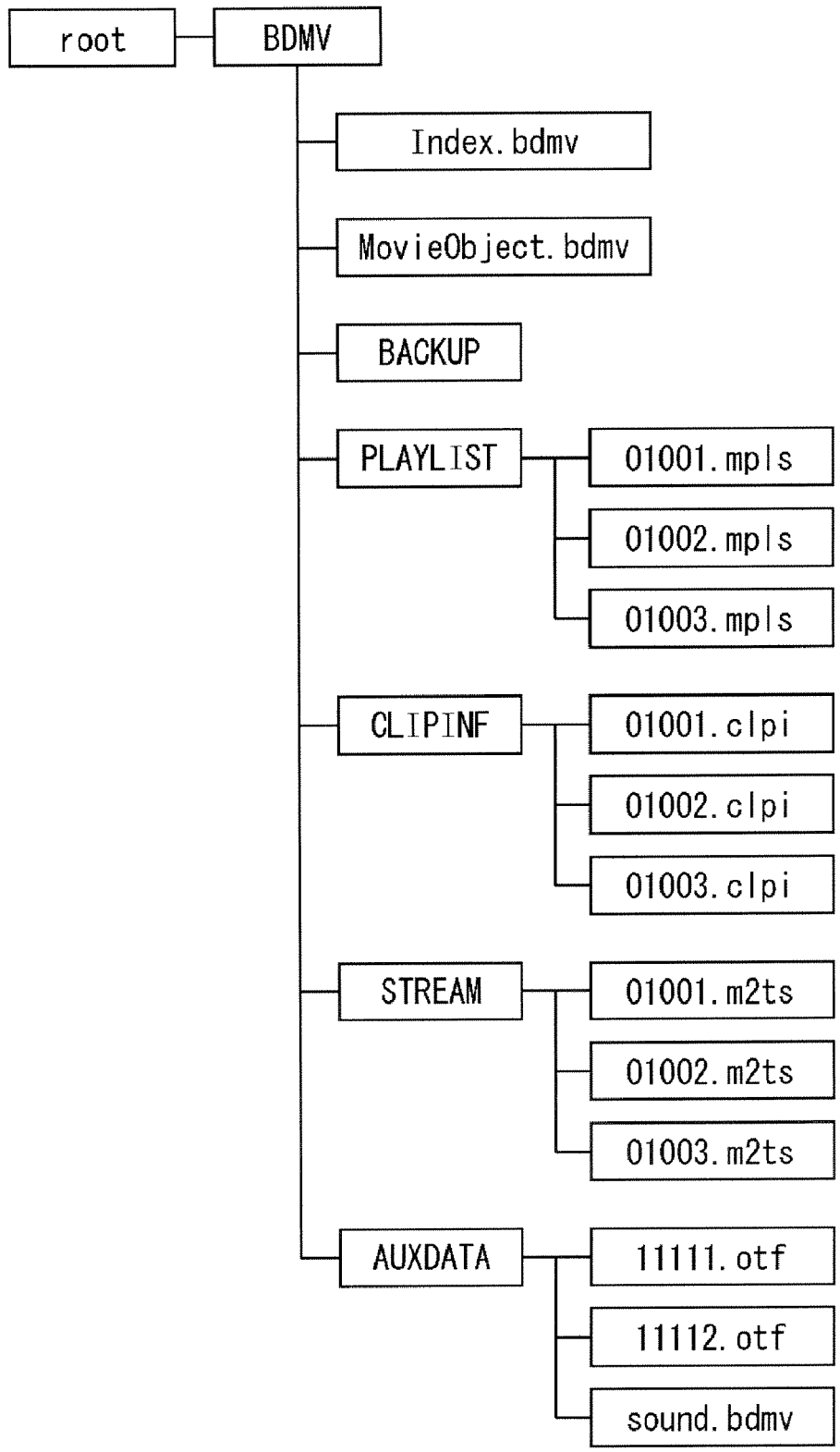
FIG. 14 illustrates a file/directory structure in a virtual disk.

FIG. 14 illustrates the file/directory structure of the virtual disk.

A directory named "BDMV" is arranged under the root directory in the file/directory structure of the virtual disk of FIG. 14. Under that directory, there are arranged a file named "Index.bdmv" and a file named "Movieobject.bdmv".

The Index file contains information relating to a menu for reproducing a content that is stored on the optical disk 11 and the local storage 24 and handled by the application program as the one being recorded on the virtual disk. The reproducing apparatus 1 causes the display device to display the playback menu screen in accordance with the Index file. The playback menu screen may show items for reproducing all contents on the optical disk 11, reproducing a particular chapter only, reproducing repeatedly a particular chapter, and displaying an initial menu. MovieObject that is executed with any item selected is set in the Index file. When a user selects one item from the playback menu screen, the reproducing apparatus 1 executes a MoveObject command set in the Index file.

The MovieObject file includes MovieObject. MovieObject includes a command controlling the playback of PlayList that is handled as being recorded on the virtual disk. The reproducing apparatus 1 selects and executes one of MovieObjects that are handled as being recorded on the virtual disk, thereby reproducing the content that is handled as being recorded on the virtual disk.

Arranged under the BDMV directory are a directory named "BACKUP" (BACKUP directory), a directory named "PLAYLIST" (PLAYLIST directory), a directory named "CLIPINF" (CLIPINF directory), a directory named "STREAM" (STREAM directory), and a directory named "AUXDATA" (AUXDATA directory).

The BACKUP directory stores files and data to back up files and data to be handled as being recorded on the virtual disk.

The PLAYLIST directory stores a PlayList file. Each PlayList file name is composed of a file name of a five digit number with an extension ".mpls" attached thereto in the same way as in the optical disk 11.

The CLIPINF directory stores a clip information file. Each clip information file is composed of a file name of a five digit number with an extension ".clpi" attached thereto in the same way as in the optical disk 11.

The STREAM directory stores a clip AV stream file and a substream file. Each stream file has a file name of a five digit number with an extension ".m2ts" attached thereto in the same way as in the optical disk 11.

The AUXDATA directory stores files of data, not contained in the clip AV stream file and the substream file handled as being recoded on the virtual disk, but referenced from the clip AV stream file and the substream file, and files of data used separately from the clip AV stream file and the substream file. As in the above-described optical disk 11, a caption font file, a sound effect file, and graphical animation data (animation frame) are recorded in the AUXDATA directory.

As previously discussed, the reproducing apparatus 1 accepts the animation frame for displaying animation having a format different from that of the video stream file, and a graphical animation described on a Java® application is displayed in synchronization with the AV content data.

Since the data in a coding scheme different from that of an AV content is handled as video data that can be mixed with the AV content, the freedom of authoring is increased.

The animation is described in a format such as Java® different from that of the stream file of the video stream. Buffer capacity required by the reproducing apparatus 1 is smaller than when an animation frame is prepared in the same data file structure as the video. Cost reduction and compact design are easily implemented in the reproducing apparatus 1.

Information indicating a file on the menu screen displayed to the user has a name typically specified in a display_name field. The file/directory structure of the virtual disk discussed with reference to FIG. 14 is not hidden in nature from the application program and the user. Depending on the application program executed by the reproducing apparatus 1, the file/directory structure of the virtual disk may be displayed to the user.

The definition of the content distribution file format the content author uses to distribute the content is described with reference to FIG. 15. The file format for content distribution may be individually determined on a per content file unit basis. Alternatively, the file format may be an archive type containing metadata (manifest ( )) as shown in FIG. 15.

A package_header ( ) section and a package_body ( ) section in archive may take text expression of mark-up language such as XML.

When the content author distributes contents on a per file unit basis, metadata (manifest ( )) is handled as an independent binary file or text file. In other words, an appropriate state needs to be described in the manifest ( ) associated with a content distributed on a per file unit basis in view of a directory structure expected subsequent to file addition.

A compression_type field is used to specify a compression method of data within the package_body ( ). If zero is specified in this field, data within the package_body is non-compressive type.

An encryption_type field is used to specify a scramble (encryption) method of data within the package_body ( ). If zero is specified in this field, the data within the package_body ( ) is non-scrambled type (clear text).

As for the order of scrambling and compression of the data in the package_body, a compression process is performed first, followed by a scrambling process.

A file_count field is used to specify the total number of files to be archived.

A manifest_id field is used to specify an identifier of the manifest ( ) section.

After archive data is downloaded, the manifest ( ) section may be stored on a per file unit basis (on a per archive data unit basis) on the local storage 24. Alternatively, the manifest ( ) section may be merged with a file with the manifest_id identifier of a manifest ( ) section used as a key for identification.

An author_id field is a field in which the content author specifies an identifier uniquely identifying a content producer.

A disc_id field is a field in which the content author specifies an identifier uniquely identifying the optical disk 11 of a particular content producer. This archive is update data for the optical disk 11 specified by the disc_id identifier.

A version field is a field the content author uses to manage history. History number is represented by a number from 1 to 255, and the larger the number, the newer the content is.

In a source field, a source URL of a file associated with the manifest ( ) is described. The value in this field is coded in accordance with ISO/IEC 10646-1 Standard.

In a display_name field, a name easily recognizable to the user is defined here. More specifically, a character string such as "Japanese caption of title XXX", which could be difficult to imagine from a file name alone, is set in the display_name field. The character string is coded in accordance with ISO/IEC 10646-1 Standard.

A permission field is used for the content author to specify whether to set approval information as a visible attribute or an invisible attribute. The values specifiable for the permission field remain unchanged from the values discussed with reference to FIG. 10.

An src_file_name field is used to specify a path name of a file to be recorded on the local storage 24 as previously discussed with reference to FIG. 13. The file/directory name is encoded in accordance with ISO/IEC 646 standard.

A dst_file_name field is used to specify a path name of a file at a binding destination in the virtual disk (virtual file system) as previously discussed with reference to FIG. 13. The file/directory name is encoded in accordance with ISO/IEC 646 Standard.

The src_file_name and dst_file_name fields may take the same name.

A file_size field is used to specify the file size of a file prior to compression by byte.

A file_data field is used to specify file data as a byte sequence.

The data of FIG. 15 having the described content distribution file format is downloaded, and the reproducing apparatus 1 merges the downloaded data with the data recorded on the loaded optical disk 11 to construct a virtual file system in the virtual disk. The user who reproduces a content recorded on the optical disk 11 using the reproducing apparatus 1 feels that the optical disk 11 is updated with bonus tracks and sounds or captions of different language sounds added to the contents recorded on the optical disk 11.

If the contents having the above-described format are updated, new data files are downloaded for binding in the virtual file system discussed with reference to FIG. 14. For example, at least one of an Index file (Index.bdmv), a MovieObject file (Movieobjects.bdmv), a PlayList file (***.mpls), a ClipInformation file (*.clpi), and a STREAM file and AUXDATA file (*.m2ts, *.bdmv, and ***.otf) is added or updated. The various types of additions defined by above-referenced operation_type, such as the addition of MainPath and SubPath, are executed so that the above-described files are downloaded and reproduced in association with the contents recorded on the optical disk 11.

FIG. 16 is a block diagram illustrating the decoder 26 in the reproducing apparatus 1 of one embodiment of the present invention.

The decoder 26, including a switch 41 and an AV decoder 33, operates under the control of a controller 21.

As shown in FIG. 16, the controller 21 reads a PlayList file from the optical disk 11 (a recording medium such as a Blu-ray disk or DVD) via the optical disk drive 22 or from the local storage 24, and reads an AV stream or AV data from the optical disk 11 (a recording medium such as a Blu-ray disk or DVD) via the optical disk drive 22 or from the local storage 24 in accordance with the information of the PlayList file. Using the operation input unit 29, the user issues a command to switch audio or caption to the controller 21. The controller 21 is supplied with information of initial language setting of the reproducing apparatus 1 by a storage unit (not shown).

The PlayList file contains a variety of pieces of playback information in addition to information regarding Main Path and Sub Path. The controller 21 reads, from the optical disk 11 via the optical disk drive 22, or from the local storage 24, a main Clip AV stream file (hereinafter referred to as main Clip) referenced by a PlayItem contained in the PlayList file, a sub Clip AV stream file (hereinafter referred to as sub Clip) referenced by a SubPlayItem, and text sub title data and animation data, each referenced by the SubPlayItem. The main Clip referenced by the PlayItem and the sub Clip referenced by the SubPlayItem may be stored on different recording media. For example, the main Clip may be recorded on a recording medium while the corresponding sub Clip may be stored on the local storage 24 after being supplied via a network (not shown). The controller 21 may select and reproduce an elementary stream corresponding to a playback function thereof, or may select and reproduce an elementary stream corresponding to the information about the initial language setting of the reproducing apparatus 1.

The AV decoder 33 includes buffers 51-54, PID filter 55, PID filter 56, switches 57-59, PID filter 60, pre-load buffer 61, animation decoder 62, decoded object buffer 63, composition buffer 64, animation scheduler 65, background decoder 71, first video decoder 72-1, second video decoder 72-2, presentation graphics decoder 73, interactive graphics decoder 74, first audio decoder 75-1, second audio decoder 75-2, text sub title composition decoder 76, switch 77, switch 78, background plane generator 91, video plane generator 92, presentation graphics plane generator 93, interactive graphics plane generator 94, buffer 95, video data processor 96, mixing processor 97, and mixing processor 98.

The first video decoder 72-1 decodes a primary video stream while the second video decoder 72-2 decodes a secondary video stream. The first audio decoder 75-1 decodes an audio stream #1 (primary audio stream) while the second audio decoder 75-2 decodes an audio stream #2 (secondary audio stream).

The reproducing apparatus 1 includes the two video decoders (the first video decoder 72-1 and the second video decoder 72-2) to decode the two video streams, and the two audio decoders (the first audio decoder 75-1 and the second audio decoder 75-2) to decode the two audio streams. If there is no need to distinguish between the first video decoder 72-1 and the second video decoder 72-2, each video decoder is referred as a video decoder 72. If there is no need to distinguish between the first audio decoder 75-1 and the second audio decoder 75-2, each audio decoder is referred to as an audio decoder 75.

File data read by the controller 21 is decoded and error corrected by an error correcting code (ECC) decoder (not shown) into a multiplexed stream. Under the control of the controller 21, the switch 41 selects the decoded and error-corrected data by stream type, and then supplies the selected data to corresponding buffers 51-54.

The main Clip AV stream is a stream (such as a transport stream) into which video, and at least one of audio, bit-map caption (presentation graphics stream), and interactive graphics are multiplexed. The sub Clip AV stream is a stream into which at least one of audio, bit-map caption (presentation graphics stream), and interactive graphics is multiplexed. The animation data may be data described in a data format such as Java® different from a multiplexed data stream like a transport stream. In other words, the knowledge and development skill of MPEG 2 transport stream are not required to generate animation data to be reproduced in synchronization with main video data on the reproducing apparatus 1. The data text sub title data file (Text_ST) may or may not be in a multiplexed stream form such as a transport stream.

The reproducing apparatus 1 reads the file data from the optical disk 11 (or other recording medium) via the optical disk drive 22 or from the local storage 24, and reproduces video, bit-map caption, interactive graphics, animation, and audio.

From among data, animation data is read from the optical disk drive 22 (recording medium) or the local storage 24, and then subjected to a decode process. When the main Clip, the sub Clip, and the text sub tilt data are read from the optical disk drive 22 (recording medium) or the local storage 24, respective files may be read in a time division manner or the sub Clip and the text sub tilt data may be pre-loaded to all buffers (buffers 53 and 54) before the sub Clip and the text sub tilt data are read from the main Clip.

More specifically, the switch 41 is controlled by the controller 21 so that the animation data that is read first in response to a command from a user is supplied to the pre-load buffer 61.

Under the control of the animation scheduler 65, the pre-load buffer 61 buffers the animation data supplied from the switch 41 and then supplies the animation data to the animation decoder 62. The animation decoder 62 under the control of the animation scheduler 65 decodes the supplied animation data and then supplies a decoded object to the decoded object buffer 63.

In order to synchronize the playback of the video data of the main Clip (primary stream) with the playback of the animation, the animation scheduler 65 references an STC counter (not shown) that is referenced by the video decoder 72, and controls the operation of the pre-load buffer 61, the animation decoder 62, the decoded object buffer 63, and the composition buffer 64.

As shown in FIG. 17, supplied animation frames include at least one picture frame, and are not necessarily prepared for all time domains of video frames. As shown, the animation frames are displayed during a predetermined animation playback time and not displayed during an animation interval. The animation frame is then displayed again during the next animation playback time.

Timing of the decode process for the playback of the main Clip video data (primary video stream) cannot be predicted because the timing depends on an image of each frame. The animation frames are buffered and decoded beforehand, and then stored on the decoded object buffer 63. In accordance with IN time and OUT time of the main Clip video data (primary video stream), the animation scheduler 65 transfers the decoded animation data on the decoded object buffer 63 to the composition buffer 64.

When playback of the animation frame starts, the composition buffer 64 under the control of the animation scheduler 65 acquires a graphics plane that has been just generated by the interactive graphics plane generator 94, and stores for backup the graphics plane as data to be mixed, extracts an image of a target portion of the animation frame supplied from the decoded object buffer 63, alpha blends the extracted image and the stored graphic object, and transfers the blended image to the interactive graphics plane generator 94.

The animation data is thus subject to a format restriction depending on buffer capacity.

The restriction of the animation data is described below with reference to FIG. 18.

Referring to FIG. 18, T1 represents a pre-load time during which all animation frames are pre-loaded at a time to the pre-load buffer 61. T2 represents a decode time during which all animation frames are decoded in the process of the animation decoder 62. T3 represents a transfer time during which the content of graphics plane is transferred from the interactive graphics plane generator 94 to the composition buffer 64 immediately prior to animation start. T4 represents the sum of a time for alpha blending of one animation frame by the composition buffer 64 and a transfer time of the blending result to the interactive graphics plane generator 94. T5 represents a presence time of one animation frame in the interactive graphics plane generator 94.

Times T1 through T4 take different parameters depending on the hardware structure of the reproducing apparatus 1. Furthermore, times T1 through T4 are parameters specified by applications.

The animation frame is pre-loaded onto the pre-load buffer 61 and then copied to the animation decoder 62 rather than being transferred to the animation decoder 62 (the data of the animation frame remains on the pre-load buffer 61). The pre-load buffer 61 may store the pre-loaded animation frame until a next animation frame is supplied. The supply of the decoded animation frame from the decoded object buffer 63 to the composition buffer 64 is performed as a copying operation rather than a transfer operation (the decoded animation frame remains on the decoded object buffer 63). The decoded object buffer 63 may store the decoded animation frame until a next decoded frame is supplied. Furthermore, the supply of the alpha blended frame data from the composition buffer 64 to the interactive graphics plane generator 94 may be performed as a copying operation rather than a transfer operation (with the original blended frame data remaining on the composition buffer 64).

The application can specify parameters such as an image to be displayed as an animation frame, an animation start time indicated by PTS (presentation time stamp) of a video stream, an animation end time indicated by the PTS of the video stream, and a parameter of a frame rate of animation.

The minimum value of the animation interval of FIG. 17 is determined by a speed of animation frame decoding.

The size of the animation frame to be processed with respect to the animation frame rate is determined by a data transfer rate (copying speed of data) from the composition buffer 64 to the interactive graphics plane generator 94 and a processing speed of alpha blending per pixel unit in the composition buffer 64.

The animation frame rate and the total number of usable frames with respect to the size of the animation frame corresponding to the animation frame rate are determined by the buffer capacity of the decoded object buffer 63.

More specifically, the following equation (1) must be satisfied:

$$N(n)=f(n)\times \Delta T(n) \quad (1)$$

where $\Delta T(n)$ is described by equation (2) and satisfies equation (3), N(n) is the total number of graphics objects used in an n-th animation, and f(n) is a frame rate (/s) of the n-th animation:

$$\Delta T(n)=\text{animation\_end\_time}(n)-\text{animation\_start\_time}(n) \quad (2)$$

$$\Delta T(n)>0 \quad (3)$$

where nimation_start_time(n) is the start time of the n-th animation and animation_end_time(n) is the end time of the n-th animation.

The animation interval must satisfy the following equation (4):

$$\text{animation\_end\_time}(n)+T1+T2+T3+T4 \leq \text{animation\_start\_time}(n+1) \quad (4)$$

The following equation (5), namely, equation (6) also must be satisfied.

$$(2\times Rd+BPP\times Rp)\times \Delta T(n) \geq 8\times S(n) \text{ and}$$

$$2\times Rd+BPP\times Rp \geq 8\times S\max(n)\times f(n) \quad (5)$$

$$2\times Rd+BPP\times Rp \geq 8\times S\max(n)\times f(n) \quad (6)$$

where Rd is a data transfer rate (data copying speed) (bits/s) of the reproducing apparatus 1, Rp is an alpha blending process rate per pixel (pixels/s) of the reproducing apparatus 1, and BPP is a color depth (bits/pixel) of the graphics object. S(n) is the sum of sizes of the all animation graphics objects, namely, represented by SIZE(object(1))+SIZE(object(2))+ . . . +SIZE(object(N(n))) where SIZE(gfx) is a function that provides the size of graphics object gfx in bytes. Smax(n) is represented by MAX{SIZE(object(1)), SIZE(object(2)), . . . , SIZE(object(N(n)))} wherein MAX( ) is a function that provides the maximum value of the object trains in bytes.

If DEC_TIME(gfx) is a function that provides a decode time of animation graphics object gfx in seconds, the following equation (7) must also be satisfied:

$$DEC\_TIME(\text{object}(1))+DEC\_TIME(\text{object}(2))+ \ldots DEC\_TIME(\text{object}(N(n))) \leq T2 \quad (7)$$

Furthermore, the following equation (8) must also be satisfied:

$$S(n) \leq \text{SIZE(Decoded Object Buffer)} \quad (8)$$

where SIZE(Decoded Object Buffer) represents the buffer capacity of the decoded object buffer 63.

Figure 19:
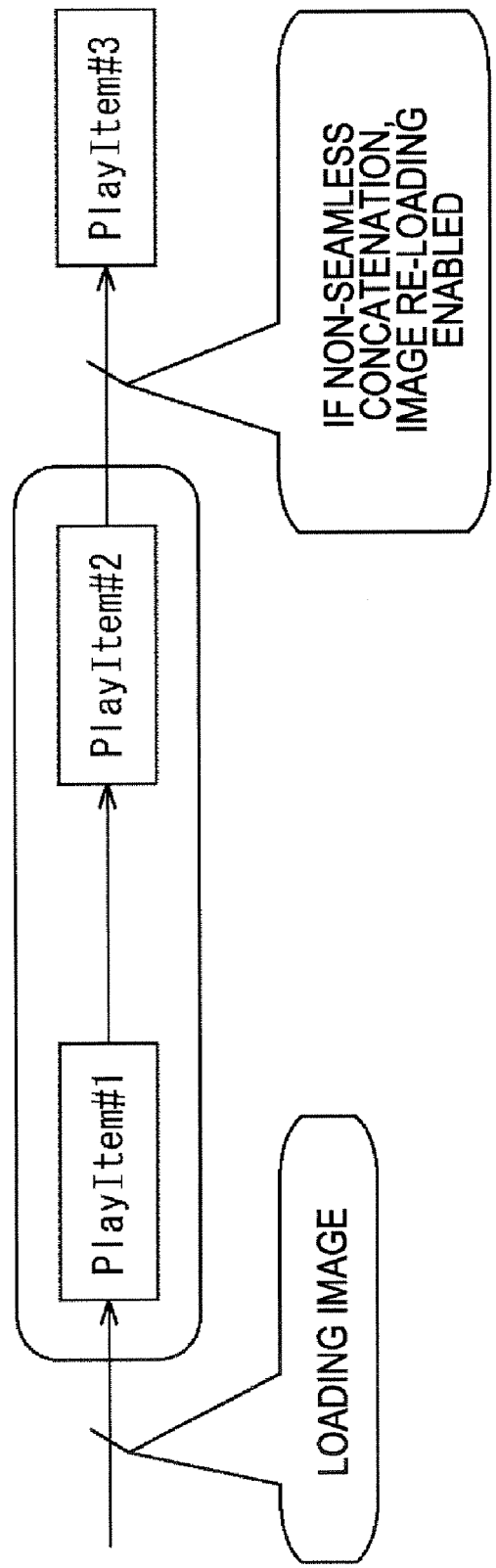
FIG. 19 illustrates the loading of image.
Figure 20:
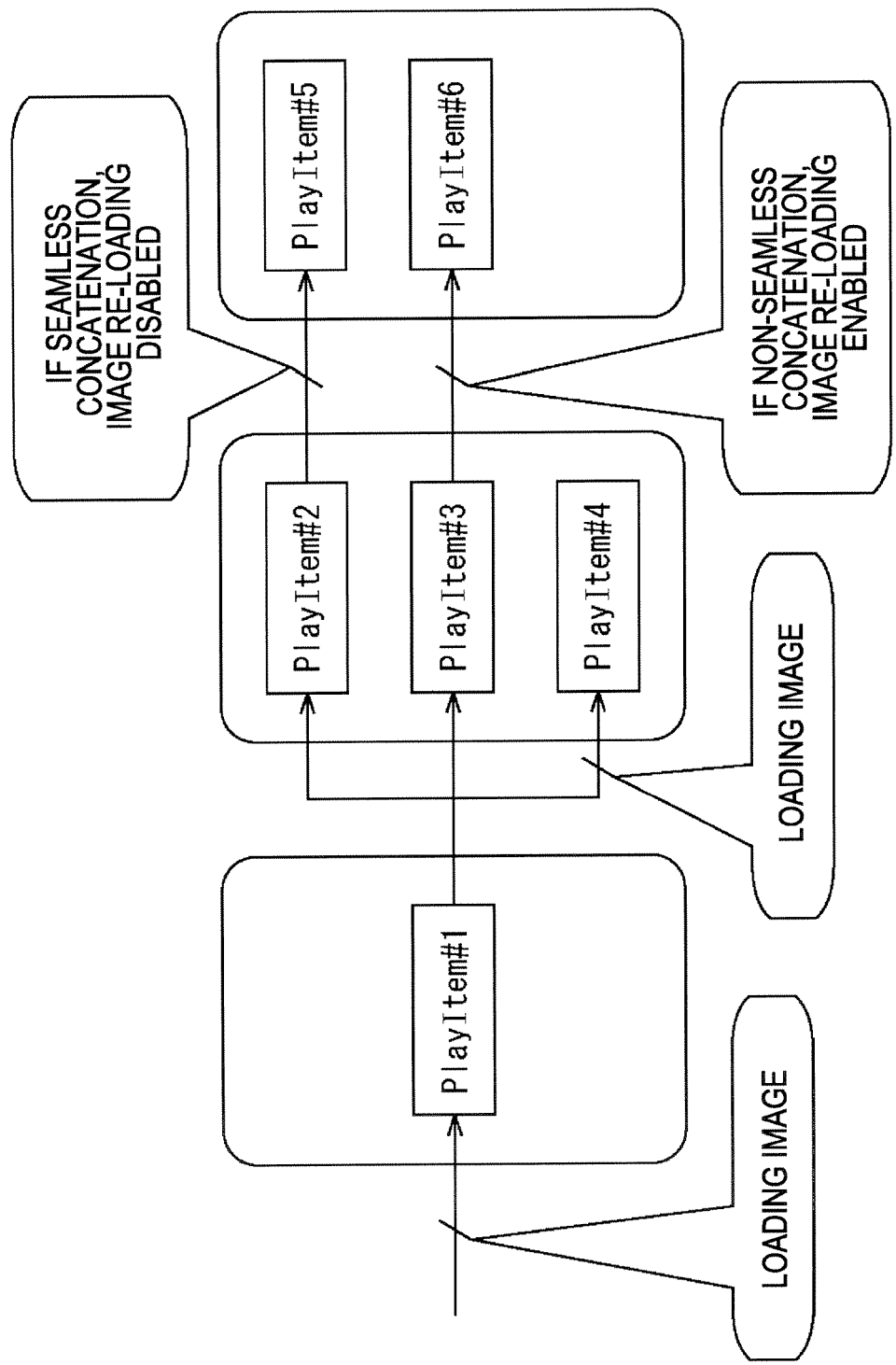
FIG. 20 illustrates the loading of image.

With reference to FIGS. 19 and 20, timing at which the animation frame is pre-loaded to the pre-load buffer 61 is described below.

In the playback of the sequential movie shown in FIG. 19, image data of an animation frame to be reproduced in synchronization with the primary video streams of PlayItem #1 and PlayItem #2 is pre-loaded prior to the start of the playback of the PlayItem #1. Animation is then reproduced at a predetermined playback position in synchronization with the primary video streams of the PlayItem #1 and the PlayItem #2.

If different PlayItem #3 is concatenated with the PlayItem #1 and the PlayItem #2 in a non-seamless fashion, image data of the an animation frame to be reproduced in synchronization with the primary video stream of the PlayItem #3 is pre-loaded prior to the playback of the primary video stream of the PlayItem #3.

If the PlayItem #3 is concatenated with the PlayItem #2 and the PlayItem #2 in a seamless fashion, the animation frame to be reproduced in synchronization with the primary video stream of the PlayItem #3 is also pro-loaded prior to playback of the first PlayItem.

When PlayItems are concatenated in a non-seamless fashion in the playback of the interactive movie (branching type) as shown in FIG. 20, image data of the animation frames can be pre-loaded on a per PlayItem basis prior to playback. However, if the PlayItems are concatenated in a seamless fashion, the image data of the animation frame can be pre-loaded only prior to the playback of the first PlayItem.

Re-rendering operation is described below with reference to FIGS. 21A-21C.

Figure 21A:
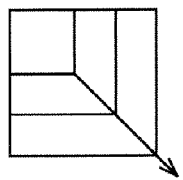
FIGS. 21A-21C illustrate re-rendering of image.

When an animation frame is expanded in size only with the top-left origin thereof fixed as shown in FIG. 21A, re-rendering process is not activated. To alpha blend with a background image, the composition buffer 64 stores, for backup, the graphics plane, immediately prior to the start of animation display in an overlay area (maximum overlay area) in the expansion of the animation frame, from the interactive graphics plane generator 94.

Figure 21B:
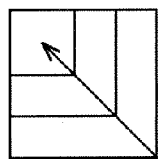

As shown in FIG. 21B, the re-rendering process is not activated when an animation frame is contracted in size only with the top-left origin thereof fixed as shown in FIG. 21B. To alpha blend with a background image, the composition buffer 64 stores, for backup, the graphics plane, immediately prior to the start of animation display in an overlay area (maximum overlay area) in the expansion of the animation frame, from the interactive graphics plane generator 94.

Figure 21C:
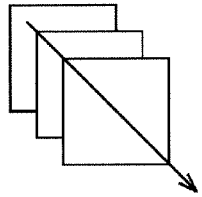

When the animation frame is shifted as shown in FIG. 21C, the re-rendering process is activated on an overlay area. To alpha blend with a background image, the composition buffer 64 stores, for backup, the graphics plane, immediately prior to the start of animation display of a rectangular area as a passing zone (all overlay areas), from the interactive graphics plane generator 94.

Returning to FIG. 16, the switch 41 controlled by the controller 21 supplies background image data to the buffer 51, main Clip data to the buffer 52, sub Clip data to the buffer 53, and text sub title data to the buffer 54. The buffer 51 buffers the background image data, the buffer 52 buffers the main Clip data, the buffer 53 buffers the sub Clip data, and the buffer 54 buffers the text sub title data.

The data read from the buffer 51 for buffering the background image data is supplied to the background decoder 71 at a predetermined timing. The background decoder 71 decodes the background image data, and supplies the decoded background image data to the background plane generator 91.

The stream data read from the buffer 52 as a main Clip AV stream read buffer is output to the subsequent-stage PID (packet ID) filter 55 at a predetermined timing. The PID filter 55 sorts the input main Clip AV stream into streams by PID (packet ID) and outputs the sorted streams to respective decoders for elementary streams. More specifically, the PID filter 55 supplies a video stream to the PID filter 60 serving as a supply source to one of the first video decoder 72-1 and the second video decoder 72-2, a presentation graphics stream to the switch 57 serving as a supply source to the presentation graphics decoder 73, an interactive graphics stream to the switch 58 serving as a supply source to the interactive graphics decoder 74, and an audio stream to the switch 59 serving as a supply source to one of the first audio decoder 75-1 and the second audio decoder 75-2.

The stream data read from the buffer 53 serving as a sub Clip AV stream read buffer is output to the subsequent-stage PID (packet ID) filter 56. The PID filter 56 sorts the input sub Clip AV stream by PID, and outputs the sorted streams to the respective decoders of the elementary streams. More specifically, the PID filter 56 supplies a video stream to the PID filter 60 serving as a supply source to one of the first video decoder 72-1 and the second video decoder 72-2, a presentation graphics stream to the switch 57 serving as a supply source to the presentation graphics decoder 73, an interactive graphics stream to the switch 58 serving as a supply source to the interactive graphics decoder 74, and an audio stream to the switch 59 serving as a supply source to one of the first audio decoder 75-1 and the second audio decoder 75-2.

The PID filter 60 receives one of the video stream contained in the main Clip supplied from the PID filter 55 and the video stream contained in the sub Clip supplied from the PID filter 56. Under the control of the controller 21, the PID filter 60 determines whether the input is a primary video stream or a secondary video stream, and then supplies the primary video stream to the first video decoder 72-1 and the second video stream to the second video decoder 72-2.

The video streams sorted by the PID filter 60 are then supplied to the subsequent first video decoder 72-1 and second video decoder 72-2. Each of the first video decoder 72-1 and the second video decoder 72-2 decodes the supplied video stream, and then supplies decoded video data to the video plane generator 92.

The first video decoder 72-1 is a decoder for decoding the primary video stream and the second video decoder 72-2 is a decoder for decoding the secondary video stream. The first audio decoder 75-1 is a decoder for decoding the audio stream #1 (primary audio stream), and the second audio decoder 75-2 is a decoder for decoding the audio stream #2 (secondary audio stream).

The reproducing apparatus 1 includes the two video decoders (the first video decoder 72-1 and the second video decoder 72-2) to decode the two video streams, and the two audio decoders (the first audio decoder 75-1 and the second audio decoder 75-2) to decode the two audio streams. If there is no need to discriminate between the first video decoder 72-1 and the second video decoder 72-2, each video decoder is simply referred to as video decoder 72. If there is no need to discriminate between the first audio decoder 75-1 and the second audio decoder 75-2, each audio decoder is referred to as audio decoder 75.

The switch 57 selects one from the presentation graphics stream contained in the main Clip supplied from the PID filter 55 and the presentation graphics stream contained in the sub Clip supplied from the PID filter 56, and supplies the selected presentation graphics stream to the subsequent presentation graphics decoder 73. The presentation graphics decoder 73 decodes the presentation graphics stream and supplies the data of the decoded presentation graphics stream to the switch 77 serving as a supply source to the presentation graphics plane generator 93.

The switch 58 selects one from the interactive graphics stream contained in the main Clip supplied from the PID filter 55 and the interactive graphics stream contained in the sub Clip supplied from the PID filter 56, and supplies the selected interactive graphics stream to the subsequent interactive graphics decoder 74. The interactive graphics stream supplied to the interactive graphics decoder 74 is a stream separated from the main Clip AV stream or the sub Clip AV stream.

The interactive graphics decoder 74 decodes the interactive graphics stream and supplies data of the decoded interactive graphics stream to the switch 78 serving as a supply source of the interactive graphics plane generator 94.

The switch 59 selects one from the audio stream contained in the main Clip supplied from the PID filter 55 and the audio stream contained in the sub Clip supplied from the PID filter 56, and supplies the selected audio stream to one of the first audio decoder 75-1 and the second audio decoder 75-2. The audio stream supplied to the first audio decoder 75-1 is a stream separated from one of the main Clip and the sub Clip. The audio stream supplied to the second audio decoder 75-2 is also a stream separated from one of the main Clip and the sub Clip. If the audio stream #1 and the audio stream #2 are contained in the main Clip, the PID filter 55 filters the audio stream #1 and the audio stream #2 in accordance with PID of the audio stream, and then supplies the filtered audio stream to the switch 59.

For example, the switch 59 operates to supply the audio stream #1 supplied from the PID filter 55 to the first audio decoder 75-1 and the audio stream #2 supplied from the PID filter 55 to the second audio decoder 75-2.

The first audio decoder 75-1 decodes the audio stream and supplies data of the decoded audio stream to the mixing processor 101. The second audio decoder 75-2 decodes the audio stream and supplies the decoded data of the decoded audio stream to the mixing processor 101.

If the audio stream #1 and the audio stream #2 are reproduced in an overlay mode (if two audio streams are selected as audio stream to be reproduced by the user), the audio stream #1 decoded by the first audio decoder 75-1 and the audio stream #2 decoded by the second audio decoder 75-2 are supplied to the mixing processor 101.

The mixing processor 101 mixes (superimposes) the audio data from the first audio decoder 75-1 and the audio data from the second audio decoder 75-2, and supplies the mixed audio data to the subsequent mixing processor 97. In this embodiment of the present invention, mixing (superimposition) of the audio data from the first audio decoder 75-1 and the audio data from the second audio decoder 75-2 is also referred to as synthesis. Synthesis thus means mixing of two pieces of audio data.

The sound data selected by the switch 41 is supplied to the buffer 95. The buffer 95 supplies the sound data to the mixing processor 97 at a predetermined timing. The mixing processor 97 mixes (superimposes or synthesizes) the audio data mixed by the mixing processor 101 (i.e., the audio data that is obtained by mixing the audio data output from the first audio decoder 75-1 and the audio data output from the second audio decoder 75-2) with the sound data supplied from the buffer 95, and then outputs the mixed audio data as an audio signal.

Data read from the buffer 54 serving as the text sub title read buffer is output to the subsequent text sub title composition decoder 76 at a predetermined timing. The text sub title composition decoder 76 decodes the Text-ST data and supplies the decoded Text-ST data to the switch 77.

The switch 77 selects between the presentation graphics stream decoded by the presentation graphics decoder 73 and the text sub title data decoded by the text sub title composition decoder 76, and then supplies the selected data to the presentation graphics plane generator 93. Caption image supplied to the presentation graphics plane generator 93 is one of the output of the presentation graphics decoder 73 and the output of the text sub title composition decoder 76.

The switch 78 selects one of the data of the interactive graphics stream decoded by the interactive graphics decoder 74 and animation data supplied from the composition buffer 64, and then supplies the selected data to the interactive graphics plane generator 94. The animation data is composed by the composition buffer 64 at a playback timing. Upon receiving the animation data from the composition buffer 64, the switch 78 supplies the animation data to the interactive graphics plane generator 94.

The presentation graphics stream input to the presentation graphics decoder 73 is a stream separated from the main Clip and the sub Clip (as selected by the switch 57).

When a video image is displayed in a contracted scale based on the background image data supplied from the background decoder 71, the background plane generator 91 generates a background plane serving as a wall-paper image, and then supplies the background plane to the video data processor 96.

When the video data is supplied from the first video decoder 72-1 and the second video decoder 72-2, the video plane generator 92 under the control of the controller 21 generates a video plane by synthesizing the supplied video data, and supplies the video plane to the video data processor 96. When the video data is supplied by the first video decoder 72-1 only, the video plane generator 92 generates a video plane based on the supplied video data, and then supplies the video plane to the video data processor 96. Synthesizing two pieces of video data is also referred to as superimposing or mixing two pieces of video data.

In response to the data selected and supplied by the switch 77 (one of the presentation graphics stream and the text sub title data), the presentation graphics plane generator 93 generates a presentation graphics plane as a rendering image, and then supplies the presentation graphics plane to the video data processor 96.

In response to data selected and supplied by the switch 78 (one of the data of the interactive graphics stream supplied from the interactive graphics decoder 74 and the animation frame supplied from the composition buffer 64), the interactive graphics plane generator 94 generates an interactive graphics plane, and supplies the generated interactive graphics plane to the video data processor 96.

The video data processor 96 mixes the background plane from the background plane generator 91, the video plane from the video plane generator 92, the presentation graphics plane from the presentation graphics plane generator 93, and the interactive graphics plane from the interactive graphics plane generator 94, and outputs the mixed planes as a video signal. The mixing processor 97 mixes (synthesizes or superimposes) the audio data from the mixing processor 101 (the audio data that is obtained by mixing the audio data decoded by the first audio decoder 75-1 and the audio data decoded by the second audio decoder 75-2) and the sound data from the buffer 95, and outputs the mixed data as an audio signal.

The switches 57-59 and switches 77 and 78 operate in response to the selection input on the operation input unit 29 by the user or a file containing data to be processed. For example, if an audio stream is contained in the sub Clip AV stream file only, the switch 59 is set to a sub side.

The decoder 26 discussed with reference to FIG. 16 performs a playback process under the control of the controller 21.

As discussed above, the decoder 26 in the reproducing apparatus 1 includes the pre-load buffer 61, the animation decoder 62, the decoded object buffer 63, the composition buffer 64, and the animation scheduler 65. The decoder 26 thus reproduces a graphic animation in synchronization with the video frame.

In typical applications, an AV content such as a movie of a main path is accompanied by a comment of a director, or a director explains an individual scene while pointing to the individual scene on a screen, or a real-time gaming is performed with a main AV reproduced as background.

Data required to reproduce animation (animation frame) is buffered and then decoded beforehand. An animation frame of the data buffered on the decoded object buffer 63 is randomly accessed when the animation scheduler 65 references a count at an STC counter used by the video decoder. However, a jump playback to a different PlayList or a different PlayItem cannot be performed.

As previously discussed, the reproducing apparatus 1 the animation frame required for animation playback is pre-loaded on the pre-load buffer 61 and decoded beforehand. When the animation scheduler 65 references the STC counter (not shown), the animation frame displayed in synchronization with a specified video frame is transferred to the interactive graphics plane generator 94.

In actual design, a technique of double-buffering or triple-buffering may be introduced in the interactive graphics plane generator 94 to prevent flickering in animation display.

An example of double-buffering technique is illustrated in FIG. 22.

As shown in FIG. 22, the interactive graphics plane generator 94 contains a back graphics plane 151 and a front graphics plane 152. A buffering controller 153 controls data inputting to and data outputting from each of the back graphics plane 151 and the front graphics plane 152. More specifically, after a mixing process is completed in the front graphics plane 152, the mixed data is output from the front graphics plane 152. While the mixed data is being output from the front graphics plane 152, data is supplied to the back graphics plane 151 for the mixing process. Data input and data output are then reversed between the two planes when the output of the mixed data from the front graphics plane 152 and the mixing process in the back graphics plane 151 are completed.

The interactive graphics plane generator 94 thus constructed prevents the animation display from being flickered.

The process for the above-referenced animation display, namely, the process of the controller 21 performed on the pre-load buffer 61, the animation decoder 62, the decoded object buffer 63, the composition buffer 64, and the animation scheduler 65 is initiated by animation ( ) as API for initiating video-synchronized animation.

The specific syntax of the API is different depending on the language specifications of the platform of the reproducing apparatus 1. An application program or a resident program executed by the reproducing apparatus 1 can thus control animation display by calling the following APIs.

The API includes the following arguments:

filecount: This argument specifies the total number of file names.

Mode: This argument specifies one of normal mode and sprite mode. When the normal mode is specified by the argument Mode, one image file corresponds to one animation frame. When the sprite mode is specified by the argument Mode, a plurality of animation frames are extracted from a single image file.

filenames: This argument is a character-string type argument. An image file specified by filenames and required for animation is pre-loaded and expanded. Using filenames, a plurality of file names can be specified.

PlayList_id [ ]: This argument specifies a string of PlayList [ ] When a plurality of PlayLists are specified, PlayLists need to be specified in the order of playback.

PlayItem_id [ ]: This argument specifies a string of PlayItems. When a plurality of PlayItems are specified, PlayItems need to be specified in the order of playback. If a plurality of PlayList_id are specified, the argument PlayItem_id [ ] cannot specify value.

start_PTS: This argument specifies PTS of a video frame at the start time of animation. The value of start_PTS falls within presentation time of video as previously discussed.

end_PTS: This argument specifies PTS of the video frame at the end time of animation. As the value of start_PTS, the value of end_PTS falls within the range of presentation time of video.

frame_rate: This argument specifies a frame rate of animation, and is an integer multiple of a video frame rate of synchronized video.

width: This argument specifies a width of the animation frame (a width of the image frame of original data rather than a width of display).

height: This argument specifies a height of the animation frame (a height of the image frame of the original data rather than a height of display).

X [ ]: This argument represents a display position of animation, for example, X coordinate (or X coordinate string) of the top-left corner of the animation in the generated presentation graphics plane (or in the display screen).

Y [ ]: This argument represents a display position of animation, for example, Y coordinate (or Y coordinate string) of the top-left corner of the animation in the generated presentation graphics plane (or in the display screen).

scaling_factor [ ]: This argument represents a string of a measure of the size of animation data (scaling factor) shown in the generated presentation graphics plane (or in the display screen) with respect to the size of the animation frame.

In this case, any return value is not particularly prepared.

With these API arguments, authoring process is performed by simply calling the API in the application program.

With this arrangement, the animation frame described using Java® can be reproduced in synchronization with the video data reproduced as stream data on the reproducing apparatus 1.

In comparison with the known HDMV graphics stream used to display graphics in synchronization with a video frame in the MPEG 2 transport stream format, the reproducing apparatus 1 is free from video format limitation and compression format limitation. The format of the image to be reproduced in synchronization is flexibly introduced. The authoring process is so simple as to call the API in the application program.

Frame-synchronized animation is thus developed with low development cost and provided based on general graphics objects such as JPEG images and the definition of the control API. With API driven animation, a content producer and a content provider can produce and distribute video-synchronized animation without expert knowledge about MPEG 2 transport stream.

On a later date, animation data may be easily supplied over the network 2 such as the Internet to be reproduced in accordance with an already distributed content. The development of the data to be supplied on a later date requires no expert knowledge about MPEG 2 transport stream, for example.

When the HDMV graphics stream is used as a data format of an image to be reproduced in synchronization with a video stream on the reproducing apparatus 1 of one embodiment of the present invention, all data can be read at a time, or on a per source packet basis. Reading is thus flexibly performed.

The process of the reproducing apparatus 1 is described below with reference to flowcharts of FIGS. 23-30.

File addition and update process is described below with reference to the flowchart of FIG. 23.

In step S1, the operational input acquisition unit 32 in the controller 21 determines, based on a signal supplied from the operation input unit 29, whether a command for a file-based addition process, i.e., a command to start an addition process of adding a file contained in a directory identified by a predetermined disc_id has been received from a user. If it is determined in step S1 that the command to start the file addition process has not been received, step S1 is repeated until it is determined that the command to start the file addition process has been received.

If it is determined in step S1 that the command to start the file addition process has been received, the local storage directory manager 34 in the controller 21 controls the data acquisition unit 33 in step S2, thereby accessing the server 3 via the Internet interface 25 and the network 2 to transmit information indicating the status of the current virtual file system, such as the manifest_id identifier of the manifest ( ) section, to the server 3.

In step S3, the data acquisition unit 33 controls the Internet interface 25, thereby determining whether information corresponding to the list of downloadable files has been received from the server 3 via the network 2.

If it is determined in step S3 that the information corresponding to the list of downloadable files has not been received, the menu screen display controller 31 controls in step S4 displaying of an error message notifying the user that the file addition process is disabled, and then ends the process.

If it is determined in step S3 that the information corresponding to the list of downloadable files has been received, the data acquisition unit 33 supplies in step S5 the menu screen display controller 31 with information regarding the list of downloadable files transmitted from the server 3 and received via the Internet interface 25. The menu screen display controller 31 causes a display device to display a menu screen of the list of downloadable files from which the user is allowed to select one.

In step S6, the operation input acquisition unit 32 determines whether the user has selected an item to be added using one of buttons and icons on the menu screen displayed under the control of the menu screen display controller 31. If it is determined in step S6 that any item the user may want to add has not been selected, step S6 is repeated until it is determined that any item has been selected.

If it is determined in step S6 that the item the user may want to add has been selected, the operation input acquisition unit 32 supplies in step S7, to the data acquisition unit 331 information indicating the content of updating selected by the user. The data acquisition unit 33 controls the Internet interface 25 and transmits information indicating a requested file to the server 3 to request the server 3 to send back the file selected by the user.

In step S8, the data acquisition unit 33 controls the Internet interface 25, thereby causing the server 3 to download one of a PlayList file, a ClipInformation file, a clip AV stream file, an audio file, a caption text stream file, an animation data file and a font file, prepared as download files. The data acquisition unit 33 then notifies the local storage directory manager 34 that these files have been downloaded.

In step S9, the local storage directory manager 34 determines whether the local storage 24 has already stored directories identified by the author_id and disc_id identifiers contained in the manifest ( ) of the downloaded files. If the corresponding directory is present on the local storage 24, the downloaded data file is expanded on that directory. If no corresponding directory is present, a new directory specified by the author_id and disc_id identifiers is created, and the downloaded data file is then expanded thereon.

Figure 24:
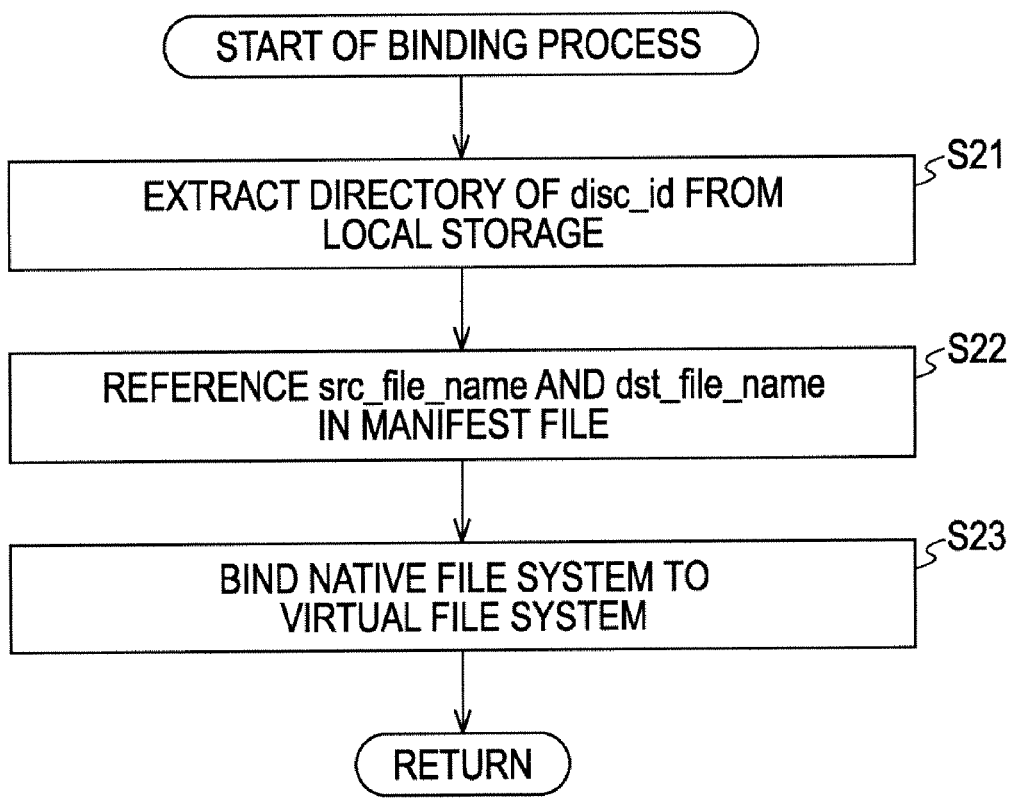
FIG. 24 is a flowchart illustrating a binding process.

In step S10, a binding process to be described later with reference to FIG. 24 is performed.

Through this process, the update file is downloaded from the server 3, stored on the local storage 24, and handled as an update file of the content recorded on the optical disk 11.

For example, a user purchases an optical disk 11 having a content such as a movie recorded thereon. The user then acquires a file required to display a caption of a language unrecorded on the optical disk 11 or a file required to display an new animation in synchronization with the video data, and then stores those files on the local storage 24. The application program for performing the playback process can thus handle the data recorded on the optical disk 11 and the data recorded on the local storage 24 without any difference. As a result, a virtual file system that hides the storage of physical data from the user and the application program is produced.

Those update files may be downloaded free of charge or for a fee.

Figure 23:
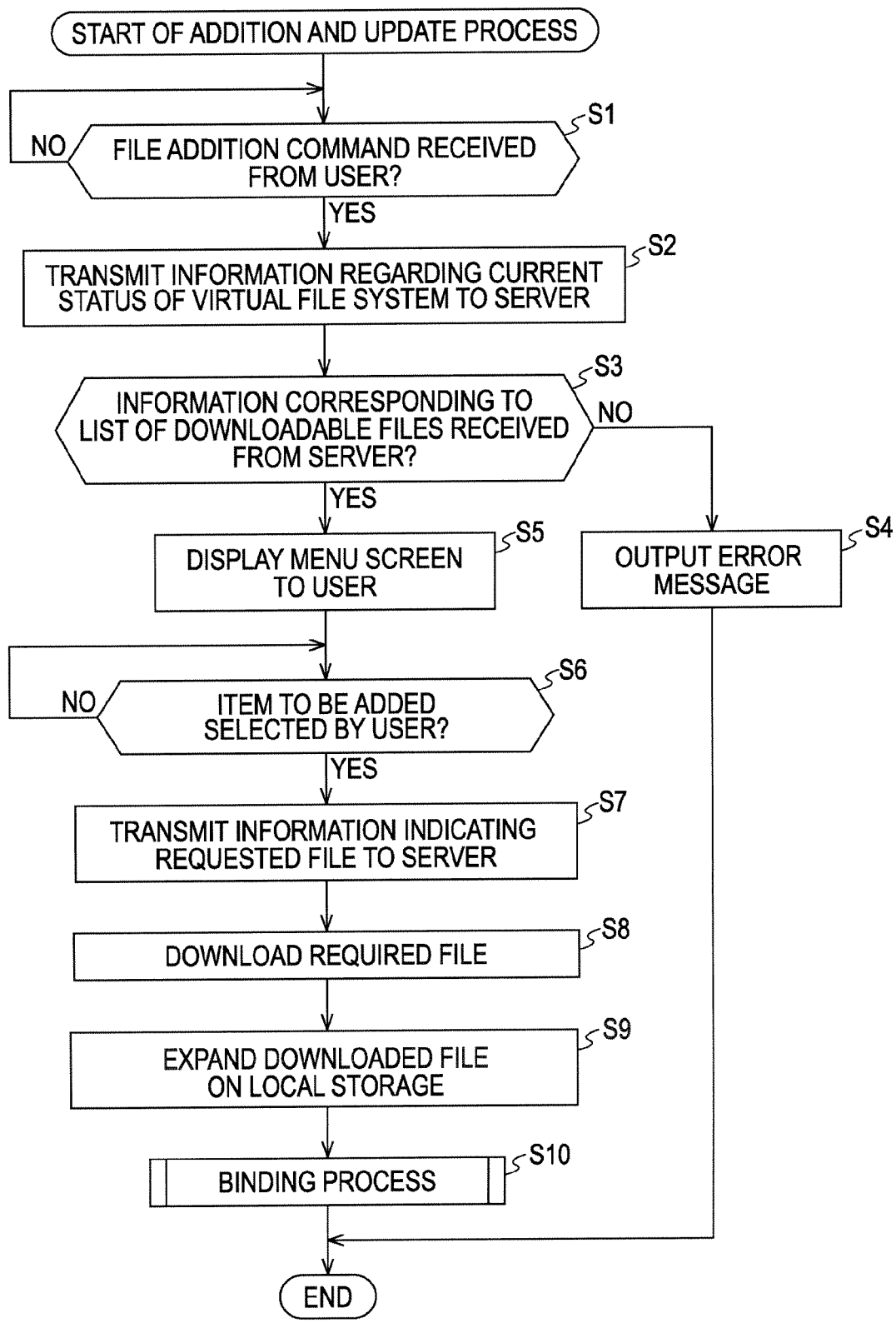
FIG. 23 is a flowchart illustrating an addition and update process.

The binding process executed in step S10 of FIG. 23 is described below with reference to the flowchart of FIG. 24.

In step S21, the local storage directory manager 34 extracts a directory of a corresponding disc_id from a downloaded data group stored on the local storage 24, and then supplies the directory to the file system merge processor 36.

In step S22, the file system merge processor 36 references the src_file_name and dst_file_name fields in the manifest file.

In step S23, the file system merge processor 36 binds a native file system to a virtual file system based on the src_file_name and dst_file_name referenced in step S22.

More specifically, the src_file_name presents a "path name" representing a path, i.e., information uniquely identifying where the corresponding file is recorded in the directory structure in the file system of the local storage 24. The dst_file_name field presents a "path name" representing a path, i.e., information uniquely identifying where the corresponding file is recorded in the directory structure at a binding destination in the virtual disk of the file stored on the local storage 24.

For example, in the manifest ( ) section described with reference to FIG. 10, "/MainMovie/movie01/main.r1.jp.mp2" as a path name might be specified in the src_file_name field and "/STREAM/01002.m2ts" as a path name might be specified in the dst_file_name field. As previously discussed with reference to FIG. 13, the downloaded data is stored under a file name of main.r1.jp.mp2 in a movie01 folder in MainMovie folder on the local storage 24 in accordance with the author_id and disc_id identifiers. In the virtual file system on the virtual disk, the file system merge processor 36 performs the binding process so that the downloaded data is handled as a file having a file name of 01002.m2ts in a STREAM directory.

The content author can specify the path name in the local storage 24 in the src_file_name field of the manifest ( ) section of the downloaded file package, and the path name of the virtual file system on the virtual disk in the dst_file_name field. If the path name adapted to the virtual file system on the virtual disk (i.e., adapted to the file system of the optical disk 11) is set in the dst_file_name field, the content author can freely set the file/directory structure under the disc_id identifier and add newly a directory and a file in an area under the disc_id identifier of the data actually recorded on the local storage 24 in the reproducing apparatus 1.

The playback process executed by the reproducing apparatus 1 is described below with reference to the flowchart of FIGS. 25-27.

When the user enters an instruction to reproduce a predetermined content, the controller 21 reads, from the optical disk 11 via the optical disk drive 22, or from the local storage 24, the PlayList file corresponding to the content that is to be reproduced in response to the instruction. In step S101, the controller 21 determines whether the API for displaying animation is initiated. If it is determined in step S101 that the API has not been initiated, processing proceeds to step S103.

Figure 28:
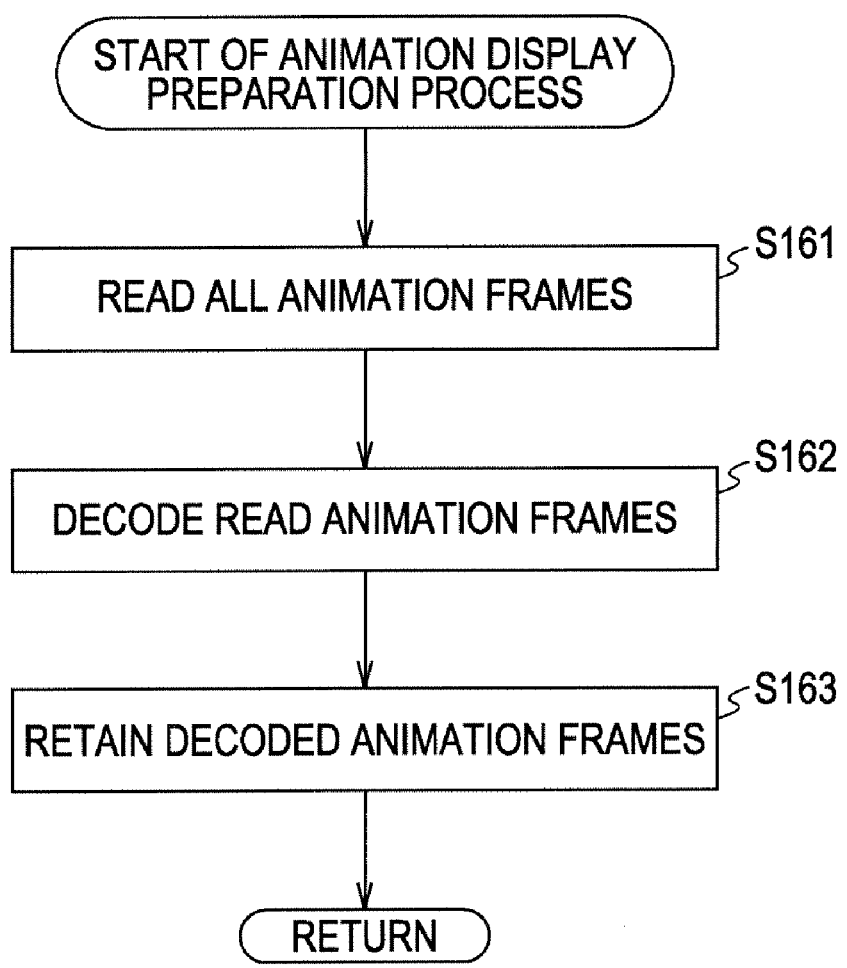
FIG. 28 is a flowchart illustrating an animation display preparation process.

If it is determined in step S101 that the API has been initiated, an animation display preparation process to be discussed later with reference to FIG. 28 is executed in step S102. With the animation display preparation process executed, the decoded object buffer 63 accumulates decoded animation data.

If it is determined in step S101 that the API has not been initiated, the controller 21 reads the main Clip, the sub Clip, and the text sub title data (Text-ST data) in step S103 subsequent to step S102. More specifically, the controller 21 reads the main Clip based on the PlayItem contained in the PlayList. The controller 21 reads the sub Clip and the text sub title data based on SubPlayItem referenced by a SubPath contained in the PlayList.

In step S104, the controller 21 controls the switch 41 in order to supply the read data (including the main Clip, the sub Clip, and the text sub title data) to respective buffers 51-54. More specifically, the controller 21 controls the switch 41 to supply the background image data to the buffer 51, the main Clip data to the buffer 52, the sub Clip data to the buffer 53, and the text sub title data to the buffer 54.

In step S105, the switch 41 is thus controlled by the controller 21. The background data is supplied to the buffer 51, the main Clip data is supplied to the buffer 52, the sub Clip data is supplied to the buffer 53, and the text sub title data is supplied to the buffer 54.

In step S106, the buffers 51-54 buffer respective supplied data. More specifically, the buffer 51 buffers the supplied background image data, the buffer 52 buffers the main Clip data, the buffer 53 buffers the sub Clip data, and the buffer 54 buffers the text sub title data.

In step S107, the buffer 51 outputs the background image data to the background decoder 71.

In step S108, the buffer 52 outputs the stream data of the main Clip to the PID filter 55.

In step S109, the PID filter 55 sorts the stream data in accordance with PID accompanying the TS packet forming the main Clip AV stream file, and then distributes the sorted stream to the decoders of elementary streams. More specifically, the PID filter 55 supplies the video stream to the PID filter 60, the presentation graphics stream to the switch 57 serving as a supply source to the presentation graphics decoder 73, the interactive graphics stream to the switch 58 serving as a supply source to the interactive graphics decoder 74, and the audio stream to the switch 59 serving as a supply source to the first audio decoder 75-1. The video stream, the presentation graphics stream, the interactive graphics stream, and the audio stream are assigned different PIDs. The PID filter 60 under the control of the controller 21 supplies the primary video stream to the first video decoder 72-1 and the secondary video stream to the second video decoder 72-2.

In step S110 (of FIG. 26), the buffer 53 outputs the sub Clip stream data to the PID filter 56.

In step S111, the PID filter 56 sorts the stream data in accordance with PID and distributes the sorted data to respective decoders of elementary streams. More specifically, the PID filter 56 supplies the video stream to the PID filter 60, the presentation graphics stream to the switch 57 serving as a supply source to the presentation graphics decoder 73, the interactive graphics stream to the switch 58 serving as a supply source to the interactive graphics decoder 74, and the audio stream to the switch 59 serving as a supply source to one of the first audio decoder 75-1 and the second audio decoder 75-2. The PID filter 60 under the control of the controller 21 supplies the primary video stream to the first video decoder 72-1 and the secondary video stream to the second video decoder 72-2.

In step S112, the PID filters 55-60 under the control of the controller 21 selects between the main Clip and the sub Clip. More specifically, the switch 57 selects the presentation graphics stream of one of the main Clip supplied from the PID filter 55 and the sub Clip supplied from the PID filter 56, and supplies the presentation graphics stream to the subsequent presentation graphics decoder 73. The switch 58 selects the interactive graphics stream of one of the main Clip supplied from the PID filter 55 and the sub Clip supplied from the PID filter 56, and supplies the selected interactive graphics stream to the interactive graphics decoder 74. The switch 59 selects the audio stream of one of the main Clip supplied from the PID filter 55 and the sub Clip supplied from the PID filter 56, and supplies the selected audio stream to the first audio decoder 75-1. If the user issues an instruction to switch audio, the switch 59 may supply the audio stream of the main Clip to the second audio decoder 75-2 or the audio stream of the sub Clip to one of the first audio decoder 75-1 and the second audio decoder 75-2. The discussion of this process is skipped because the playback process prior to the audio switching is discussed herein.

In step S113, the buffer 54 outputs the text sub title data to the text sub title composition decoder 76.

In step S114, the background decoder 71 decodes the background image data and outputs the decoded background image data to the background plane generator 91.

In step S115, the first video decoder 72-1 decodes the supplied primary video stream and then outputs the decoded primary video stream to the video plane generator 92.

In step S116, the second video decoder 72-2 decodes the supplied secondary video stream and then outputs the decoded secondary video stream to the video plane generator 92.

In step S117, the presentation graphics decoder 73 decodes the presentation graphics stream selected and supplied by the switch 57, and then outputs decoded presentation graphics stream to the subsequent switch 77.

In step S118, the interactive graphics decoder 74 decodes the interactive graphics stream selected and supplied by the switch 58 and then outputs the decoded interactive graphics stream to the subsequent switch 78.

In step S119, the first audio decoder 75-1 decodes the primary audio stream selected and supplied by the switch 59 and then outputs the decoded primary audio stream to the subsequent mixing processor 101.

In step S120, the second audio decoder 75-2 decodes the secondary audio stream selected and supplied by the switch 59 and then outputs the decoded secondary audio stream to the subsequent mixing processor 101.

In step S121, the text sub title composition decoder 76 decodes the primary or secondary text sub title data to be displayed, and then outputs the decoded text sub title data to the switch 77.

In step S122, the composition buffer 64 under the control of the animation scheduler 65 determines whether animation is to be displayed.

Figure 29:
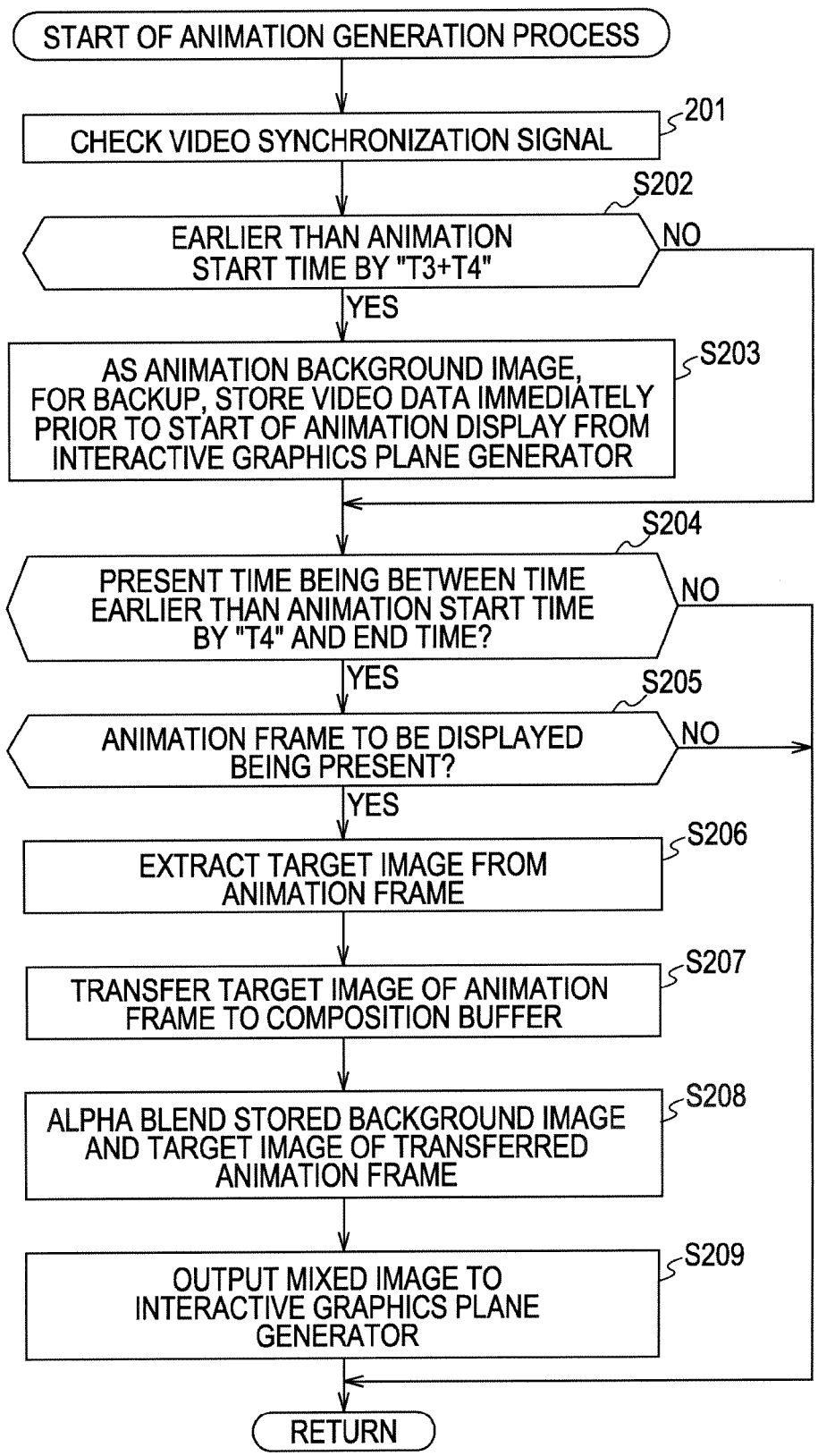
FIG. 29 is a flowchart illustrating an animation generation process.

If it is determined in step S122 that animation is to be displayed, an animation generation process to be discussed later with reference to the flowchart of FIG. 29 is executed in step S123.

If it is determined in step S122 that animation is not to be displayed, or subsequent to step S123, the switch 77 selects one of the data output from the presentation graphics decoder 73 and the data output from the text sub title composition decoder 76 in step S124. More specifically, the switch 77 selects one of the presentation graphics stream decoded by the presentation graphics decoder 73 and the text sub title data from the text sub title composition decoder 76 to be displayed, and then supplies the selected data to the presentation graphics plane generator 93.

In step S125, the switch 78 selects one of the data output from the interactive graphics decoder 74 and the data output from the composition buffer 64. More specifically, the switch 78 selects one of the interactive graphics stream decoded by the interactive graphics decoder 74 and the animation data generated by the composition buffer 64 to be displayed, and then supplies the selected data to the interactive graphics plane generator 94. The moment the animation data is supplied to the composition buffer 64 is animation timing, and the switch 78 thus supplies the animation data from the composition buffer 64 to the interactive graphics plane generator 94.

In step S126, the background plane generator 91 generates a background plane based on the background image data supplied from the background decoder 71.

In step S127, the video plane generator 92 mixes the video data from the first video decoder 72-1 and the video data from the second video decoder 72-2 to generates a video plane and then outputs the video plane to the video data processor 96.

In step S128, the presentation graphics plane generator 93 generates a presentation graphics plane based on one of the data from the presentation graphics decoder 731 and selected and supplied by the switch 77 in step S124, and the data from the text sub title composition decoder 76.

In step S129, the interactive graphics plane generator 94 generates an interactive graphics plane based on one of the data of the interactive graphics stream supplied from the interactive graphics decoder 74 and then selected by the switch 78 in step S125, and the animation data supplied from the composition buffer 64.

In step S130, the buffer 95 buffers the sound data selected and supplied in step S105 and then supplies the buffered sound data to the mixing processor 97 at a predetermined timing.

In step S131, the video data processor 96 mixes and then output data of the planes. More specifically, the video data processor 96 mixes the data from the background plane generator 91, the video plane generator 92, the presentation graphics plane generator 93, and the interactive graphics plane generator 94, and then outputs the mixed data as video data.

In step S132, the mixing processor 101 mixes the primary audio data output from the first audio decoder 75-1 and the secondary audio data output from the second audio decoder 75-2, and outputs the mixed data to the mixing processor 97.

In step S133, the mixing processor 97 mixes (synthesizes) the mixed audio data output from the mixing processor 101 and the sound data and outputs the mixed data.

In step S134, the controller 21 references the read PlayList, thereby determining whether to end the playback process. If it is determined in step S134 that the playback process is not to end, processing returns to step S104 to repeat step S104 (of FIG. 25) and subsequent steps. If it is determined in step S134 that the playback process is to end, processing ends.

Through the above process, the audio data and the video data recorded in the form of the AV stream on one of the optical disk 11 and the local storage 24, and as necessary, the text data in the text caption file, the audio data of sound effect, and the image data for displaying animation (animation frame data) are decoded and reproduced.

The animation display preparation process executed in step S102 of FIG. 25 is described below with reference to the flowchart of FIG. 28.

In step S161, the pre-load buffer 61 reads all the animation frames supplied from the switch 41 for buffering.

In step S162, the animation decoder 62 decodes the animation frame read and buffered on the pre-load buffer 61 and then supplies the decoded animation frame to the decoded object buffer 63.

In step S163, the decoded object buffer 63 retains the decoded animation frame. Processing returns to step S102 of FIG. 25 to proceed to step S103.

Through this process, the animation frame is buffered and decoded beforehand and then stored on the decoded object buffer 63 in order to reproduce the animation in synchronization with the video data of the main Clip, the decode timing of which is difficult to predict.

The animation generation process executed in step S123 of FIG. 27 is described below with reference to the flowchart of FIG. 29.

In step S201, the animation scheduler 65 references the STC counter (not shown) to check a video synchronization signal.

In step S202, the animation scheduler 65 determines whether the current time is earlier than the animation start time by "T3+T4", more specifically, determines whether the current time is earlier than the start of the transfer of the animation frame from the decoded object buffer 63 to the composition buffer 64 discussed with reference to FIG. 18 by time required to back up the image data before the start of the animation display.

If it is determined in step S202 that the current time is earlier than the animation start time by "T3+T4", the composition buffer 64 backs up in step S203 the image data immediately prior to the start of the animation display, from the interactive graphics plane generator 94 as the background image of the animation display.

If it is determined in step S202 that the current time is not earlier than the animation start time by "T3+T4", or subsequent to step S203, the animation scheduler 65 determines in step S204 whether it is it is now between the time earlier than the animation display start time by "T4" and the animation display end time, i.e., whether it is time to output the animation frame in synchronization with the video frame.

If it is determined in step S204 that the current time is between the time earlier than the animation display start time by "T4" and the animation display end time, the animation scheduler 65 determines in step S205 whether an animation to be displayed is present in the decoded object buffer 63.

If it is determined in step S205 that an animation is present, the decoded object buffer 63 extracts a target image of the animation frame under the control of the animation scheduler 65 in step S206.

In step S207, the decoded object buffer 63 transfers (or copies) the target image of the animation frame to the composition buffer 64 under the control of the animation scheduler 65 that references the same STC counter as the video buffer.

In step S208, the composition buffer 64 alpha blends the background image backed up in step S203 and the target image of the animation frame transferred (or copied) in step S207.

In step S209, the composition buffer 64 supplies the mixed image to the switch 78 to output the mixed image to the interactive graphics plane generator 94. Processing returns to step S123 of FIG. 27 to proceed to step S124.

If it is determined in step S204 that the current time is not between the time earlier than the animation display start time by "T4" and the animation display end time, or if it is determined in step S205 that no animation frame is present, processing returns to step S123 of FIG. 27 to proceed to step S124.

Through this process, the animation frame buffered and decoded beforehand is displayed in synchronization with the video data.

Figure 30:
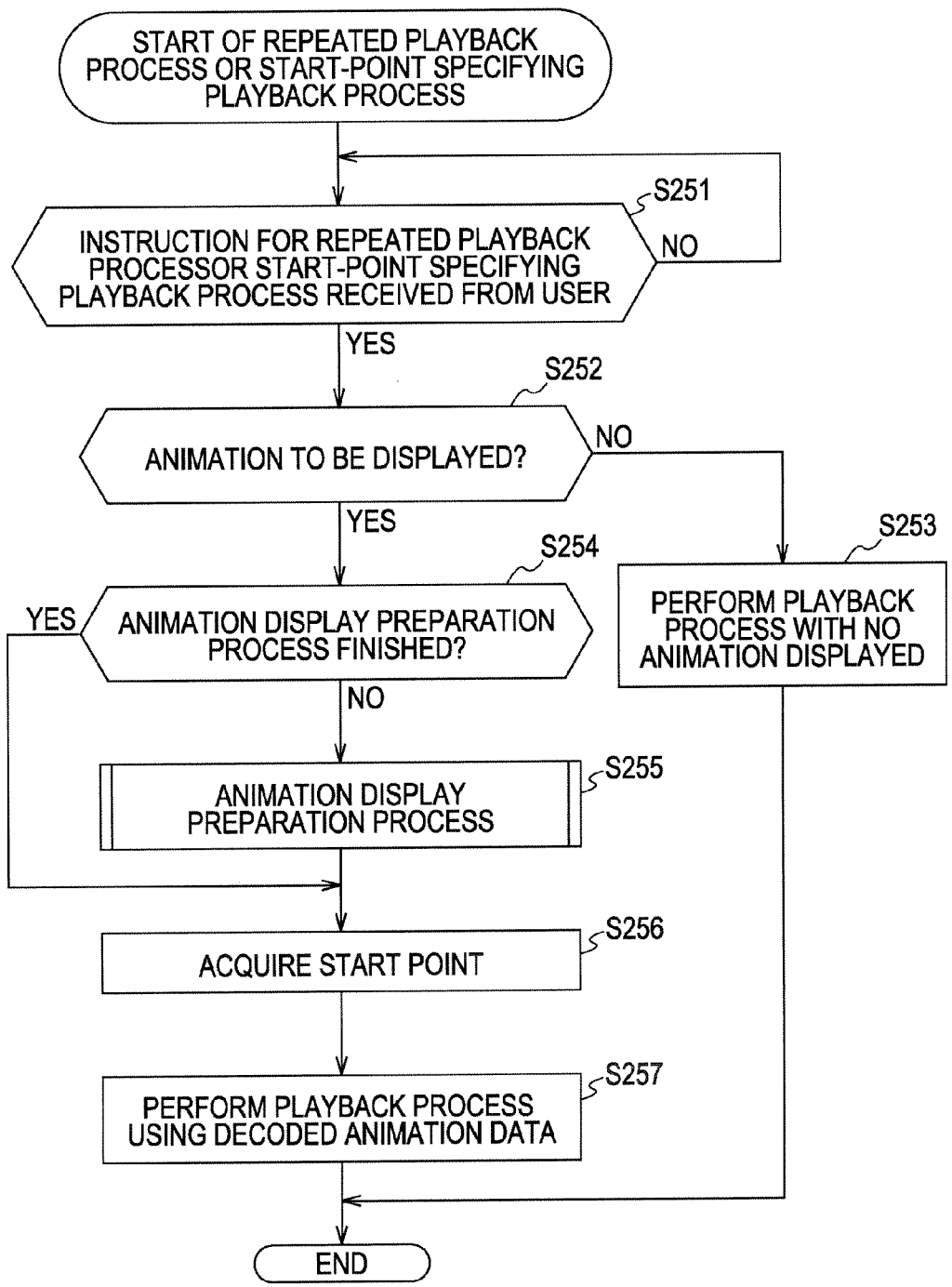
FIG. 30 is a flowchart illustrating a repeated playback process or a playback start-point specifying playback process.

The repeated playback process or the playback start-point specifying process is described below with reference to the flowchart of FIG. 30.

In step S251, the controller 21 determines, based on a signal from the operation input unit 29, whether a command to start one of the repeated playback process and the playback start-point specifying process has been received from the user. If it is determined in step S251 that a command to start one of the repeated playback process and the playback start-point specifying process has been not been received from the user, step S251 is repeated until it is determined that a command to start one of the repeated playback process and the playback start-point specifying process has been received from the user.

If it is determined in step S251 that a command to start one of the repeated playback process and the playback start-point specifying process has been received from the user, the controller 21 references the PlayList corresponding to a playback portion to determine whether the animation display is to be performed.

If it is determined in step S252 that no animation display is to be performed, the controller 21 controls the decoder 26 in step S253, thereby performing the playback process without displaying animation. More specifically, the controller 21 performs a portion of the playback process discussed with reference to FIGS. 25-27 unrelated to animation.

If it is determined in step S252 that the animation display is to be performed, the controller 21 determines in step S254 whether the animation display preparation process (FIG. 28) has been completed.

If it is determined in step S254 that the animation display preparation process has not been completed, the controller 21 performs in step S255 the animation display preparation process discussed with reference to FIG. 28.

If it is determined in step S254 that the animation display preparation process has been completed, or subsequent to step S255, the controller 21 acquires in step S256 a playback start point based on a signal supplied from the operation input unit 29.

In step S257, the controller 21 performs the playback process using the decoded animation data. More specifically, the controller 21 performs the same process as step S103 and subsequent steps of the process discussed with reference to FIGS. 25-27.

When a portion that has undergone the animation display preparation process is reproduced through this process, the decoded and buffered animation data of the corresponding portion may be used. The repeated playback process and the playback start-point specifying process may be quickly and easily performed.

In the repeated playback process or the playback start-point specifying process discussed with reference to FIG. 30, when the portion that has undergone the animation display preparation process is reproduced, the decoded and buffered animation data of the corresponding portion is used as described above. If the alpha blended frame data is stored on the composition buffer 64 (i.e., the data is not transferred but copied from the composition buffer 64 to the switch 78), the alpha blended frame data stored on the composition buffer 64 may be reused to perform the one of the repeated playback process and the playback start-point specifying process.

For example, an animation frame described using Java® can be reproduced in synchronization with video to be reproduced as stream data on the reproducing apparatus 1.

In comparison with the known HDMV graphics stream used to display graphics in synchronization with a video frame in the MPEG 2 transport stream format, the reproducing apparatus 1 of the embodiments of the present invention is free from video format limitation and compression format limitation. The format of the image to be reproduced in synchronization is flexibly introduced. The authoring process is so simple as to call the API in the application program.

In the reproducing apparatus 1 of the embodiment of the present invention, frame-synchronized animation is thus developed with low development cost based on general graphics objects such as JPEG images and the definition of the control API. With API driven animation, a content producer and a content provider can produce and distribute video-synchronized animation without expert knowledge about MPEG 2 transport stream.

On a later date, animation data may be easily supplied over the network 2 such as the Internet to be reproduced in accordance with an already distributed content. The development of the data to be supplied on a later date requires no expert knowledge about MPEG 2 transport stream, for example.

A manufacturing method of the recording medium storing data replayable on the reproducing apparatus 1 is described below with reference to FIGS. 31 and 32. As shown, the recording medium is the optical disk 11.

Figure 31:
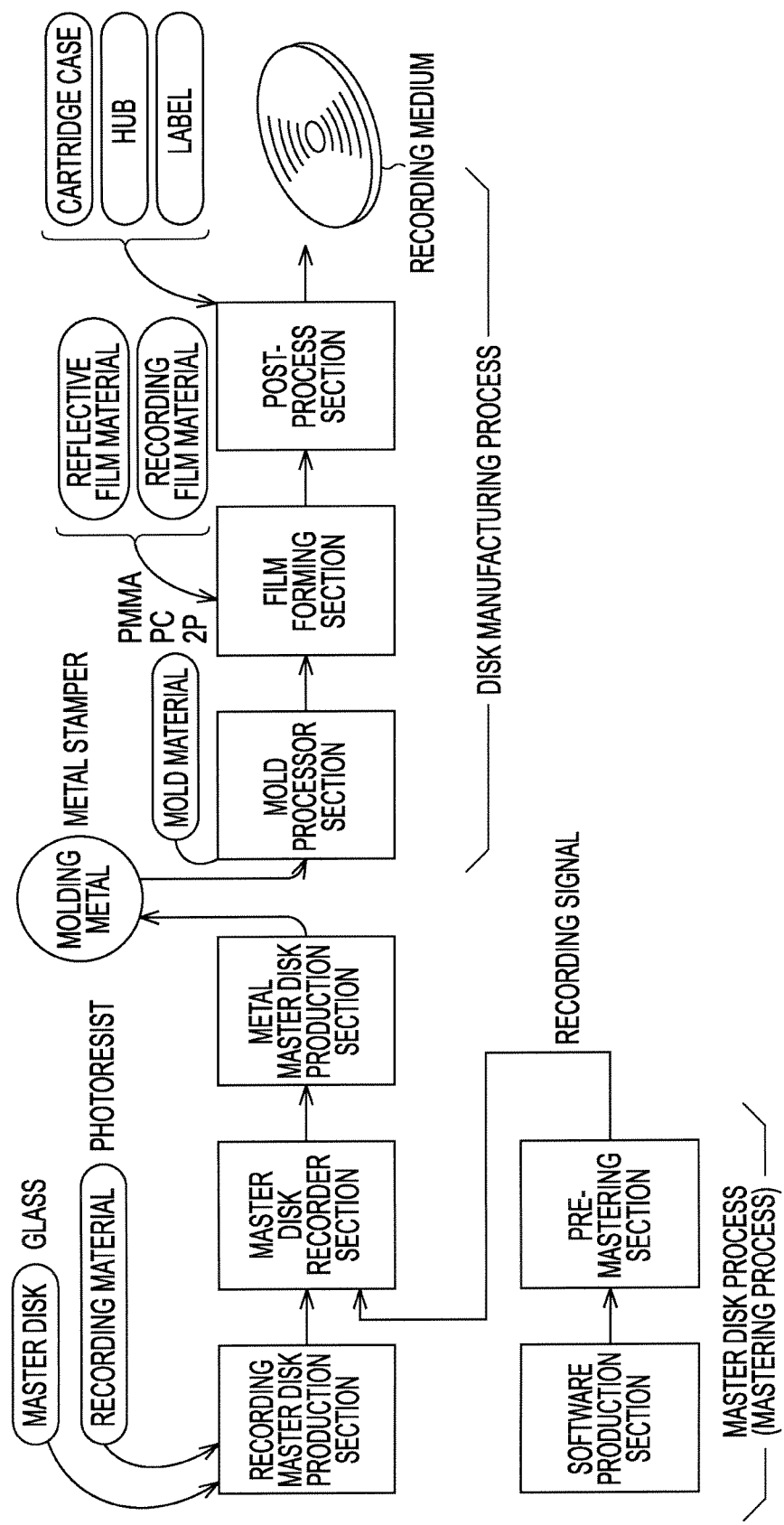
FIG. 31 illustrates manufacturing of a recording medium storing data replayable on the reproducing apparatus.

As shown in FIG. 31, a master disk made of glass is prepared. A recording material made of photoresist or the like is applied on the master disk. The recording master disk thus results.

Figure 32:
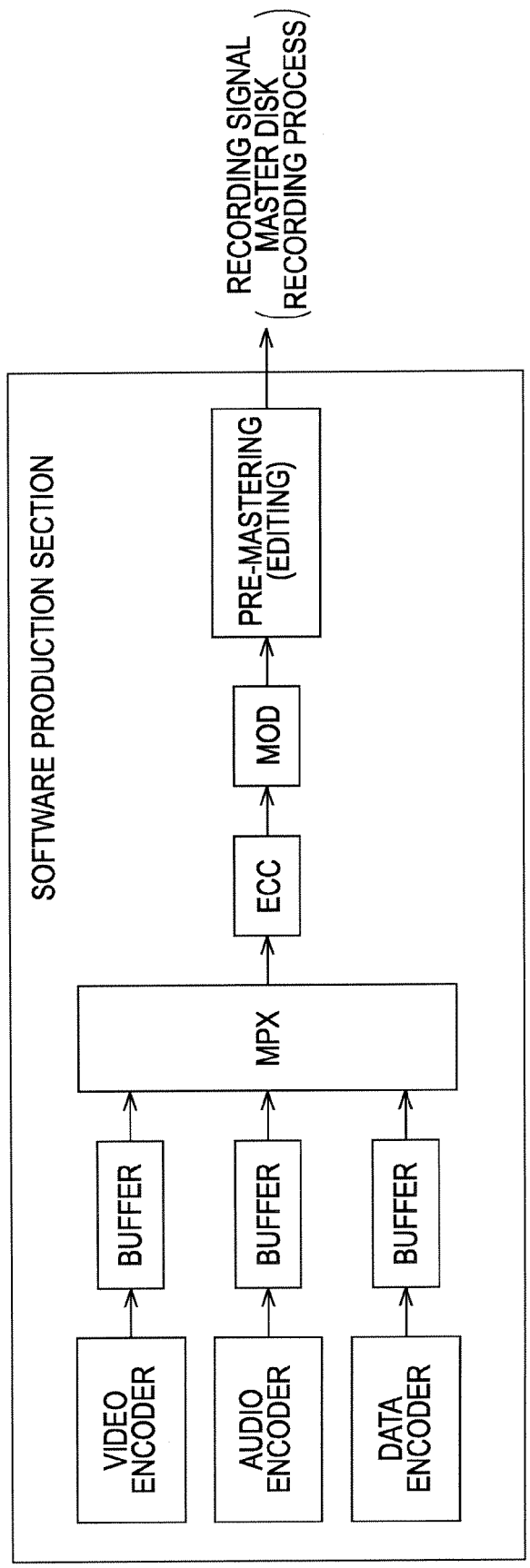
FIG. 32 illustrates manufacturing of a recording medium recording data replayable on the reproducing apparatus.

As shown in FIG. 32, video data in a format replayable on the reproducing apparatus 1 encoded by a video encoder in a software production section is stored temporarily on a buffer. Audio data encoded by an audio encoder is temporarily stored on a buffer. Data other than streams (for example, Indexes, Playlist, PlayItem, etc.) encoded by a data encoder is temporarily stored on a buffer. The video data, the audio data, and the data other than the stream stored on the respective buffers are multiplexed by a multiplexer (MPX) in synchronization with a synchronization signal, and an error correction code (ECC) circuit attaches an error correction code to the multiplexed signal. The resulting signal is modulated by a modulator (MOD) circuit, and then stored on a magnetic tape in accordance with a predetermined format. Thus, a software program is manufactured to be recorded onto one of the optical disk 11 and the removable medium 28 replayable on the reproducing apparatus 1.

The software program is edited (pre-mastered) as necessary, and a signal having a format to be recorded on the optical is thus produced. A laser beam is modulated In accordance with the recording signal, and then directed to the photoresist on the master disk. The photoresist on the master disk is thus exposed to the laser beam modulated with the recording signal.

The master disk is then developed, and pits are arranged on the master disk. The master disk is then subjected to electroforming to manufacture a metal master disk into which the pits of the glass master disk are transferred. From the metal master disk, a metal stamper is produced and used as a mold.

A material such as PMMA (acryl) or PC (polycarbonate) is injected into the mold and solidified. Alternatively, after applying 2P (ultraviolet curing resin) on the metal stamper, ultraviolet light is directed to the metal stamper for curing. In this way, the pits on the metal stamper are transferred to a replica made of the resin.

A reflective film is formed on thus constructed replica using deposition or sputtering technique. Alternatively, a reflective film is formed on the replica using spin coating technique.

The inner circular edge and the outer circular edge of the disk is then neatly shaped and a process required to bond two disks together is also performed. Further, a label is glued on the disk and a hub is attached to the disk, and the resulting disk is inserted into a cartridge. The optical disk 11 or the removable medium 28 having data replayable on the reproducing apparatus 1 are thus manufactured.

The above-referenced series of process steps may be performed using software. A program of the software may be installed from a recording medium onto a computer built in dedicated hardware or a general-purpose personal computer enabled to perform a variety of functions with a variety of programs installed thereon.

As shown in FIG. 1, the recording medium includes the removable medium 28 distributed to a user separate from a computer to provide the user with the program. The recording media include the removable medium 28, such as one of a magnetic disk (including a flexible disk), an optical disk (such as compact disk read-only memory (CD-ROM)), or digital versatile disk (DVD)), a magneto-optical disk (such as minidisk (MD®), and a semiconductor memory. The recording media also include the memory 23, such a ROM or a RAM, or the local storage 24 such as a hard disk, each storing the program and supplied in the apparatus to the user.

The process steps describing the program stored on the recording medium may be performed in the time-series order sequence as previously stated. Alternatively, the process steps may be performed in parallel or separately.

In this description, the system refers to an entire apparatus including a plurality of units.

It should be understood by those skilled in the art that various modifications, combinations, sub-combinations and alterations may occur depending on design requirements and other factors insofar as they are within the scope of the appended claims or the equivalents thereof.

What is claimed is:

1. A reproducing apparatus comprising: an acquisition unit configured to acquire playback management information containing first information containing a main playback path indicating, along time axis, a location of a main stream containing at least one stream; a read out unit configured to read the main stream to be reproduced and video data that is to be reproduced in synchronization with the main stream, based on the playback management information acquired by the acquisition unit; a first storage unit configured to store the video data read by the read out unit; a decode unit configured to decode the video data stored on the first storage unit; a second storage unit configured to store the video data decoded by the decode unit; a playback unit configured to reproduce the main stream read by the read out unit by referencing a predetermined counter and the playback management information acquired by the acquisition unit; a video data output unit configured to output the decoded video data stored on the second storage unit in synchronization with playback of the main stream by the playback unit; and a control unit configured to control a process of the first storage unit, the decode unit, the second storage unit, and the video data output unit by referencing the counter referenced by the playback unit, wherein the acquisition unit further acquires control information containing a command for calling an API corresponding to the process performed by the control unit, and wherein when the API is called by executing the command, the control unit controls the process of the first storage unit, the decode unit, the second storage unit, and the video data output unit by referencing the counter referenced by the playback unit.

2. The reproducing apparatus according to claim 1, wherein the read out unit reads the video data prior to the main stream.

3. The reproducing apparatus according to claim 1, wherein the video data is different from the main stream in data format.

4. The reproducing apparatus according to claim 1, wherein the video data comprises animation data composed of a plurality of frames.

5. The reproducing apparatus according to claim 4, wherein the video data is in a JPEG data format and includes animation data reproducible on a Java application.

6. The reproducing apparatus according to claim 1, further comprising:
a mixture video data generation unit configured to generate mixture video data to be mixed with the main stream reproduced by the playback unit; and
a playback output unit configured to output the video data that is to be reproduced in response to the supply of the mixture video data to be mixed and generated by the mixture video data generation unit and the supply of the main stream reproduced by the playback unit,
wherein the video data output unit outputs the decoded video data to the mixture video data generation unit.

7. The reproducing apparatus according to claim 6, wherein the video data output unit acquires the mixture video data immediately prior to when the video data output unit outputs the decoded video data to the mixture video data generation unit, mixes the decoded video data with the acquired mixture video data, and outputs the resulting data to the mixture video data generation unit.

8. The reproducing apparatus according to claim 6, comprising at least two mixture video data generation units,
wherein while a first mixture video data generation unit generates the mixture video data, a second mixture video data generation unit supplies the generated mixture video data to the playback output unit, and
wherein while the second mixture video data generation unit generates the mixture video data, the first mixture video data generation unit supplies the generated mixture video data to the playback output unit.

9. The reproducing apparatus according to claim 1, further comprising a recording medium playback unit configured to reproduce and read information from a removable recording medium,
wherein the acquisition unit acquires the playback management information read from the recording medium by the recording medium playback unit.

10. The reproducing apparatus according to claim 1, further comprising a storage unit configured to store a variety of units of data,
wherein the acquisition unit acquires the playback management information stored on the storage unit.

11. The reproducing apparatus according to claim 1, further comprising a recording medium playback unit configured to reproduce and read information from a removable recording medium,
wherein the read out unit reads the main stream and the video data read from the recording medium by the recording medium playback unit.

12. The reproducing apparatus according to claim 1, further comprising a storage unit configured to store a variety of units of data,
wherein the read out unit reads the main stream and the video data stored on the storage unit.

13. The reproducing apparatus according to claim 1, wherein the playback management information acquired by the acquisition unit contains second information containing a sub playback path of a sub stream file different from a file of the main stream.

14. A reproducing method of a reproducing apparatus for reproducing stream data, comprising the steps of: reading a main stream to be reproduced, based on playback management information containing first information containing a playback path indicating, along time axis, a location of a main stream containing at least one stream; storing video data that is to be reproduced in synchronization with the main stream, based on the playback management information; decoding the stored video data; storing the decoded video data; reproducing the read main stream by referencing a predetermined counter and the playback management information; outputting the stored decoded video data in synchronization with playback of the main stream; controlling a process of the storing video data, the decoding, the storing the decoding video data, and the outputting by referencing the counter referenced by the reproducing; and acquiring control information containing a command for calling an API corresponding to the process performed by the controlling, wherein the controlling controls the process of the storing video data, the decoding, the storing the decoding video data, and the outputting by referencing the counter referenced by the reproducing, when the API is called by executing the command.

15. A non-transitory computer readable storage medium having stored thereon a program for causing a computer to perform a playback process of stream data, the program comprising the steps of: reading a main stream to be reproduced, based on playback management information containing first information containing a playback path indicating, along time axis, a location of a main stream containing at least one stream; storing video data that is to be reproduced in synchronization with the main stream, based on the playback management information; decoding the stored video data; storing the decoded video data; reproducing the read main stream by referencing a predetermined counter and the playback management information; outputting the stored decoded video data in synchronization with playback of the main stream; controlling a process of the storing video data, the decoding, the storing the decoding video data, and the outputting by referencing the counter referenced by the reproducing; and acquiring control information containing a command for calling an API corresponding to the process performed by the controlling, wherein the controlling controls the process of the storing video data, the decoding, the storing the decoding video data, and the outputting by referencing the counter referenced by the reproducing, when the API is called by executing the command.

16. A reproducing apparatus comprising: means for acquiring playback management information containing first information containing a main playback path indicating, along time axis, a location of a main stream containing at least one stream; means for reading the main stream to be reproduced and video data that is to be reproduced in synchronization with the main stream, based on the playback management information acquired by the acquisition means; first means for storing the video data read by the read means; means for decoding the video data stored on the first storage means; second means for storing the video data decoded by the decode means; means for reproducing the main stream read by the read means by referencing a predetermined counter and the playback management information acquired by the acquisition means, subsequent to completion of storage of the decoded video data by the second means; means for outputting the decoded video data stored on the second means in synchronization with playback of the main stream by the playback means; and means for controlling a process of the first means for storing, the means for decoding, the second means for storing, and the means for outputting by referencing the counter referenced by the means for reproducing, wherein means for acquiring further acquires control information containing a command for calling an API corresponding to the process performed by the control unit, and wherein when the API is called by executing the command, the means for controlling controls the process of the first means for storing, the means for decoding, the second means for storing, and the means for outputting by referencing the counter referenced by the means for reproducing.

* * * * *